(12) United States Patent
Zhang et al.

(10) Patent No.: US 7,578,567 B2
(45) Date of Patent: Aug. 25, 2009

(54) CONTAINER HAVING LIQUID DETECTING FUNCTION

(75) Inventors: Junhua Zhang, Nagano (JP); Takahiro Katakura, Nagano (JP); Takayoshi Katsumura, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 474 days.

(21) Appl. No.: 11/301,054

(22) Filed: Dec. 12, 2005

(65) Prior Publication Data

US 2006/0152539 A1 Jul. 13, 2006

(30) Foreign Application Priority Data

| Dec. 13, 2004 | (JP) | ............................ P2004-359551 |
| May 12, 2005 | (JP) | ............................ P2005-140433 |
| May 12, 2005 | (JP) | ............................ P2005-140434 |
| May 12, 2005 | (JP) | ............................ P2005-140435 |
| May 12, 2005 | (JP) | ............................ P2005-140436 |
| Nov. 14, 2005 | (JP) | ............................ P2005-329050 |

(51) Int. Cl.
*B41J 2/195* (2006.01)

(52) U.S. Cl. ............................... 347/7; 347/86; 347/84; 347/19

(58) Field of Classification Search ...................... 347/7, 347/19, 86, 84
See application file for complete search history.

(56) References Cited

U.S. PATENT DOCUMENTS

| 4,787,407 | A | 11/1988 | Vogel |
| 6,448,623 | B2 | 9/2002 | Takahashi et al. |
| 6,921,160 | B2 | 7/2005 | Tsukada |
| 2001/0052627 | A1 * | 12/2001 | Takahashi et al. ............ 257/415 |
| 2003/0103119 | A1 * | 6/2003 | Sakai et al. .................... 347/92 |

FOREIGN PATENT DOCUMENTS

| EP | 1 053 877 A1 | 11/2000 |
| GB | 2 413 385 A | 10/2005 |

(Continued)

OTHER PUBLICATIONS

Search Report, in British patent appln. No. GB 0 525 252.3, dated Mar. 27, 2006.

(Continued)

*Primary Examiner*—Matthew Luu
*Assistant Examiner*—Henok Legesse
(74) *Attorney, Agent, or Firm*—Stroock & Stroock & Lavan LLP

(57) ABSTRACT

A liquid detecting container includes a cartridge case having a sending passage for sending out liquid, buffer chambers by the end of the sending passage, and a sensor unit disposed facing the buffer chambers. A sensor chip in the sensor unit includes a sensor cavity communicating with the buffer chambers, a vibration plate closing an opening side of the sensor cavity opposite to the side communicating with the buffer chambers, and a piezoelectric element disposed on the surface of the vibration plate opposite to the surface facing the sensor cavity; emits a vibration wave to the sensor cavity and the buffer chambers through the vibration plate, receives a reflected wave from the buffer chambers through the vibration plate, and then converts the reflected wave into an electrical signal. The compliance values of the buffer chambers are set ten times greater than the compliance value of the sensor cavity.

12 Claims, 28 Drawing Sheets

A-A SECTION

FOREIGN PATENT DOCUMENTS

| | | |
|---|---|---|
| GB | 2 415 662 A | 1/2006 |
| JP | 2001-146024 A | 5/2001 |
| JP | 2001-146030 A | 5/2001 |
| JP | 2003-039707 A | 2/2003 |

OTHER PUBLICATIONS

Office Action from U.S. Appl. No. 11/297,563 (Mar. 25, 2008).
Amendment from U.S. Appl. No. 11/297,563 (Jun. 18, 2008).

* cited by examiner

MIN = NG

MAX = OK

SMALL = NG

SMALL = NG

CONTAINER HAVING LIQUID DETECTING FUNCTION

TECHNICAL FIELD

The present invention relates to a container having a liquid detecting function (mainly a residual ink detecting function) which applies to a liquid jetting apparatus such as an inkjet printer.

BACKGROUND ART

As a representative example of a conventional liquid jetting apparatus, there is known an inkjet printer including an inkjet printing head for printing an image. Examples of other liquid jetting apparatuses can include an apparatus including a color-material jetting head which is used for manufacturing a color filter of a liquid crystal display or the like, an apparatus including an electrode-material (conductive paste) jetting head which is used for forming an electrode of an organic EL display, a field emission display (FED), or the like, an apparatus including a living-organic-material jetting head which is used for manufacturing a biochip, and an apparatus including a sample jetting head as a precision pipette.

In the inkjet printer which is the representative example of the liquid jetting apparatus, a carriage includes an inkjet printing head having a pressurizing unit which pressurizes a pressure generating chamber and a nozzle opening for ejecting pressurized ink as ink droplets. The inkjet printer has a structure that ink in an ink container continues to be supplied to the printing head through a flow path, thereby continuing a printing work. The ink container is constructed as a detachable cartridge which can be replaced by a user, for example, when the ink runs out.

Conventionally, as a management method for ink consumption of the ink cartridge, there are known a management method in which the number of ink droplets ejected from the printing head or the amount of ink absorbed by a maintenance is integrated in software to calculate the amount of consumed ink and a method of managing the time when a predetermined amount of ink is actually consumed by mounting an electrode for detecting a liquid level in the ink cartridge.

However, the management method, in which the number of ejected ink droplets or the amount of ink is integrated in software to calculate the amount of consumed ink, has the following problems. Some heads show a weight variation in ejected ink droplets. The weight variation in ink droplets dose not have an effect on display quality. However, in consideration of the time when errors in the amount of consumed ink due to the variation are accumulated, the ink cartridge is filled with the ink together with margin ink. Accordingly, depending upon the individual ink cartridges, ink is left as much as the margin ink.

On the other hand, in the method of managing the time when the ink is consumed with an electrode, the actual amount of ink can be detected, so that the amount of remaining ink can be managed with high reliability. However, there are drawbacks in that kinds of ink to be detected are limited and a seal structure for an electrode becomes complicated, because detection of an ink level relies on conductivity of ink. In addition, precious metal having excellent conductivity and corrosion resistance is generally used as a material of the electrode. Therefore, manufacturing cost of the ink cartridge runs up. Further, since two electrodes need to be mounted, the number of manufacturing processes is increased, thereby increasing the manufacturing cost.

Accordingly, a device developed for solving the above-mentioned problems is disclosed as a piezoelectric device (hereinafter, referred to as sensor unit) in Patent Document 1. When ink exists and does not exist inside a cavity facing a vibration plate on which a piezoelectric element is stacked, the sensor unit monitors the amount of ink remaining in an ink cartridge by the use of variation in resonance frequency of a residual vibration signal due to residual vibration (free vibration) of the vibration plate after compulsory vibration.

Patent Document 1: JP-A-2001-146030

In the technique disclosed in Patent Document 1, since the cavity of the sensor unit is allowed to directly face an ink storage chamber of the cartridge, the sensor unit can be easily affected by bubbles mixed into the ink or noises such as a wave motion of the ink, thereby decreasing accuracy of detection.

DISCLOSURE OF THE INVENTION

The present invention has been contrived in consideration of the above-mentioned circumstances.

An advantage of the invention is to provide a container having a liquid detecting function, which can be little affected by the wave motion of ink or the bubbles in the ink to enhance the accuracy of detection.

Another advantage of the invention is that it provides a liquid sensor capable of reliably determining whether liquid exists and a liquid container including the liquid sensor. The existence of liquid is determined by simplifying a vibration mode to enhance detection sensitivity and further reducing an effect of the vibration received from liquid.

(1) In an illustrative, none-limiting embodiment, a container includes: a container body having a sending passage for sending out a liquid stored therein; a buffer chamber disposed in the vicinity of the end of the sending passage; and a sensor unit disposed to face on the buffer chamber. Here, the sensor unit has a sensor chip and the sensor chip includes: a sensor cavity communicating with the buffer chamber; a vibration plate closing an opening side of the sensor cavity opposite to the side communicating with the buffer chamber; and a piezoelectric element that is disposed on a surface of the vibration plate opposite to the surface facing the sensor cavity, emits a vibration wave to the sensor cavity and the buffer chamber through the vibration plate, receives a reflected wave returning from the buffer chamber, and converts the reflected wave into an electrical signal. Preferably, a compliance value of the buffer chamber defined as easiness in capacity variation of the buffer chamber is set to be at least ten times as large as the compliance value of the sensor cavity.

(2) The container according to (1), wherein the wall surface of the buffer chamber opposed to the vibration plate is opened, the opening is closed with a seal film having flexibility, the compliance value of the buffer chamber is given by elasticity of the seal film, and the compliance value of the sensor cavity is given by elasticity of the vibration plate.

(3) The container according to (2), wherein the buffer chamber includes two buffer chambers of an upstream buffer chamber and a downstream buffer chamber adjacent to each other with a partition wall therebetween, the upstream portion of the upstream buffer chamber communicates with the upstream side of the sending passage and the downstream portion of the upstream buffer chamber communicates with the sensor cavity through an upstream communication passage, the upstream portion of the downstream buffer chamber communicates with the sensor cavity through a downstream communication passage and the downstream portion of the downstream buffer chamber communicates with the downstream side of the sending passage, and a liquid flows in the upstream buffer chamber from the upstream side of the sending passage, enters the sensor cavity through the upstream communication passage, passes through the downstream communication passage and the downstream buffer chamber from the sensor cavity, and then is discharged to the downstream side of the sending passage.

According to the illustrative, none-limiting embodiment, since the buff chamber is provided in the vicinity of the end of the sending passage for sending out a liquid, the sensor unit is disposed to face on the buffer chamber, the sensor chip of the sensor unit emits the vibration wave to the buffer chamber, and the sensor unit detects the liquid inside the buffer chamber or the sensor cavity on the basis of the reflected wave returning to the sensor cavity from the buffer chamber, it is possible to detect the amount of remaining liquid under the condition that it is little affected by the wave motion of the liquid or the bubbles in the liquid.

Particularly, since the compliance value of the buffer chamber is set to be at least ten times as large as the compliance value of the sensor cavity, the vibration generated by the sensor chip can be little absorbed and thus a counter electromotive voltage of the piezoelectric element can be enhanced, thereby carrying out detection with high sensitivity.

According to the illustrative, none-limiting embodiment, since the wall surface of the buffer chamber opposed to the vibration plate is opened and the opening is closed with the seal film having flexibility, it is possible to simply enhance the compliance value of the buffer chamber.

According to the illustrative, non-limiting embodiment, since the sensor cavity constitutes a part of the flow path through which the liquid flows, it is possible to prevent erroneous detection due to staying of liquid or bubbles in the sensor cavity as much as possible.

(4) A container of an illustrative, none-limiting embodiment includes: a container body having a sending passage for sending out a liquid stored therein; a buffer chamber disposed in the vicinity of the end of the sending passage; and a sensor unit disposed to face on the buffer chamber, wherein a sensor unit provided in the sensor unit includes: a sensor cavity communicating with the buffer chamber; a vibration plate closing an opening side of the sensor cavity opposite to the side communicating with the buffer chamber; and a piezoelectric element that is disposed on a surface of the vibration plate opposite to the surface facing the sensor cavity, emits a vibration wave to the sensor cavity and the buffer chamber through the vibration plate, receives a reflected wave returning from the buffer chamber, and converts the reflected wave into an electrical signal.

The size of the buffer chamber is set to a size for avoiding cancellation of the vibration wave emitted from the sensor chip and the reflected wave returning from the buff chamber.

(5) The container according to (4), wherein the wall surface of the buffer chamber facing to the vibration plate is an open end, and wherein when the wavelength of the vibration wave emitted from the sensor chip is λ, the size H in a vibration propagating direction of a region affecting absorption of vibration in maximum among a vibration propagating space from the vibration plate to the open end of the buffer chamber is set to satisfy any one of the following expressions (1) and (2):

$$(n \times \lambda/2 - \lambda/8) \leq H \leq (n \times \lambda/2 + \lambda/8) \quad (1)$$

where n=1, 2, 3, . . .

$$0 < H \leq \lambda/8. \quad (2)$$

(6) The container according to (4), wherein the wall surface of the buffer chamber facing to the vibration plate is a closed end, and wherein when the wavelength of the vibration wave emitted from the sensor chip is λ, the size H in a vibration propagating direction of a region affecting absorption of vibration in maximum among a vibration propagating space from the vibration plate to the closed end of the buffer chamber is set to satisfy the following expression:

$$(n \times \lambda/2 - \lambda/4 - \lambda/8) \leq H \leq (n \times \lambda/2 - \lambda/4 + \lambda/8)$$

where n=1, 2, 3, . . . .

(7) The container according to (5) or (6), wherein the buffer chamber includes an upstream buffer chamber and a downstream buffer chamber adjacent to each other with a partition wall therebetween, wherein the upstream portion of the upstream buffer chamber communicates with the upstream side of the sending passage and the downstream portion of the upstream buffer chamber communicates with the sensor cavity through an upstream communication passage, wherein the upstream portion of the downstream buffer chamber communicates with the sensor cavity through a downstream communication passage and the downstream portion of the downstream buffer chamber communicates with the downstream side of the sending passage, and wherein a liquid flowing from the upstream side of the sending passage is supplied to the sensor cavity through the upstream communication passage from the upstream buffer chamber and is discharged to the downstream side of the sending passage through the downstream communication passage and the downstream buffer chamber from the sensor cavity.

(8) The container according to (7), wherein a sensor receiving wall to which the sensor unit is liquid-tightly fitted is disposed between the sensor unit and the upstream and downstream buffer chambers, wherein the sensor unit has a metal sensor base which the sensor chip is mounted on and fixed to and a resin unit base which the sensor base is mounted on and fixed to and which liquid-tightly comes in contact with the sensor receiving wall when the sensor unit is mounted on the sensor receiving wall, in addition to the sensor chip, wherein the upstream and downstream communication passages are formed in the sensor base, the unit base, and the sensor receiving wall, wherein the upstream and downstream communication passages are narrow flow paths having a smaller flow-path section than those of the upstream and downstream buffer chambers, and wherein the upstream and downstream buffer chambers other than the upstream and downstream communication passages which are the narrow flow paths are regions affecting the absorption of vibration in maximum.

According to the illustrative, non-limiting embodiment, since the buff chamber is disposed in the vicinity of the end of the sending passage for sending out a liquid, the sensor unit is disposed to face on the buffer chamber, the sensor chip of the sensor unit emits the vibration wave to the buffer chamber, and the sensor unit detects existence of the liquid inside the buffer chamber or the sensor cavity on the basis of the reflected wave returning to the sensor cavity from the buffer chamber, it is possible to detect the amount of remaining liquid without being affected by the wave motion of the liquid or the bubbles in the liquid.

Particularly, since the size of the buffer chamber is set to a size for avoiding the cancellation between the vibration wave emitted from the sensor chip and the reflected wave returning from the buffer chamber, the reflected wave can be received by the vibration plate under the condition that it is difficult to absorb the reflected wave. As a result, it is possible to enhance the counter electromotive voltage of the piezoelectric element, thereby performing detection with high sensitivity.

Here, for example, when the wall surface of the buffer chamber facing the vibration plate is an open end (when the wall surface is opened and is covered with a flexible film), it is possible to reduce the absorption of vibration by setting the size including, thereby enhancing the sensitivity.

In addition, when the wall surface of the buffer chamber facing the vibration plate is a closed end (when the wall surface is closed with a rigid wall), it is possible to reduce the absorption of vibration by setting the size including, thereby enhancing the sensitivity.

According to the illustrative, none-limiting embodiment, since the sensor cavity constitutes a part of a flow path through which the liquid flows, it is possible to prevent erroneous detection due to the staying of liquid or bubbles in the sensor cavity as much as possible.

According to the illustrative, none-limiting embodiment, since the sensor chip is disposed on the sensor base made of metal, the sensor base is disposed on the unit base made of resin, the unit base is disposed on the sensor receiving wall, and the sensor cavity and the buffer chamber communicate with each other through the communication passages formed in the sensor base, the unit base, and the sensor receiving wall, respectively, it is possible to accurately detect the amount of remaining ink without being affected by the wave motion of the ink or the bubbles in the ink. In addition, since the sensor base made of metal is interposed between the unit base and the sensor chip made of resin, it is possible to improve the acoustic characteristic. Further, since the communication passages are narrow flow paths, the reflected wave can be received by the vibration plate with the condition of small absorption, only by setting the size of the buffer chamber to the optimal condition in the acoustic characteristic. Accordingly, it is possible to maintain high sensitivity.

(9) A container of an illustrative, non-limiting embodiment includes:

a container body having a sending passage for sending out a liquid stored therein; a buffer chamber disposed in the vicinity of the end of the sending passage; and a sensor unit disposed to face on the buffer chamber, wherein a sensor unit provided in the sensor unit includes a sensor cavity communicating with the buffer chamber, a vibration plate closing an opening side of the sensor cavity opposite to the side communicating with the buffer chamber, and a piezoelectric element that is disposed on a surface of the vibration plate opposite to the surface facing the sensor cavity, emits a vibration wave to the sensor cavity and the buffer chamber through the vibration plate, receives a reflected wave returning from the buffer chamber, and converts the reflected wave into an electrical signal, wherein the buffer chamber includes an upstream buffer chamber and a downstream buffer chamber adjacent to each other with a partition wall therebetween, wherein the upstream portion of the upstream buffer chamber communicates with the upstream side of the sending passage through an inflow opening and the downstream portion of the upstream buffer chamber communicates with the sensor cavity through an upstream communication passage, wherein the upstream portion of the downstream buffer chamber communicates with the sensor cavity through a downstream communication passage and the downstream portion of the downstream buffer chamber communicates with the downstream side of the sending passage through an outflow opening, wherein a liquid flowing from the upstream side of the sending passage flows in the upstream buffer chamber through the inflow opening, enters the sensor cavity through the upstream communication passage, passes through the downstream communication passage and the downstream buffer chamber from the sensor cavity, and is discharged to the downstream side of the sending passage through the outflow opening, wherein the inflow opening communicates with the upstream buffer chamber, and wherein the flow-path section perpendicular to an ink flow in the upstream buffer chamber is set to be such a small section that a semi-spherical meniscus can be formed in one of the width direction and the height direction by the surface tension of the liquid when the liquid flows to the sensor cavity from the inflow opening.

(10) The container according to (9), wherein the upstream and downstream buffer chambers are disposed in series in a horizontal direction, wherein the sensor cavity downwardly communicates with the buffer chambers by positioning the vibration plate thereon, wherein the vibration plate is opposed to the lower surface of the buffer chambers with the sensor cavity and the communication passage therebetween, wherein the inflow opening communicates with the lower end of the upstream buffer chamber at a hidden position departing from the viewing angle as seen from the sensor cavity, and wherein the height from the lower surface of the buffer chamber to the upper surface is set to 2 mm or less.

(11) The container according to (10), wherein the diameter of the inflow opening or the distance between the opposed surfaces is set in a range of 0.6 to 0.7 mm.

(12) The container according to any one of (9) to (11), wherein a sensor receiving wall to which the sensor unit is liquid-tightly fitted is disposed between the sensor unit and the upstream and downstream buffer chambers, wherein the sensor unit has a metal sensor base which the sensor chip is mounted on and fixed to and a resin unit base which the sensor base is mounted on and fixed to and which liquid-tightly comes in contact with the sensor receiving wall when the sensor unit is mounted on the sensor receiving wall, in addition to the sensor chip, wherein the upstream and downstream communication passages are formed in the sensor base, the unit base, and the sensor receiving wall, and wherein the upstream and downstream communication passages are narrow flow paths having a smaller flow-path section than those of the upstream and downstream buffer chambers.

(13) The container according to any one of (9) to (12), further includes: a guide wall, extending between the inflow opening and an outlet of the upstream buffer chamber to the upstream communication passage, for preventing liquid from remaining at a corner portion of the upstream buffer chamber or preventing liquid remaining at the corner portion from flowing out therefrom.

(14) The container according to (13), further includes: a guide wall which extends between an inlet of the downstream buffer chamber from the downstream communication passage and the outflow opening, and that corresponds in structure to the guide wall of the upstream buffer chamber.

According to the illustrative, non-limiting embodiment, since the buff chamber is provided in the vicinity of the end of the sending passage for sending out a liquid, the sensor unit is disposed to face on the buffer chamber, the sensor chip of the sensor unit emits the vibration wave to the buffer chamber, and the sensor unit detects the liquid inside the buffer chamber or the sensor cavity on the basis of the reflected wave returning to the sensor cavity from the buffer chamber, it is possible to detect the amount of remaining liquid under the condition that it is little affected by the wave motion of the liquid or the bubbles in the liquid.

Particularly, since the flow-path section perpendicular to the ink flow of the buffer chambers is set to such a small section that a semi-spherical meniscus (a curved boundary between air and liquid) can be formed in one of the width direction and the height direction by the surface tension of the liquid when the liquid flows to the sensor cavity from the inflow opening, it is possible to prevent a phenomenon that bubbles are sent to the sensor cavity prior to the liquid. That is, since it is difficult to generate the state that the liquid and the air are mixed before the sensor chip, the waveform detected by the sensor chip is stable and it is thus easy to detect the end of the liquid.

According to the illustrative, none-limiting embodiment, since the height of the buffer chamber is set to 2 mm or less, it is possible to more surely prevent the invasion of bubbles to the sensor chip, thereby enhancing the accuracy for detecting the end of the liquid.

According to the illustrative, non-limiting embodiment, since the diameter of the inflow opening or the distance between the opposite surfaces for introducing the liquid into the buffer chamber is set to the range of 0.6 to 0.7 mm, it is possible to more surely prevent the invasion of bubbles to the sensor chip, thereby enhancing the accuracy for detecting the end of the liquid.

According to the illustrative, none-limiting embodiment, since the sensor chip is disposed on the sensor base made of metal, the sensor base is disposed on the unit base made of resin, the unit base is disposed on the sensor receiving wall, and the sensor cavity and the buffer chamber communicate with each other through the communication passages formed in the sensor base, the unit base, and the sensor receiving wall, respectively, it is possible to accurately detect the amount of remaining ink without being affected by the wave motion of the ink or the bubbles in the ink. In addition, since the sensor base made of metal is interposed between the unit base and the sensor chip made of resin, it is possible to improve the acoustic characteristic. Further, since the communication passages are narrow flow paths, the reflected wave can be received by the vibration plate with the condition of small absorption, only by setting the size of the buffer chamber to the optimal condition in the acoustic characteristic. Accordingly, it is possible to maintain high sensitivity.

According to the illustrative, non-limiting embodiment, since a guide wall is provided to extend between the inflow opening and an outlet of the upstream buffer chamber to the upstream communication passage, and to prevent liquid from remaining at a corner portion of the upstream buffer chamber or prevent liquid remaining at the corner portion from flowing out therefrom, it is possible to prevent an erroneous detection of the presence of ink caused when the remaining liquid erroneously flows into the sensor cavity after the liquid end is detected.

According to the illustrative, non-limiting embodiment, since a guide wall is provided to extend between an inlet of the downstream buffer chamber from the downstream communication passage and the outflow opening, and to correspond in structure to the guide wall of the upstream buffer chamber, it is possible to make uniform vibration characteristics of the upstream buffer chamber and the downstream buffer chamber, to thereby suppress variations of the characteristics.

(15) A container of an illustrative, none-limiting embodiment includes: a container body having a sending passage for sending out a liquid stored therein; a pair of upstream and downstream buffer chambers which are disposed in series in the vicinity of the end of the sending passage and which are adjacent to each other with a partition wall therebetween; and a sensor unit disposed to face on both upstream and downstream buffer chambers, wherein the sensor unit has a sensor chip, wherein the sensor chip includes: a sensor cavity communicating with both upstream and downstream buffer chambers to form a part of a U-shaped passage from the upstream buffer chamber to the downstream buffer chamber; a vibration plate closing an opening side of the sensor cavity opposite to the side communicating with both buffer chambers; and a piezoelectric element that is disposed on a surface of the vibration plate opposite to the surface facing the sensor cavity, emits a vibration wave to the sensor cavity, the upstream buffer chamber, and the downstream buffer chamber through the vibration plate, receives a reflected wave returning from both buffer chambers, and converts the reflected wave into an electrical signal, and wherein a bypass passage which bypasses the upstream side and the downstream side of the sensor cavity and has a flow path resistance greater than that of the sensor cavity is disposed in the flow path from the upstream buffer chamber to the downstream buffer chamber.

(16) The container according to (15), wherein the upstream and downstream buffer chambers are arranged in a horizontal direction, wherein the sensor cavity downwardly communicates with both buffer chambers by positioning the vibration plate thereon, and wherein the vibration plate is opposed to the lower surface of the buffer chambers with the sensor cavity therebetween and at least one bypass passage is formed at the lower ends of both buffer chambers.

According to the illustrative, none-limiting embodiment, since the buff chamber is provided in the vicinity of the end of the sending passage of sending out a liquid, the sensor unit is disposed to face on the buffer chamber, the sensor chip of the sensor unit emits the vibration wave to the buffer chamber, and the sensor unit detects the liquid inside the buffer chamber or the sensor cavity on the basis of the reflected wave returning to the sensor cavity from the buffer chamber, it is possible to detect the amount of remaining liquid under the condition that it is little affected by the wave motion of the liquid or the bubbles in the liquid.

Since the liquid flows to the downstream buffer chamber from the upstream buffer chamber through the U-shaped path, it is difficult to allow air to directly flow from the upstream buffer chamber to the downstream buff chamber. In addition, since the bypass passage which bypasses the upstream side and the downstream side of the sensor cavity exists in the flow path from the upstream buffer chamber to the downstream buffer chamber, it is possible to reduce the entire flow-path resistance when the liquid flows from the upstream buffer chamber to the downstream buffer chamber. Further, since the flow-path resistance of the bypass passage is greater than that of the sensor cavity, the liquid necessarily passes through the sensor cavity. Accordingly, it is possible to prevent the liquid from flowing through only the bypass passage in the state that the liquid remains in the sensor cavity, thereby surely detecting the existence of the remaining liquid.

According to the illustrative, none-limiting embodiment, since the bypass passage is provided at the bottoms of both buffer chambers, it is possible to allow the liquid to flow from the upstream side to the downstream side through the bypass passage at the bottoms without passing through the sensor cavity at the time of decrease in the amount of remaining liquid. Accordingly, it is possible to prevent the unstable detection because the liquid containing many bubbles remains in the buffer chambers and flows in the sensor cavity. That is, since the bypass passages is positioned at the bottom of the buffer chambers, the amount of bubbles remaining in the buffer chambers or passing through the sensor cavity can be reduced and the unstable detecting region can be reduced, thereby enhancing the accuracy of detection. In addition, since the liquid remaining in the upstream buffer chamber is discharged to the downstream side through the bypass passage at the bottom after the downstream buffer chamber becomes empty, the empty state of the sensor cavity is stabilized, thereby accomplishing the stable detection.

(17) A liquid sensor of an illustrative, non-limiting embodiment includes a vibration cavity forming base portion having a first surface and a second surface facing each other. A cavity for receiving a medium to be sensed is formed to be opened toward the first surface so that the bottom surface of the cavity can be vibrated. Further, the liquid sensor includes a piezoelectric element having a first electrode which is formed on the side of the second surface of the vibration cavity forming base portion, a piezoelectric layer laminated on the first electrode, and a second electrode laminated on the piezoelectric layer. Furthermore, the liquid sensor includes a flow path forming base portion laminated on the side of the first surface of the vibration cavity forming base portion. The flow path forming base portion is formed with a liquid supply path for supplying liquid to be sensed to the cavity and a liquid discharge path for discharging liquid to be sensed from the cavity. A space defined by the cavity, the liquid supply path, and the liquid discharge path is formed symmetrically with respect to the cavity center existing in a region interposed between the liquid supply path and the liquid discharge path.

In other words, the liquid sensor of the illustrative, none-limiting embodiment, which is laminated on the side of the first surface of the vibration cavity forming base portion, includes the flow path forming base portion formed with the liquid supply path for supplying liquid to be sensed to the cavity and the liquid discharge path for discharging liquid to be sensed from the cavity. Therefore, the supply of liquid into the cavity is performed through the liquid supply path, and the discharge of liquid from the cavity is performed through the liquid discharge path. Accordingly, when the liquid sensor is mounted on a container or the like for liquid to be sensed, the cavity of the liquid sensor is not exposed to the liquid storage space of liquid to be sensed, so that liquid can be supplied to the cavity through the liquid supply path.

As such, it is configured that liquid flows inside the liquid supply path and the liquid discharge path of the liquid sensor when the liquid is consumed. Therefore, even if bubbles enter the cavity, the bubbles are pushed out of the inside of the cavity by the liquid flow. Accordingly, erroneous detection of the liquid sensor can be prevented, which is caused by the bubbles accumulated inside the cavity. Further, the detection precision of the liquid sensor is enhanced and remaining liquid decreases to lead to reduced industrial waste.

Further, since the cavity does not need to be exposed to the liquid storage space, meniscus can be prevented from being formed inside the cavity when liquid passes through the liquid level. Accordingly, erroneous detection of the liquid sensor can be prevented, which is caused by the liquid remaining inside the cavity. Furthermore, the cavity is not exposed toward the liquid storage space, but is enclosed from the liquid storage space by the flow path forming base portion. Therefore, according to a change in ink level, the existence of ink and the like, a difference in the residual vibration remaining on the bottom surface of the cavity when the bottom surface of the cavity is forced to be vibrated becomes large, so that detection sensitivity becomes high to enhance detection precision and to prevent erroneous detection.

Further, since the space defined by the cavity, the liquid supply path, and the liquid discharge path is formed symmetrically with respect to the center of the cavity existing in the region interposed between the liquid supply path and the liquid discharge path, the spatial shape of the space defined by the cavity, the liquid supply path, and the liquid discharge path is made simple as well as the vibration mode of the residual vibration remaining on the bottom surface of the cavity. The cavity is a space where the vibration on the bottom surface of the cavity is propagated. Accordingly, the simulation of the residual vibration when the bottom surface of the cavity is forced to be vibrated becomes easy to perform and the difference between a design and a practice becomes small, so that adjusting operation can be simple or detection precision can be enhanced.

According to the illustrative, none-limiting embodiment, when the space defining the cavity is substantially cylindrical, the spatial shape of the cavity where the vibration on the bottom surface of the cavity is propagated is made simpler as well as the vibration mode of the residual vibration remaining on the bottom surface of the cavity. Also, the simulation of the residual vibration when the bottom surface of the cavity is forced to be vibrated becomes extremely easy to perform and the difference between a design and a practice becomes small, so that adjusting operation can be simple and detection precision can be enhanced.

According to the illustrative, none-limiting embodiment, when each of the liquid supply path and the liquid discharge path is narrowed with respect to the cavity, and their length is set so that the fluidic mass of liquid exist inside, a suitable flow-path resistance is generated in the liquid supply path and the liquid discharge path. Therefore, the pressure variation within the cavity generated by the vibration on the bottom surface of the cavity is prevented from being diffused throughout both of the buffer chambers, and an appropriate residual vibration is generated to enhance and secure detection precision.

According to the illustrative, none-limiting embodiment, in the case where the supply side buffer chamber communicating with the liquid supply path and the discharge side buffer chamber communicating with the liquid discharge path are further included, the liquid supply path and the liquid discharge path are respectively opened into the supply side buffer chamber and the discharge side buffer chamber and are not opened directly to the space where liquid to be sensed is reserved. Through the liquid supply path and the liquid discharge path, liquid flows in and from the cavity. Therefore, even though bubbles are produced in the liquid reservoir space due to the vibration of liquid or the like, the bubbles are previously trapped in the supply side buffer chamber and the discharge side buffer chamber so that it hardly enters the cavity. Accordingly, erroneous detection of the liquid sensor caused by the bubbles accumulated inside the cavity can be prevented.

Further, since the liquid supply path and the liquid discharge path, through which liquid flows in and from the cavity, are not opened directly to the liquid reservoir space but are opened respectively into the supply side buffer chamber and the discharge side buffer chamber, the liquid pressure generated in the liquid reservoir space does not act directly on the cavity. Therefore, erroneous detection of the liquid sensor caused by the influence of the pressure due to the vibration of liquid can be prevented.

According to the illustrative, none-limiting embodiment, since the supply side buffer chamber and the discharge side buffer chamber is formed symmetrically with respect to the center of the cavity, the shape of the members constituting both of the buffer chambers can be made simple, the manufacture of the members becomes easy, and the members can be miniaturized.

According to the illustrative, none-limiting embodiment, when each of the supply side buffer chamber and the discharge side buffer chamber has at least ten times larger volume than the cavity, the pressure variation of liquid generated in the liquid reservoir space within the liquid container does not exert any influence on the sensor characteristics of the liquid sensor, so that erroneous detection of the liquid sensor caused by the influence of the pressure due to the vibration of liquid or the like can be prevented. Further, since the pressure within both of the buffer chambers does not increase due to the vibration on the bottom surface of the cavity, an unnecessary vibration is not generated and the vibration mode of the residual vibration remaining on the bottom surface of the cavity is made simple, which makes it possible to enhance detection precision.

(18) A liquid container of an illustrative, none-limiting embodiment includes a container body having a liquid delivery opening for delivering the liquid reserved inside to the outside and a liquid sensor mounted on the container body. The liquid sensor includes a vibration cavity forming base portion having a first surface and a second surface facing each other. A cavity for receiving a medium to be sensed is formed to be opened toward the first surface so that the bottom surface of the cavity can be vibrated. Further, the liquid sensor includes a piezoelectric element having a first electrode which is formed on the side of the second surface of the vibration cavity forming base portion, a piezoelectric layer laminated on the first electrode, and a second electrode laminated on the piezoelectric layer. Furthermore, the liquid sensor includes a flow path forming base portion laminated on the side of the first surface of the vibration cavity forming base portion. The flow path forming base portion is formed with a liquid supply path for supplying liquid to be sensed to the cavity and a liquid discharge path for discharging liquid to be sensed from the cavity. A space defined by the cavity, the liquid supply path, and the liquid discharge path is formed symmetrically with respect to the cavity center existing in a region interposed between the liquid supply path and the liquid discharge path, and the liquid inside the container body is supplied to the cavity through the liquid supply path of the liquid sensor and discharged from the cavity through the liquid discharge path.

In other words, the liquid container of the illustrative, non-limiting embodiment, which is laminated on the side of the first surface of the vibration cavity forming base portion, includes the flow path forming base portion formed with the liquid supply path for supplying liquid to be sensed to the cavity and the liquid discharge path for discharging liquid to be sensed from the cavity. Therefore, the supply of liquid into the cavity is performed through the liquid supply path, and the discharge of liquid from the cavity is performed through the liquid discharge path. Accordingly, when the liquid sensor is mounted on the liquid container, the cavity of the liquid sensor is not exposed to the liquid storage space within the container body of the liquid container, so that the liquid inside the container body can be supplied to the cavity through the liquid supply path.

As such, it is configured that liquid flows inside the liquid supply path and the liquid discharge path of the liquid sensor when the liquid within the liquid container is consumed. Therefore, even if bubbles enter the cavity, the bubbles are pushed out of the inside of the cavity by the liquid flow. Accordingly, erroneous detection of the liquid sensor can be prevented, which is caused by the bubbles accumulated inside the cavity.

Further, since the cavity does not need to be exposed to the liquid storage space, meniscus can be prevented from being formed inside the cavity when liquid passes through the liquid level. Accordingly, erroneous detection of the liquid sensor can be prevented, which is caused by the liquid remaining inside the cavity. Furthermore, the cavity is not exposed toward the liquid storage space, but is enclosed from the liquid storage space by the flow path forming base portion. Therefore, according to the change in liquid level, the existence of liquid and the like, a difference in the residual vibration remaining on the bottom surface of the cavity when the bottom surface of the cavity is forced to be vibrated becomes large, so that detection sensitivity becomes high to enhance detection precision and to prevent erroneous detection.

Further, since the space defined by the cavity, the liquid supply path, and the liquid discharge path is formed symmetrically with respect to the center of the cavity existing in the region interposed between the liquid supply path and the liquid discharge path, the spatial shape of the space defined by the cavity, the liquid supply path, and the liquid discharge path is made simple as well as the vibration mode of the residual vibration remaining on the bottom surface of the cavity. The cavity is a space where the vibration on the bottom surface of the cavity is propagated. Accordingly, the simulation of the residual vibration when the bottom surface of the cavity is forced to be vibrated becomes easy to perform and the difference between a design and a practice becomes small, so that adjusting operation can be simple and detection precision can be enhanced.

According to the illustrative, none-limiting embodiment, when the space defining the cavity of the liquid sensor is substantially cylindrical, the spatial shape of the cavity where the vibration on the bottom surface of the cavity is propagated is made simpler as well as the vibration mode of the residual vibration remaining on the bottom surface of the cavity. Further, the simulation of the residual vibration when the bottom surface of the cavity is forced to be vibrated becomes extremely easy to perform and the difference between a design and a practice becomes small, so that adjusting operation can be simple and detection precision can be enhanced.

According to the illustrative, none-limiting embodiment, when the liquid supply path and the liquid discharge path is respectively narrowed with respect to the cavity and their length is set so that the fluidic mass of liquid exist inside, a suitable flow-path resistance is generated in the liquid supply path and the liquid discharge path. Therefore, the pressure variation within the cavity generated by the vibration on the bottom surface of the cavity is prevented from being diffused throughout both of the buffer chambers, and an appropriate residual vibration is generated to enhance and secure detection precision.

According to the illustrative, none-limiting embodiment, when the liquid sensor includes a supply side buffer chamber communicating with the liquid supply path and a discharge side buffer chamber communicating with the liquid discharge path, the liquid supply path and the liquid discharge path, through which liquid flows in and from the cavity, respectively are opened into the supply side buffer chamber and the discharge side buffer chamber, and are not opened directly to the liquid reservoir space of the container body. Therefore, even though bubbles are produced in the liquid reservoir space due to the vibration of liquid or the like, the bubbles are previously trapped in the supply side buffer chamber and the discharge side buffer chamber so that the bubbles hardly enters the cavity. Accordingly, erroneous detection of the liquid sensor caused by the bubbles accumulated inside the cavity can be prevented. In this case, when the liquid sensor is disposed in the vicinity of the bottom of the liquid container, the effect of preventing entering of bubbles is further enhanced.

Further, since the liquid supply path and the liquid discharge path, through which liquid flows in and from the cavity, are not opened directly to the liquid reservoir space of the container body but are opened respectively into the supply side buffer chamber and the discharge side buffer chamber, the liquid pressure generated in the liquid reservoir space within the liquid container does not act directly on the cavity. Therefore, erroneous detection of the liquid sensor caused by the influence of the pressure due to the vibration of liquid or the like can be prevented.

According to the illustrative, none-limiting embodiment, since the supply side buffer chamber and the discharge side buffer chamber of the liquid sensor is formed symmetrically with respect to the center of the cavity, the shape of the members constituting both of the buffer chambers can be made simple, the manufacture of the members can be easy, and the members can be miniaturized.

According to the illustrative, none-limiting embodiment, when the supply side buffer chamber and the discharge side buffer chamber of the liquid sensor respectively have at least ten times larger volume than the cavity, the pressure variation of liquid generated in the liquid reservoir space within the liquid container does not exert any influence on the sensor characteristics of the liquid sensor, so that erroneous detection of the liquid sensor caused by the influence of the pressure due to the vibration of liquid or the like can be prevented. Further, since the pressure within both of the buffer chambers does not increase due to the vibration on the bottom surface of the cavity, an unnecessary vibration is not generated and the vibration mode of the residual vibration remaining on the bottom surface of the cavity is made simple, which makes it possible to enhance detection precision.

According to the illustrative, none-limiting embodiment, the supply side buffer chamber communicates with a liquid reservoir chamber which constitutes a major part of an inner space of the container body to reserve liquid, and the discharge side buffer chamber communicates with a liquid delivery space which communicates with the liquid delivery opening for delivering the liquid reserved inside to the outside, in the inner space of the container body. In this case, the liquid reserved in the liquid reservoir chamber of the container body flows from the entrance of the supply side buffer chamber of the liquid sensor to be discharged from the exit of the discharge side buffer chamber to be finally delivered to the liquid delivery opening of the container body. Further, all the liquid to be delivered to the liquid delivery opening of the container body passes through the supply side buffer chamber, the cavity, and the discharge side buffer chamber of the liquid sensor in advance, so that a consumption of liquid can be sensed reliably.

The present disclosure relates to the subject matter contained in Japanese patent application Nos. 2004-359551 (filed on Dec. 13, 2004)), 2005-140433 (filed on May 12, 2005), 2005-140434 (filed on May 12, 2005), 2005-140435 (filed on May 12, 2005), 2005-140436 (filed on May 12, 2005) and 2005-329050 (filed on Nov. 14, 2005), each of which is expressly incorporated herein by reference in its entirety.

BRIEF DESCRIPTION OF THE DRAWINGS

FIGS. 7A and 7B are diagrams illustrating a driving-pulse waveform and a counter-electromotive-force waveform in the liquid sensor according to the embodiment of the present invention, in which FIG. 7A is a waveform diagram when ink exists in a cavity and FIG. 7B is a waveform diagram when ink does not exist in the cavity.

BEST MODE FOR CARRYING OUT THE INVENTION

Hereinafter, a liquid sensor according to an embodiment of the present invention and an ink cartridge (liquid container) including the liquid sensor will be described with reference to the drawings.

Figure 1:
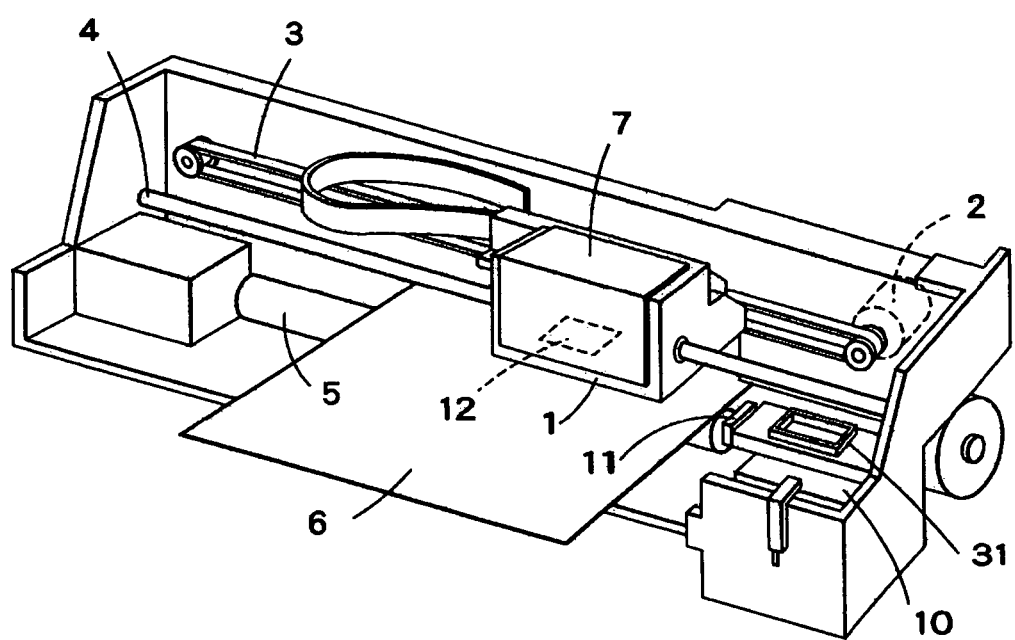
FIG. 1 is a perspective view illustrating a schematic configuration of an inkjet-type printing device in which an ink cartridge including a liquid sensor according an embodiment of the present invention is used.

FIG. 1 is a perspective view illustrating a schematic configuration of an inkjet-type printing device (liquid jetting device) in which the ink cartridge according an embodiment of the present invention is used. The reference numeral 1 represents a carriage, which is guided by a guide member 4 through a timing belt 3 driven by a carriage motor 2 to reciprocate in the axial direction of a platen 5.

An inkjet-type printing head 12 is mounted on the side of the carriage 1 facing a printing paper 6 and an ink cartridge 7 for supplying ink to the printing head 12 is detachably mounted on the upper portion.

In a home position (the right side in FIG. 1) where printing is not performed by the printing device, a cap member 31 is disposed. When the printing head 12 mounted on the carriage 1 moves to the home position, the cap member 31 is pressed against a nozzle forming surface of the printing head 12 to form the closed space between the cap member 31 and the nozzle forming surface. A pump unit 10 for applying a negative pressure to the closed space formed by the cap member 31 to perform cleaning or the like is disposed below the cap member 31.

In the vicinity of the printing region side of the cap member 31, a wiping unit 11 including an elastic plate such as rubber or the like is disposed so as to advance and retreat in the horizontal direction with respect to the moving locus of the printing head 12. Therefore, when the carriage 1 reciprocates toward the cap member 31, the nozzle forming surface of the printing head 12, if necessary, can be wiped off. Next, a liquid sensor and an ink cartridge including the liquid sensor according to the present invention will be described.

Figure 2:
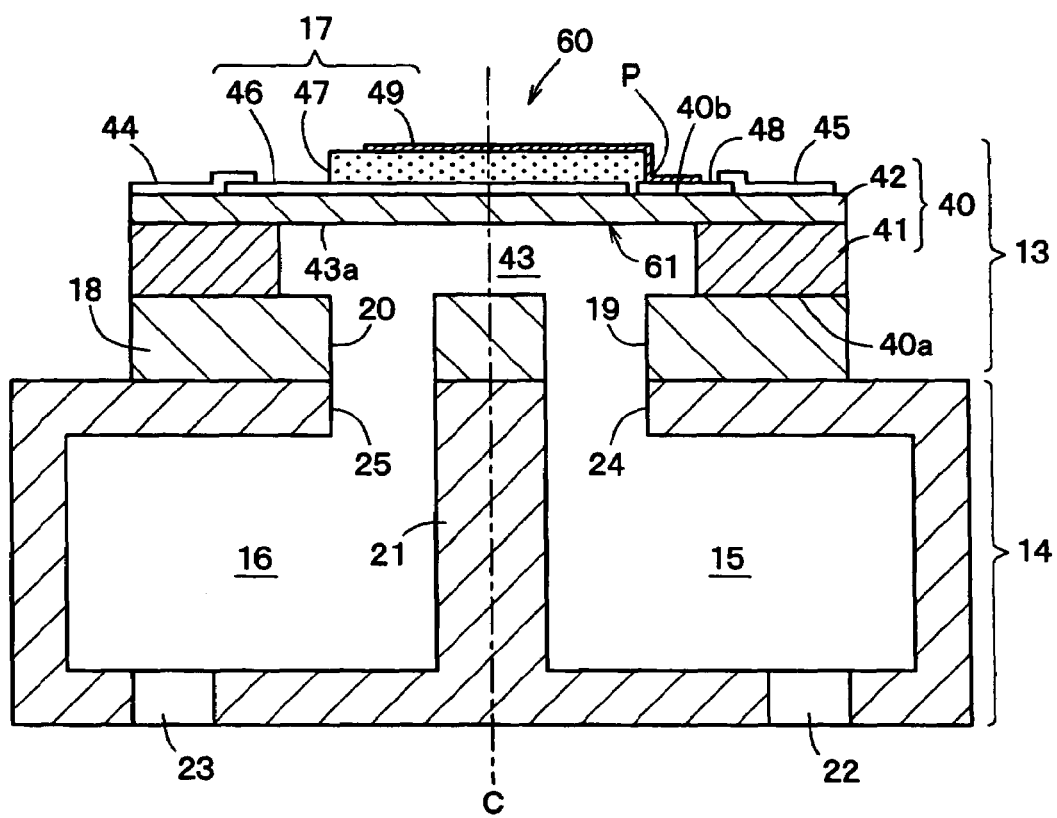
FIG. 2 is a cross-sectional view taken along an A-A line in FIG. 3 of the liquid sensor according to the embodiment of the present invention.
Figure 3A:
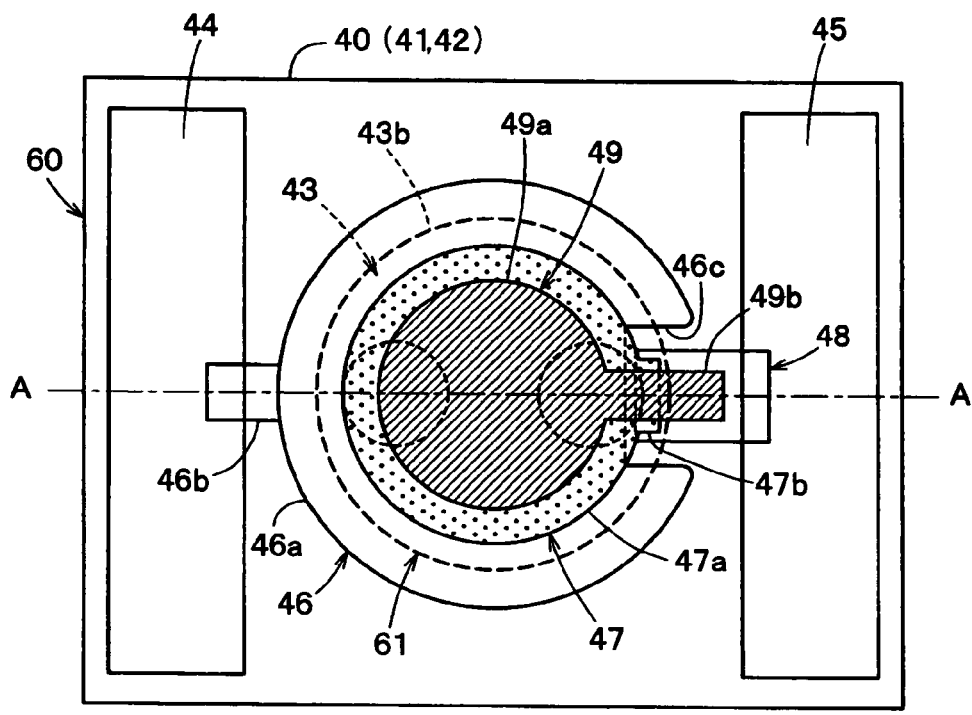
FIG. 3A is a plan view illustrating a sensor portion of the liquid sensor and FIG. 3B is a bottom view illustrating the same.
Figure 3B:
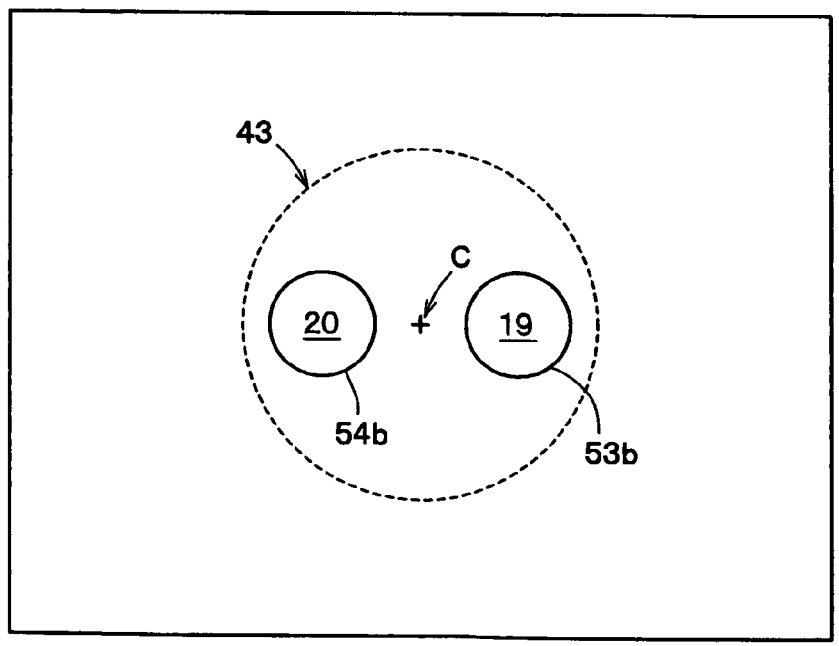
Figure 4:
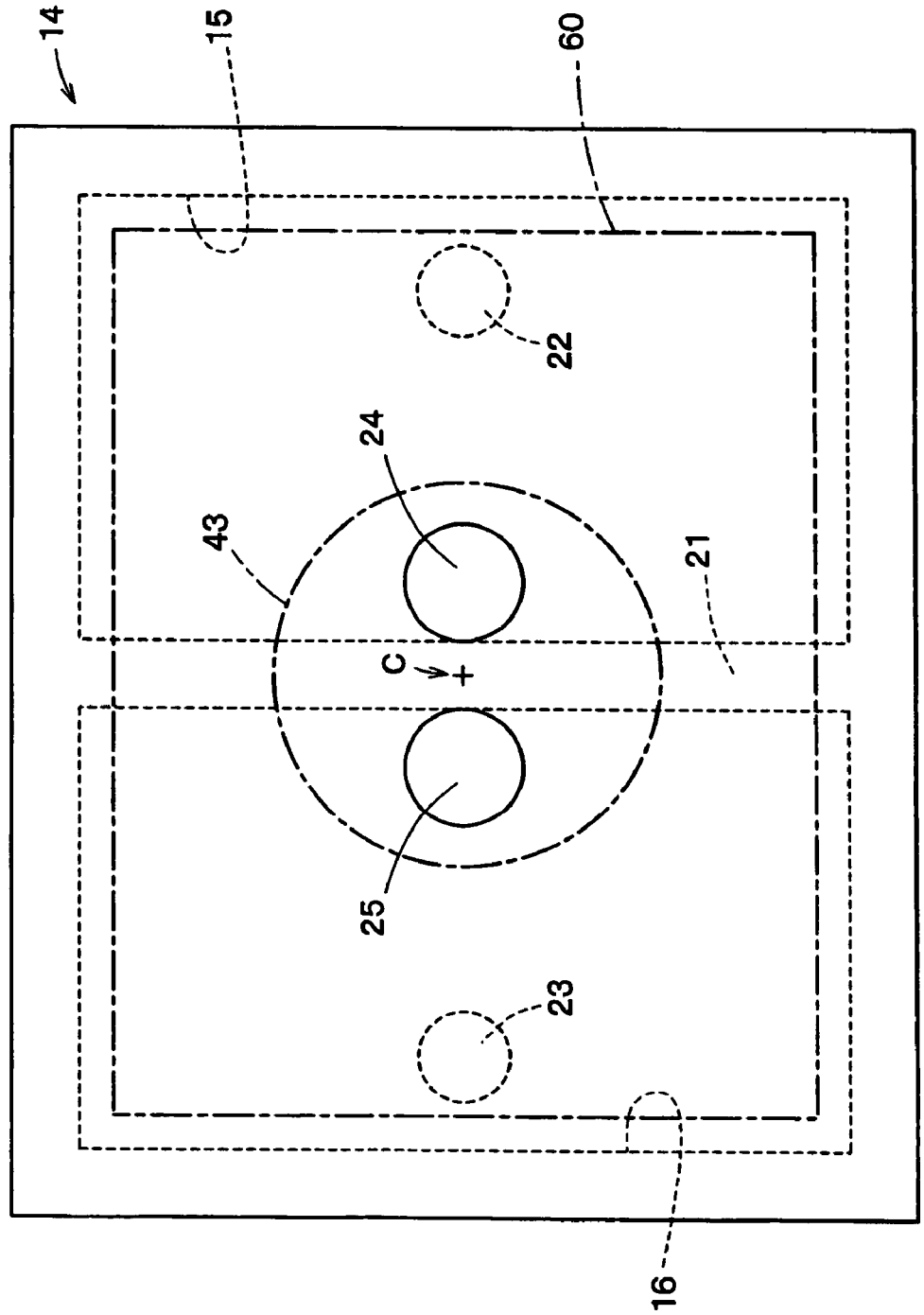
FIG. 4 is a plan view illustrating a buffer portion of the liquid sensor.

FIG. 2 is a cross-sectional view illustrating the liquid sensor 60 of the present invention. Further, FIG. 3 is a diagram illustrating a sensor portion 13 constituting the liquid sensor 60 and FIG. 4 is a diagram illustrating a buffer portion 14 constituting the liquid sensor 60.

The liquid sensor 60 is configured so as to include the sensor portion 13 having a cavity 43 and the buffer portion 14 having a supply side buffer chamber 15 and a discharge side buffer chamber 16 which communicate with the cavity 43.

The sensor portion 13, which is configured so that a vibration plate 42 is laminated on a cavity plate 41, includes a vibration cavity forming base portion 40 having a first surface 40a and a second surface 40b which face each other, a piezoelectric element 17 laminated on the side of the second surface 40b of the vibration cavity forming base portion 40, and a flow path forming plate (flow path forming base portion) 18 laminated on the side of the first surface 40a of the vibration cavity forming base portion 40.

In the vibration cavity forming base portion 40, the cavity 43 for receiving medium (ink) to be sensed is defined by a cylindrical space so as to be opened into the first surface 40a and a bottom portion 43a of the cavity 43 is formed so as to be vibrated by the vibration plate 42. In other word, an outline of an actually vibrated portion in the entire vibration plate 42 is defined by the cavity 43. On both ends of the vibration cavity forming base 40 on the side of the second surface 40b, a lower electrode terminal 44 and an upper electrode terminal 45 are formed.

On the second surface 40b of the vibration cavity forming base 40, the lower electrode (a first electrode) 46 is formed, which has a main-body portion 46a having a substantially circular shape and an extension portion 46b which extends out toward the lower electrode terminal 44 from the main-body portion 46 to be connected the lower electrode terminal 44. The center of the substantially circular main-body portion 46a of the lower electrode 46 is brought into line with the center axis C of the cavity 43.

The substantially circular main-body portion 46a of the lower electrode 46 is formed so as to have a larger diameter than the circular cavity 43, covering a substantially entire portion of the region which corresponds to the cavity 43. Further, the substantially circular main-body portion 46a of the lower electrode 46 includes a notched portion 46c which is formed so as to be further inside than a position corresponding to a peripheral edge 43b of the cavity 43.

On the lower electrode 46, a piezoelectric layer 47 is laminated, which has a circular main-body portion 47a formed with a smaller diameter than the cavity 43 and a projecting portion 47b projecting from the main-body portion 47a in the range of the region corresponding to the cavity 43. As can be seen from FIG. 2, the entire portion of the piezoelectric layer 47 falls in the range of the region corresponding to the cavity 43. In other words, the piezoelectric layer 47 does not have any portion extending across the position corresponding to a peripheral edge 43b of the cavity 43.

The center of the main-body portion 47a of the piezoelectric layer 47 is brought into line with the center axis C of the cavity 43. The substantially entire portion of the main-body portion 47a of the piezoelectric layer 47 is laminated on the lower electrode 46, except for a portion corresponding to the notched portion 46c of the lower electrode 46.

In the second surface 40b of the vibration cavity forming base portion 40, an auxiliary electrode 48 is formed, which extends cross the position corresponding to the peripheral edge 43b of the cavity 43 to the inside of the region corresponding to the cavity 43, from the outside of the region corresponding to the cavity 43. A portion of the auxiliary electrode 48 is positioned inside the notched portion 46c of the lower electrode (the first electrode) 46 to support the projecting portion 47b of the piezoelectric layer 47 and an adjacent portion thereof from the second surface 40b of the vibration cavity forming base portion 40. The auxiliary electrode 48 is preferably made of the same material as the lower electrode 46 and has the same thickness as the lower electrode 46. As such, the projecting portion 47b of the piezoelectric layer 47 and the adjacent portion thereof are supported from the second surface 40b of the vibration cavity forming base portion 40 by the auxiliary electrode 48, so as not to cause a level difference in the piezoelectric layer 47, so that a mechanical strength can be prevented from be reduced.

On the piezoelectric layer 47, the circular main-body portion 49a of the upper electrode (the second electrode) 49 is laminated, the upper electrode 49 being formed with a smaller diameter than the main-body portion 47a of the piezoelectric layer 47. Further, the upper electrode 49 has an extension portion 49b which extends from the main-body portion 49a to be connected to the auxiliary electrode 48. As can be seen from FIG. 2, a position P, from which the extension portion 49b of the upper electrode 49 is connected to the auxiliary electrode 48, is positioned in the range of the region corresponding to the cavity 43.

The piezoelectric element 17 is formed by the respective main-body portions of the upper electrode 46, the piezoelectric layer 47 and upper electrode 49.

As can be seen from FIG. 3, the upper electrode 49 is electrically connected to the upper electrode terminal 45 through the auxiliary electrode 48. As such, when the upper electrode 49 is electrically connected to the upper electrode terminal 45 through the auxiliary electrode 48, a level difference caused by the total thickness of the piezoelectric layer 47 and the upper electrode 46 can be absorbed by both of the upper electrode 49 and the auxiliary electrode 48. As a result, it can be prevented that a large level difference is caused in the upper electrode 49 to reduce a mechanical strength.

The main-body portion 49a of the upper electrode 49 is formed in a circular shape, of which the center is brought into line with the center axis C of the cavity 43. The main-body portion 49a of the upper electrode 49 is formed with a smaller diameter than any one of the main-body portion 47a of the piezoelectric layer 47 and the cavity 43.

As such, the main-body 47a of the piezoelectric 47 is configured so as to be interposed between the main-body portion 49a of the upper electrode 49 and the main-body portion 46a of the lower electrode 46. Accordingly, the piezoelectric layer 47 can be efficiently driven to be deformed.

Moreover, between the main-body 46a of the lower electrode 46 and the main-body portion 49a of the upper electrode 49 which are connected with the piezoelectric layer 47, the main-body portion 49a of the upper electrode 49 has the smaller diameter. Accordingly, the main-body portion 49a of the upper electrode 49 comes to determine the portion where a piezoelectric effect is produced in the piezoelectric layer 47.

The center of each of the main-body portion 47a of the piezoelectric layer 47, the main-body portion 49a of the upper electrode 49, and the main-body portion 46a of the lower electrode 46a is brought into line with the center axis C of the cavity 43. Further, the center axis C of the cylindrical cavity 43 for determining the portion which can be vibrated in the vibration plate 42 is positioned in the center of the liquid sensor 60.

A vibration portion 61 of the liquid sensor 60 is constituted with the portion which is defined by the cavity 43 and can be vibrated in the vibration plate 42, the portion corresponding to the cavity 43 in the main-body portion 46a of the lower electrode 46, and the portions corresponding to the cavity 43 in the main-body portion 49a and the extension portion 49b of the upper electrode 49 together with the main-body portion 47a and the projecting portion 47b of the piezoelectric layer 47. Also, the center of the vibration portion 61 of the liquid sensor 60 is brought into line with the center of the liquid sensor 60.

The main-body portion 47a of the piezoelectric layer 47, the main-body portion 49a of the upper electrode 49, the main body 46a of the lower electrode 46, and the portion which can be vibrated in the vibration plate 42 (that is, the portion corresponding to the bottom portion 43a of the cavity 43) have a circular shape and are disposed in the entire portion of the piezoelectric layer 47, that is, inside the region where the main-body portion 47a and the projecting portion 47b of the piezoelectric layer 47 correspond to the cavity 43. Therefore, the vibration portion 61 of the liquid sensor 60 is substantially symmetric with respect to the center of the liquid sensor 60.

Further, the liquid sensor 60 according to the present embodiment includes a flow path forming plate (flow path forming base portion) 18 which is laminated on and joined to the first surface 40a of the vibration cavity forming base portion 40.

The flow path forming plate 18, are formed with an ink supply path (liquid supply path) 19 for supplying ink to be sensed to the cavity 43 and an ink discharge path (liquid discharge path) 20 for discharging ink to be sensed from the cavity 43. The ink supply path 19 and the ink discharge path 20 have the same size and are defined by a cylindrical space.

Any one of the ink supply path 19 and the ink discharge path 20 formed in the above-described flow path forming plate 18 is formed inside the region corresponding to the circular cavity 43, and the ink supply path 19 and the ink discharge path 20 are disposed symmetrically with respect to the center axis C of the cavity 43. Accordingly, the space, which is defined by the cavity 43, the ink supply path 19, and the ink discharge path 20, is formed symmetrically with respect to the center axis C of the cavity 43 which exists in the region interposed between the ink supply path 19 and the ink discharge path 20.

Further, the ink supply path 19 and the ink discharge path 20 are narrowed with respect to the cavity 43. That is, in this embodiment, each of the ink supply path 19 and the ink discharge path 20 is formed in the single cavity 34, but the flow-path area of one of the flow paths (the ink supply path 19 or the ink discharge path 20) is set to be smaller than at least one half of the area of the cavity 43. Further, the ink supply path 19 and the ink discharge path 20 is set to a certain length so that the fluidic mass of liquid exists inside, and the flow-path length of each of the ink supply path 19 and the ink discharge path 20 may be set to be two times larger than the flow-path diameter of each of the ink supply and discharge paths.

Meanwhile, the liquid sensor 60 includes a buffer portion 14 having the supply side buffer chamber 15 communicating with the ink supply path 19 and the discharge side buffer chamber 16 communicating with the ink discharge path 20.

From a plan view in this embodiment, the buffer portion 14 having a rectangular shape is slightly larger than the liquid sensor 60 (the sensor portion 13) and is formed in a cubical shape as a whole. The inside of the buffer portion 14 is divided into two spaces having the same volume by a partitioning wall 21 disposed in the center. One of the two spaces is the supply side buffer chamber 15 and the other one is the discharge side buffer chamber 16.

A portion of the buffer portion 14 opposite to the surface to which the sensor portion 13 is joined, is formed with an inflow opening 22 through which ink flows into the supply buffer chamber 15 and a discharge opening 23 for discharging ink of the discharge side buffer chamber 16. Further, the surface to which the sensor portion 13 of the buffer portion 14 is joined, is formed with an inflow flow path 24 for supplying the ink flowing into the supplying buffer chamber 15 to the cavity 43 through the ink supply path 19 and a discharge flow path 25 for discharging the ink of the cavity 43 to the supply side buffer chamber 15 through the ink discharge path 20.

The inflow flow path 24 and the discharge flow path 25 are defined by a flow-path space having a substantially cylindrical shape, which have the same size. Further, openings of the inflow flow path 24 and the discharge flow path 25 are respectively matched with openings of the ink supply path 19 and the ink discharge path 20. In the present embodiment, the liquid supply path of the present invention is formed with the ink supply path 19 and the inflow flow path 24 and the liquid discharge path of the present invention is formed with the ink discharge path 20 and the discharge flow path 25.

The supply side buffer chamber 15 and the discharge side buffer chamber 16 of the liquid sensor 60 are formed symmetrically with respect to the center axis C of the cavity 43. In other words, the space defined by the cavity 43, the ink supply path 19, the ink discharge path 20, the inflow flow path 24, the discharge flow path 25, the supply side buffer chamber 15, and the discharge buffer chamber 16 is formed symmetrically with respect to the center axis C of the cavity 43.

Further, the volume of each of the supply side buffer chamber 15 and the discharge side buffer chamber 16 of the liquid sensor 60 is set to be at least ten times larger than the cavity 43.

Under such a configuration, the ink to be sensed inside the cartridge flows from the inflow opening 22 into the supply side buffer chamber 15 to be supplied to the cavity 43 through the inflow flow path 24 and the ink supply path 19. Also, the ink supplied to the cavity 43 is discharged into the discharge side buffer chamber 16 through the ink discharge path 20 and the discharge flow path 25 and further discharged from the discharge side buffer chamber 16 through the discharge opening 23.

Among the members included in the liquid sensor 60, the cavity plate 41, the vibration plate 42, and the flow path forming plate 18 are made of the same material and integrally formed by being sintered with one another. As such, since a plurality of substrates is sintered to be integrated, handling of the liquid sensor 60 becomes easy. Further, since the respective members are made of the same material, a crack can be prevented from occurring due to the difference among their linear expansion coefficients.

As a material of the piezoelectric layer 47, it is preferable that lead zirconate titanate (PZT), lead lanthanum zirconate titanate (PLZT), or a leadless piezoelectric film is used. As a material of the cavity plate 41, zirconia or alumina is preferably used. Further, for the vibration plate 42, the same material as that of the cavity plate 41 is preferably used. The upper electrode 49, the lower electrode 46, the upper electrode terminal 45 and the lower electrode terminal 44 can be made of metallic materials such as gold, silver, copper, platina, aluminum, nickel, and the like, which have a conductivity.

Figure 5A:
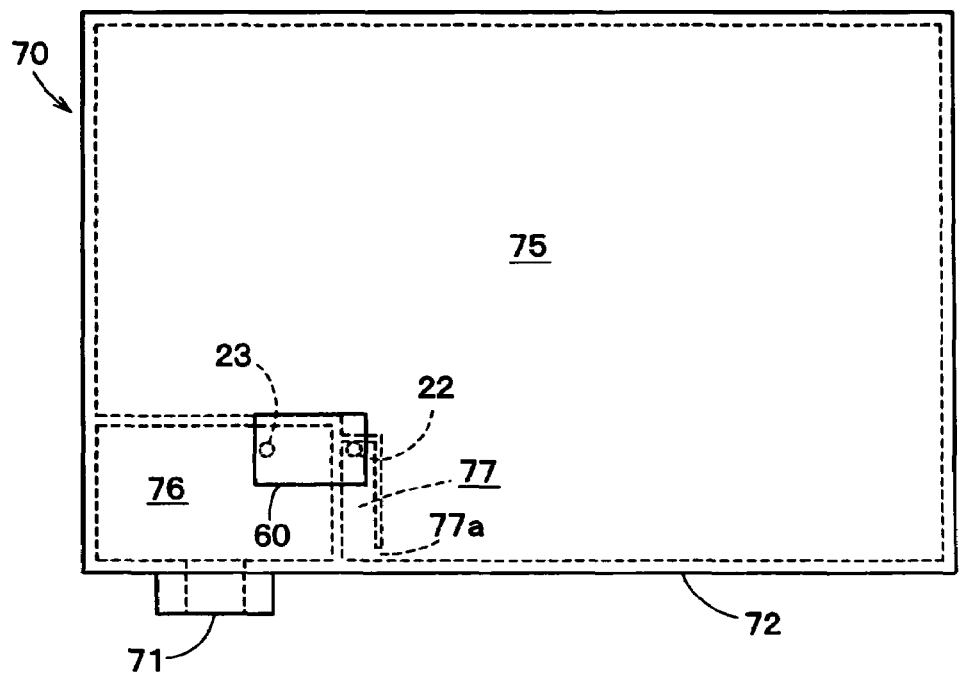
FIG. 5A is a side view illustrating the ink cartridge including the liquid sensor and FIG. 5B is a front view illustrating the same.
Figure 5B:
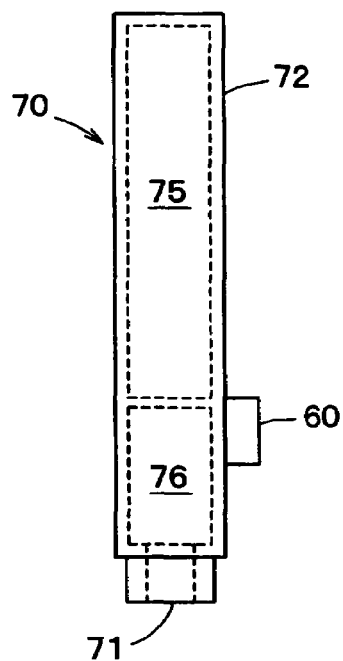
Figure 6:
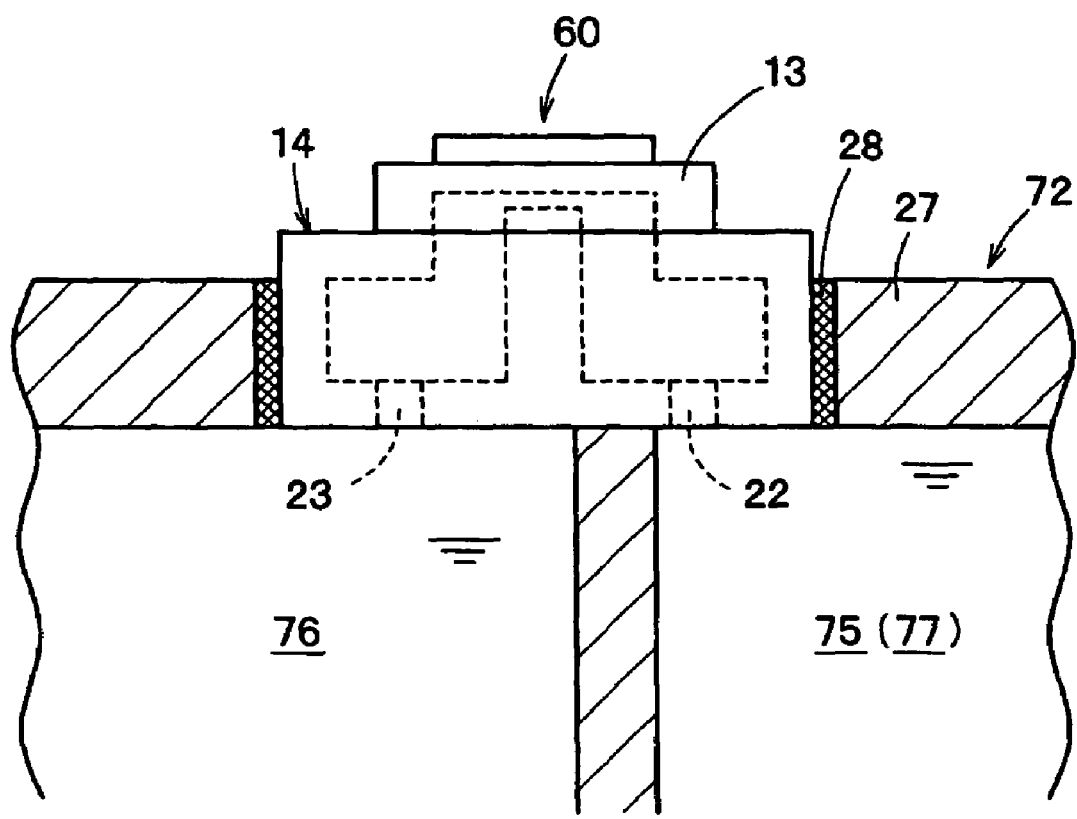
FIG. 6 is an enlarged cross-sectional view illustrating a mounting portion of the liquid sensor of the ink cartridge.

FIG. 5 is a diagram illustrating the ink cartridge 70 of the present invention including the liquid sensor and FIG. 6 is a diagram illustrating an example of the liquid sensor mounted on the ink cartridge 70.

FIG. 5 shows the ink cartridge (liquid container) 70 with the liquid sensor 60 mounted thereon. The ink cartridge 70 includes a container body 72 having an ink outlet port (liquid outlet port) 71 for delivering the ink reserved inside to the outside.

As shown in FIG. 6, the liquid sensor 60 as a whole is mounted on the container body 72. On a rectangular opening 26 formed on a wall surface 27 of the container body 72, the buffer portion 14 is fixed in a liquid-tight manner by an adhesive 28 or the like. In this case, the sensor portion 13 of the liquid sensor 60 is disposed outside the container body 72 so that an inflow opening 22 and a discharge opening 23 of the buffer portion 14 are opened inside the container body 72.

The inside of the container body 72 (refer back to FIG. 5) is partitioned into a main reservoir chamber (liquid reservoir chamber) 75, which constitutes the major part of the entire inner space of the container body 72 to reserve ink, and a sub reservoir chamber (liquid delivery space) 76 having a smaller volume than the main reservoir chamber 75. The main reservoir chamber 75 is separated from the sub reservoir chamber 76. The sub reservoir chamber 76 is positioned in the side which is closer to the ink delivery opening 71 than to the main reservoir chamber 75 in the flow direction of ink when the ink is consumed.

The inflow opening 22 of the liquid sensor 60 is opened so as to communicate with the main reservoir chamber 75, and the discharge opening 23 is disposed so as to be opened into the sub reservoir chamber 76 which is the liquid delivery space. Accordingly, the supply side buffer chamber 15 constitutes the major part of the inner space of the container body 72 to communicate with the main reservoir chamber 75 for reserving liquid. Further, the discharge side buffer chamber 16 is disposed so as to communicate with the liquid delivery space in the inner space of the container body 72. The liquid delivery space communicates with the ink delivery opening 71 for delivering the ink reserved inside to the outside.

A closed auxiliary flow path 77 is formed inside the main reservoir chamber 75, and, an auxiliary flow path entrance 77a is formed at a lower end of the auxiliary flow path 77. The auxiliary flow path entrance 77a is positioned at the lower end inside the main reservoir chamber 75. Further, the inflow opening 22 of the liquid sensor 60 communicates with an upper end of the auxiliary flow path 77 to constitute an exit of the auxiliary flow path 77.

As described above, the inflow opening 22 of the liquid sensor 60 communicates with the main reservoir chamber 75 through the auxiliary flow path 77, and the discharge opening 23 communicates with the ink delivery opening 71 through the sub reservoir chamber 76. Accordingly, the ink reserved in the main reservoir chamber 75 flows in the supply side buffer chamber 15 from the inflow opening 22 via the auxiliary flow path 77 to be supplied to the cavity 43 through the inflow flow path 24 and the ink supply path 19. Then, the ink supplied to the cavity 43 is discharged into the discharge side buffer chamber 16 through the ink discharge flow path 20 and the inflow flow path 25, and the ink is discharged from the ink delivery opening 71 via the discharge opening 23 and the sub reservoir chamber 76 from the discharge side buffer chamber 16, to be finally supplied to the printing head 12.

In the present embodiment having such a configuration, all the ink to be delivered to the ink delivery opening 71 through the sub reservoir chamber 76 passes through the ink supply path 19 and the ink discharge path 20 of the liquid sensor 60 in advance.

Next, an operation of sensing liquid in the above-described liquid container will be described.

In the ink cartridge 70 including the above-described liquid sensor 60, when ink sufficiently remains in the container body 72 so that the inside of the sub reservoir chamber 76 is filled with the ink, the cavity 43 is filled with the ink. On the other hand, if the liquid inside the container body 72 of the ink cartridge 7 is consumed so that the main reservoir chamber 75 runs out of ink, the liquid level within the sub reservoir chamber 76 falls down. Further, if the liquid level falls more downward than the position of the cavity 43 of the liquid sensor 60, there is no more ink in the cavity 43.

Subsequently, the liquid sensor 60 detects a difference in acoustic impedance caused by the state change. With that, the liquid sensor 60 can sense whether ink sufficiently remains in the container body 72 or ink has been consumed above a certain amount.

More specifically in the liquid sensor 60, a voltage is applied between the upper electrode 49 and the lower electrode 46 through the upper electrode terminal 45 and the lower electrode terminal 44. In that case, in the piezoelectric layer 47, an electric field is generated in the portion interposed between the upper electrode 49 and the lower electrode 46. The piezoelectric layer 47 is deformed by the electric field. If the piezoelectric layer 47 is deformed, a flexural vibration is generated in the vibrated region of the vibration plate 42 (the region corresponding to the bottom portion 43a of the cavity 43). If the application of the voltage is released after the piezoelectric layer 47 is forced to be deformed as described above, the flexural vibration remains in the vibration portion 61 of the liquid sensor 60 for a while.

The residual vibration is a free vibration between the vibration portion 61 of the liquid sensor 60 and the medium within the cavity 43. Accordingly, when the voltage having a pulse wave form or a rectangular wave form is applied to the piezoelectric layer 47, a resonant condition between the vibration portion 61 and the medium after the voltage is applied can be easily obtained. The residual vibration is the vibration of the vibration portion 61 of the liquid sensor 60, accompanied by the deformation of the piezoelectric layer 47. For this reason, with the residual vibration, the piezoelectric layer 47 generates a back electromotive force. The back electromotive force is detected through the upper electrode 49, the lower electrode 46, the upper electrode terminal 45, and the lower electrode terminal 44. Since a resonant frequency can be specified by the detected back electromotive force, the existence of ink within the container body 72 of the ink cartridge 7 can be sensed on the basis on the resonant frequency.

Figure 7A:
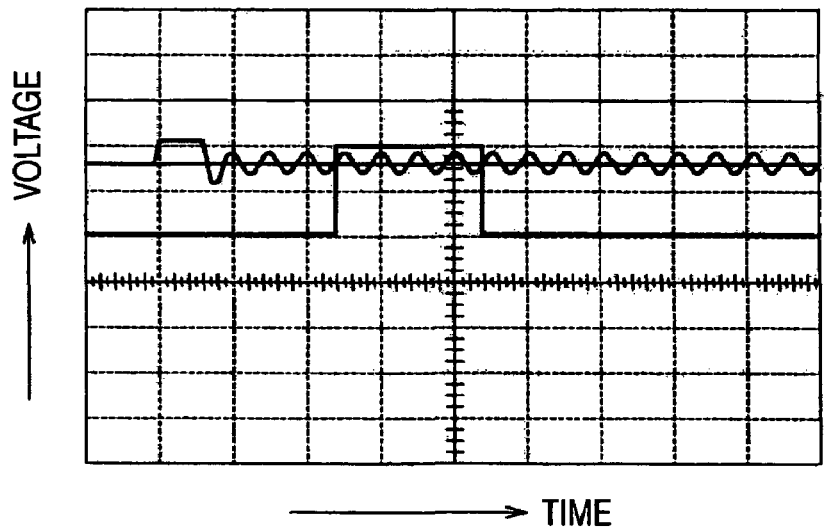
Figure 7B:
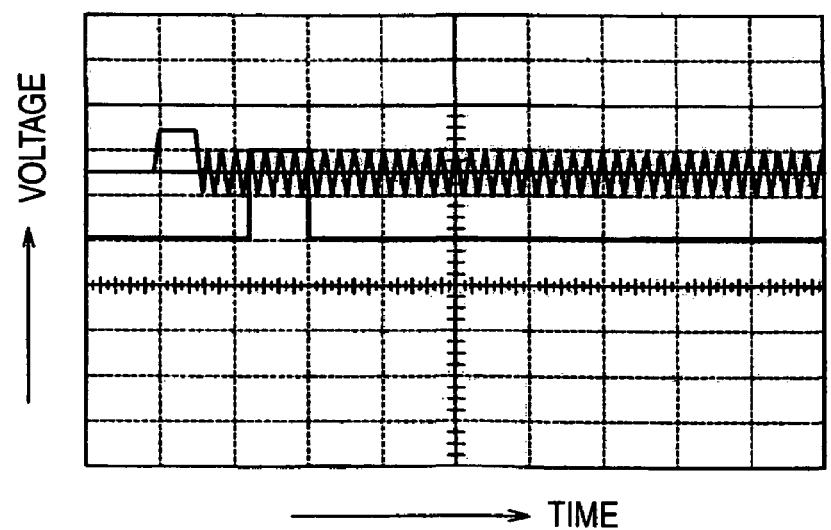

FIGS. 7(a) and 7(b) show a measuring method of the residual vibration and the wave form of the residual vibration (free vibration) in the vibration portion 61 of the liquid sensor 60, when a driving signal is supplied to the liquid sensor 60 to force the vibration portion 61 to be vibrated. FIG. 7(a) illustrates a wave form when ink exists inside the cavity 43 of the liquid sensor 60, while FIG. 7(b) illustrates a wave form when ink does not exists inside the cavity 43 of the liquid sensor 60.

In FIGS. 7(a) and 7(b), a vertical axis indicates a voltage of a counter electromotive force generated by the driving pulse applied to the liquid sensor 60 and the residual vibration of the vibration portion 61 of the liquid sensor 60 and a horizontal axis indicates elapsed time. By the residual vibration of the vibration portion 61 of the liquid sensor 60, a wave form of an analog signal of a voltage is generated. Next, the analog signal is converted (two-valued) into a digital value corresponding to the frequency of the signal. In an example shown in FIG. 7, the time when four pulses are generated from the fourth pulse to the eighth pulse of the analog signal is measured.

More specifically, after a driving pulse is applied to the liquid sensor 60 to force the vibration portion 61 to be vibrated, it is counted how many times a voltage wave form caused by the residual vibration crosses a predetermined reference voltage from the lowest voltage side to the highest voltage side. Then, the digital signal, in which the interval between the fourth count and the eighth count is made high, is produced and the time from the fourth count to the eighth count is measured.

When an example of FIG. 7(a) is compared with an example of FIG. 7(b), it is appreciated that the time from the fourth count to the eighth count in FIG. 7(a) is longer than the time in FIG. 7(b). In other words, depending on the existence of ink in the cavity 43 of the liquid sensor 60, a required time from the fourth count to the eighth count differs. By using the difference in a required time, the state where ink is consumed can be sensed.

The reason why it is counted from the fourth count of the analog wave form is that a measurement is started after the residual vibration (free vibration) of the liquid sensor 60 is stabilized. While counting from the fourth count is a mere example, it may be counted from a random count. Here, the signal from the fourth count to the eighth count is detected and the time from the fourth count to the eighth count is measured by a predetermined clock pulse. Based on this time, a resonant frequency can be calculated. In the clock pulse, the time to the eighth count does not need to be measured but it may be counted to a random count.

Although the time from the fourth count to the eighth count is measured in FIG. 7, the time in a different count interval may be detected according to a circuit configuration in which frequency is detected. For example, when ink quality is stable and thus a variation in peak amplitude is small, a resonant frequency may be calculated by detecting the time from the fourth count to the sixth count in order to increase the detection speed. When ink quality is not stable and thus a variation in peak amplitude is large, the time from the fourth count to the twelfth count may be detected in order to accurately detect the residual vibration.

In the liquid sensor 60 according to the present embodiment as described above, it can be sensed whether the liquid level has passed over the mounting position level of the liquid sensor 60 (the position of the cavity 43, in a precise sense), by a change in the frequency of the residual vibration or the amplitude of vibration after the sensor portion 61 of the liquid sensor 60 is forced to be vibrated.

Figure 8:
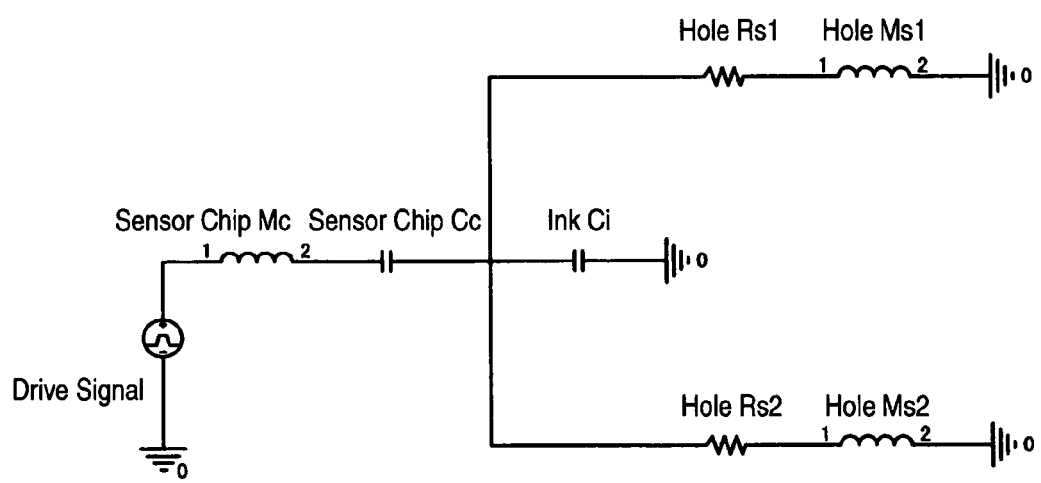
FIG. 8 is a diagram illustrating an example of an equivalent circuit for approximately simulating a vibration of a vibration portion.

FIG. 8 is a diagram illustrating an equivalent circuit for approximately simulating a vibration of the vibration portion 61 of the above-described liquid sensor 60.

In FIG. 8, inertance (Mc) of the vibration portion 61 (sensor chip) and inheritances (Ms1 and Ms2) of the ink supply path 19 and the ink discharge path 20 (holes) are represented by a coil. Compliance (Cc) of the vibration portion 61 (sensor chip) and compliance (Ci) of ink are represented by a capacitor. Resistances (Rs1, Rs2) of the ink supply path 19 and the ink discharge path 20 (holes) are represented by a resistance. Further, the supply side buffer chamber 15 and the discharge side buffer chamber 16, which respectively communicate with the ink supply path 19 and the ink discharge path 20, are represented by a ground.

The compliance (Cc) of the vibration portion 61 is calculated by a structure finite element method. Further, the inertance (MC) of the vibration portion 61 is approximated by a series system of the inertance and the compliance, of which an approximate value can be calculated by the following approximate expression:

$$Mc = 1/(4\pi 2) \times 1/(f2) \times 1/Cc.$$

Herein, f is an own natural period of the vibration portion 61, which can be calculated by a structure finite element method or an actual measurement.

Further, the compliance (Ci) of ink can be calculated by the below expression:

$$Ci = C \times Vi.$$

Herein, C is compressibility of ink and Vi is a volume of ink. The compressibility of water is 4.5e-10/Pa.

Further, the inertances (Ms) of the ink supply path 19 and the ink discharge path 20 (holes) is calculated by a volume finite element method or can be calculated by the next simple expression in the case where a flow path (hole) is cylindrical:

$$Ms = \rho \times L/\pi/r2.$$

Herein, ρ is a viscosity of ink, L is a length of the flow path (hole), and r is a radius of the flow path (hole).

The value calculated as above is used, so that the vibration of the vibration portion 61 can be simulated approximately by the equivalent circuit of FIG. 8.

With the result obtained by simulating the vibration of the vibration portion 61 with the equivalent circuit, the following is appreciated. When Ms1 and Rs1 are substantially equal to Ms2 and Rs2 respectively, the vibration is simple so that an unnecessary vibration mode is not produced. Accordingly, in the present invention, the space defined by the cavity 43, the ink supply path 19 and the ink discharge path 20 is formed symmetrically with respect to the center axis C of the cavity 43.

Further, a requirement for the supply side buffer chamber 15 and the discharge side buffer chamber 16 functioning as a buffer is that the respective compliances of the buffer chambers 15 and 16 is preferably set ten times larger than the compliance (Cc) of the vibration portion 61, so that the pressure within the respective buffer chambers 15 and 16 does not become pretty high due to the vibration of the vibration portion 61. Further, in order that an unnecessary vibration is not generated, it is preferable that the inertances of the buffer chambers 15 and 16 are a tenth less than the inertance (Ms) of the flow path (hole).

As described above, the liquid sensor 60 and the ink cartridge 70 according to the present embodiment include the vibration cavity forming base portion 40 which is formed with the ink supply path 19 for supplying ink to the cavity 43 and the ink discharge path 20 for discharging ink from the cavity 43, so that the ink supply into the cavity 43 is performed through the ink supply path 19 and the ink discharge from the cavity 43 is performed through the ink discharge path 20. Therefore, when the liquid sensor 60 is mounted on the ink cartridge 70 or the like, the cavity 43 of the liquid sensor 60 is not directly exposed to the ink storage space and ink can be supplied to the cavity 43 through the ink supply path 19.

As such, it is configured that ink flows inside the ink supply path 19 and the ink discharge path 20 of the liquid sensor 60 when ink is consumed. Therefore, even if bubbles enter the cavity 43, the bubbles are pushed out of the inside of the cavity 43 by the ink flow. As a result, erroneous detection of the liquid sensor 60 can be prevented, which is caused by the bubbles accumulated inside the cavity 43. As such, the detection precision of the liquid sensor 60 is enhanced and remaining liquid decreases to lead to reduced industrial waste.

Further, since the cavity 43 does not need to be exposed to the ink storage space, meniscus can be prevented from being formed inside the cavity 43 when ink passes through the liquid level. Accordingly, erroneous detection of the liquid sensor 60 can be prevented, which is caused by the ink remaining inside the cavity 43. Furthermore, the cavity 43 is not exposed toward the ink storage space, but is enclosed from the ink storage space by the flow path forming plate 18. Therefore, due to a change of ink level, the existence of ink and the like, a difference in the residual vibration remaining in the vibration portion 61 when the vibration portion 61 is forced to be vibrated becomes large, so that detection sensitivity becomes high to enhance detection precision and to prevent erroneous detection.

Further, since the space defined by the cavity 43, the ink supply path 19, and the ink discharge path 20 is formed symmetrically with respect to the center axis C of the cavity 43 existing in the region interposed between the ink supply path 19 and the ink discharge path 20, the shape of the space defined the cavity 43, the ink supply path 19, and the ink discharge path 20 is made simple as well as the vibration mode of the residual vibration remaining in the bottom surface of the cavity 43. The cavity 43 is a space where the vibration of the bottom surface of the cavity 43 is propagated. Accordingly, the simulation of the residual vibration when the bottom surface of the cavity 43 is forced to be vibrated becomes easy to perform and the difference between a design and a practice becomes small, so that adjusting operation can be simple or detection precision can be enhanced.

Further, since the spatial space defining the cavity 43 is substantially circular, the shape of the cavity 43 where the vibration of the bottom surface of the cavity 43 is propagated is made simpler as well as the vibration mode of the residual vibration remaining on the bottom surface of the cavity 43. Further, the simulation of the residual vibration when the bottom surface of the cavity 43 is forced to be vibrated becomes extremely easy to perform and the difference between a design and a practice becomes small, so that adjusting operation can be simple and detection precision can be enhanced.

Further, since the ink supply path 19 and the ink discharge path 20 is respectively narrowed with respect to the cavity 43 and their length is set so that the fluidic mass of the ink exist inside, a suitable flow-path resistance is generated in the ink supply path 19 and the ink discharge path 20. Therefore, the pressure variation within the cavity 43 generated by the vibration on the bottom surface of the cavity 43 is prevented from being diffused throughout two buffer chambers 15 and 16, and an appropriate residual vibration is generated to enhance and secure detection precision. In particular, when the flow-path length of each of the ink supply path 19 and the ink discharge path 20 is set to be two times larger than the flow-path diameter, the described-above effect becomes remarkable.

Further, in the liquid sensor 60 which includes the supply side buffer chamber 15 communicating with the ink supply path 19 and the discharge side buffer chamber 16 communicating with the ink discharge path 20, the ink supply path 19 and the ink discharge path 20, through which ink flows in and from the cavity 43, are opened respectively into the supply side buffer chamber 15 and the discharge side buffer chamber 16 and are not opened directly to the ink reservoir space of the container body 72. Therefore, even though bubbles are produced in the ink reservoir space due to the vibration of ink, the bubbles are previously trapped in the supply side buffer chamber 15 and the discharge side buffer chamber 16 so that it hardly enters the cavity 43. Accordingly, erroneous detection of the liquid sensor 60 caused by the bubbles accumulated inside the cavity 43 can be prevented. Further, since the liquid sensor 60 is disposed in the vicinity of the bottom portion of the ink cartridge 70, the effect of preventing entering of bubbles is further enhanced.

Further, since the ink supply path 19 and the ink discharge path 20, through which ink flows in and from the cavity 43, are not opened directly to the ink reservoir space of the container body 72 but are opened respectively into the supply side buffer chamber 15 and the discharge side buffer chamber 16, the ink pressure generated in the ink reservoir space within the ink cartridge 70 does not act directly on the cavity 43. Therefore, erroneous detection of the liquid sensor 60 caused by the influence of the pressure due to the vibration of ink can be prevented.

Since the supply side buffer chamber 15 and the discharge side buffer chamber 16 of the liquid sensor 60 is formed symmetrically with respect to the center axis C of the cavity 43, the shape of the members constituting the buffer chambers 15 and 16 can be made simple, manufacture becomes easy, and the members can be miniaturized.

When the supply side buffer chamber 15 and the discharge side buffer chamber 16 of the liquid sensor 60 respectively have at least ten times larger volume than the cavity 43, the pressure variation of ink generated in the ink reservoir space within the ink cartridge 70 does not exert an influence on the sensor characteristics of the liquid sensor 60, so that erroneous detection of the liquid sensor 60 caused by the influence of the pressure due to the vibration of ink can be prevented. Further, since the pressure within the two buffer chambers 15 and 16 does not increase due to the vibration of the bottom surface of the cavity 43, an unnecessary vibration is not generated and the vibration mode of the residual vibration remaining on the bottom surface of the cavity 43 is made simple, which makes it possible to enhance detection precision.

The supply side buffer chamber 15 communicates with the main reservoir chamber 75 which constitutes the major part of the inner space of the container body 72 to reserve ink, and the discharge side buffer chamber 16 communicates with the sub reservoir chamber 76 which is a liquid delivery space which communicates the ink delivery opening 71 for delivering the ink reserved inside the container body 72 to the outside. Therefore, the ink reserved in the main reservoir chamber 75 of the container body 72 flows from the entrance of the supply side buffer chamber 15 of the liquid sensor 60 to be discharged from the exit of the discharge side buffer chamber 16 to be finally delivered to the ink delivery opening 71 of the container body 72. Further, all the ink to be delivered to the ink delivery opening 71 of the container body 72 passes through the supply side buffer chamber 15, the cavity 43, and the discharge side buffer chamber 16 of the liquid sensor 60 in advance, so that the consumption of ink can be sensed reliably.

Further, according to the above-described liquid sensor 60, the ink discharge path 20 is formed in accordance with the region corresponding to the cavity 43, so that the bubbles which enter the cavity can be discharged reliably.

Additionally in the ink cartridge 70, the inside of the container body 72 is partitioned into the main reservoir chamber 75 and the sub reservoir chamber 76 which are separated from each other, and communicates with the main reservoir chamber 75 and the sub reservoir chamber 76 through the inflow opening 22 and the discharge opening 23 of the liquid sensor 60 so that the cavity 43 of the liquid sensor 60 is disposed at the upper end of the sub reservoir chamber 76.

Consequently, since the liquid sensor 60 can detect when the ink inside the main reservoir chamber 75 runs out, a user can be informed that ink is running out. Further, based on the amount of ink within the sub reservoir chamber 76, which is previously sensed, a user can be informed how many pages can be printed by the remaining ink. Therefore, it can be prevented that a printed paper is wasted when ink runs out on the way of printing of the printed paper.

Additionally, according to the described-above ink cartridge 70, the closed auxiliary flow path 77 is formed inside the main reservoir chamber 75, the auxiliary flow path 77a of the auxiliary flow path 77 is disposed in the lower end of the main reservoir chamber 75, and the inflow opening 22 of the liquid sensor 60 communicates with the upper end of the auxiliary flow path 77. For this reason, the bubbles produced in the main reservoir chamber 75 hardly enter the auxiliary flow path 77 and can be prevented from entering the cavity 43 of the liquid sensor 60.

According to the above-described ink cartridge 70, the inside of the sub reservoir chamber 76 is filled with ink until all the ink within the main reservoir chamber 75 is consumed. Therefore, even when a vibration is applied to the ink cartridge 70, the liquid level in the sub reservoir chamber 76 does not shake as long as ink remains in the main reservoir chamber 75. Accordingly, erroneous detection of the liquid sensor 60 caused by the shake of liquid level can be prevented from occurring.

Further, according to the above-described liquid sensor 60, the range where the vibration portion 61 comes in contact with ink is limited to the range corresponding to the cavity 43. Therefore, pinpoint detection of ink can be performed, so that ink level can be sensed with high precision.

Since the substantially entire region corresponding to the cavity 43 is covered with the main-body portion 46a of the lower electrode 46, the difference between the deformation mode at the time of a forced vibration and the deformation mode at the time of a free vibration becomes small. Further, since the vibration portion 61 of the liquid sensor 60 is formed symmetrically with respect to the center of the liquid sensor 60, the rigidity of the vibration portion 61 is nearly isotropic, as seen from the center.

For this reason, an unnecessary vibration caused by structural asymmetry is suppressed from being produced, and the output reduction of the back electromotive force is prevented, which is caused by the difference between the deformation mode at the time of a forced vibration and the deformation mode at the time of a free vibration. Accordingly, the detection precision for the resonant frequency of the residual vibration in the vibration portion 61 of the liquid sensor 60 is enhanced, and the detection of the residual vibration of the vibration portion 61 becomes easy.

Further, since the substantially entire portion of the region corresponding to the cavity 43 is covered with the main-body portion 46a of the lower electrode 46 having a larger diameter than the cavity 43, a necessary vibration is prevented from being produced, which is caused by the positional deviation of the lower electrode 46 in manufacturing. As a result, the deterioration of detection precision can be prevented.

Further, the entire piezoelectric layer 47, which is inherently brittle, is disposed inside the region corresponding to the cavity 43 and does not exist in the position corresponding to the peripheral edge 43b of the cavity 43. For this reason, the occurrence of a crack of piezoelectric film is prevented in the position corresponding to the peripheral edge of the cavity.

Figure 9A:
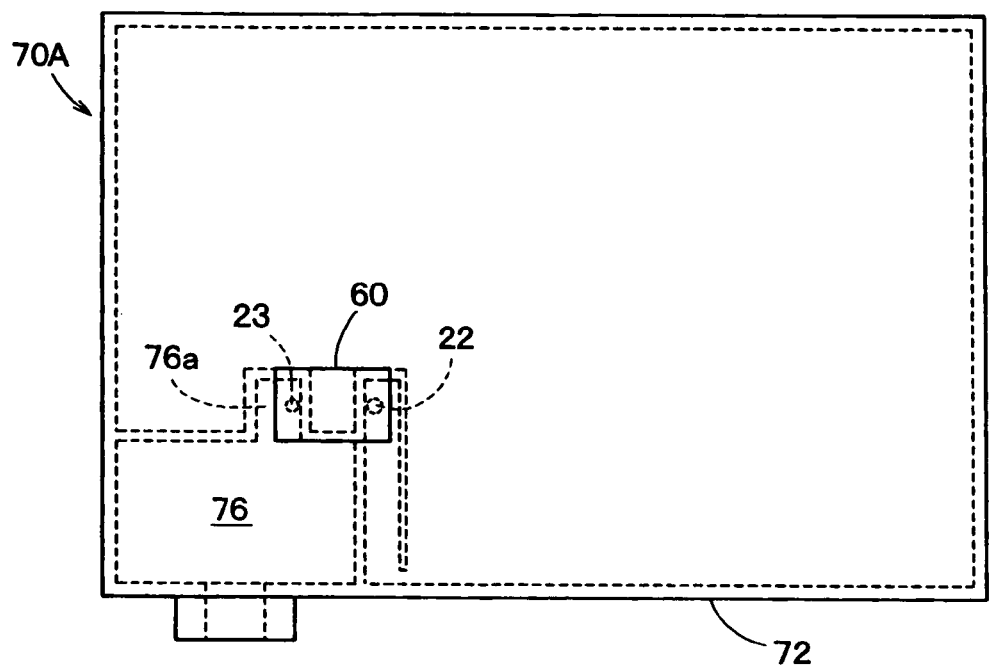
FIG. 9A is a side view illustrating a second embodiment of the ink cartridge including the liquid sensor of the present invention and FIG. 9B is a front view illustrating the same.
Figure 9B:
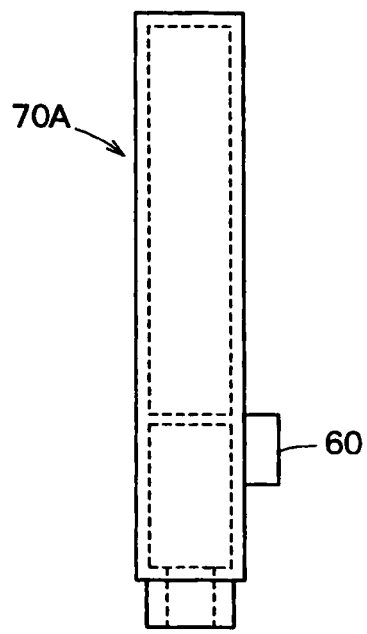

FIG. 9 shows a second embodiment of the ink cartridge according to the present invention.

In an ink cartridge 70A, a projecting portion 76a projecting upward is formed in the upper portion of a sub reservoir chamber 76 formed inside a container body 72. Also, the inflow opening 23 of the liquid sensor 60 is disposed in the position corresponding to the projection portion 76a to communicate with the projecting portion 76a of the sub reservoir chamber 76. The rest of the present embodiment is the same as the first embodiment, so that like numerals are attached to the same portions. Further, the present embodiment also takes the same effect as the first embodiment.

Figure 10:
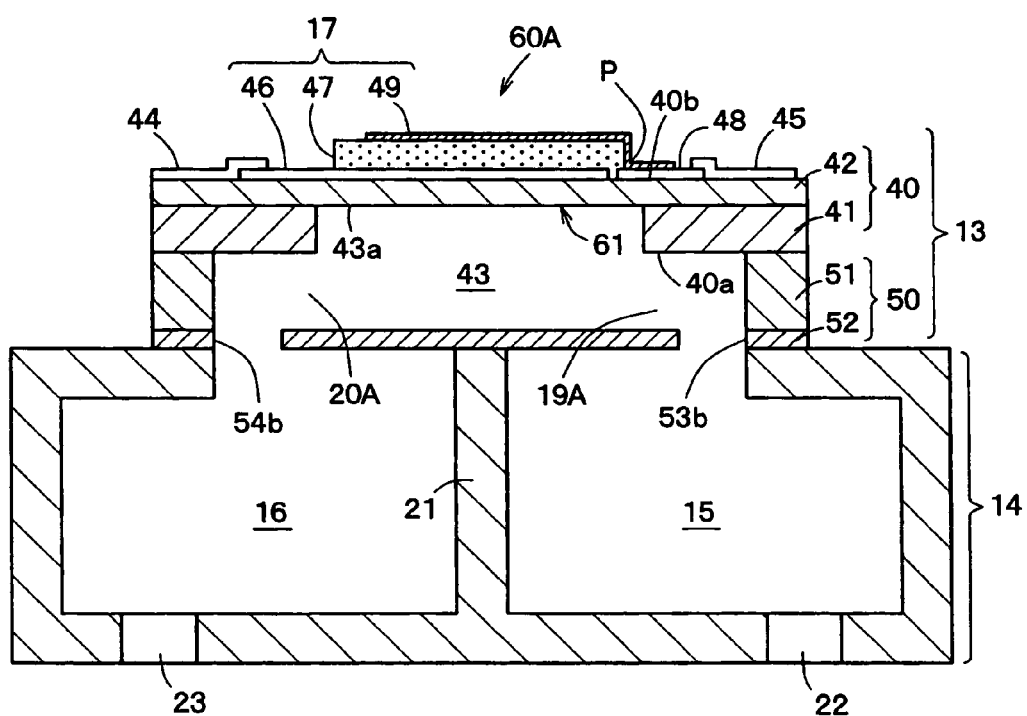
FIG. 10 is a cross-sectional view, taken along a B-B line in FIG. 11, illustrating a third embodiment of the liquid sensor according to the present invention.
Figure 11A:
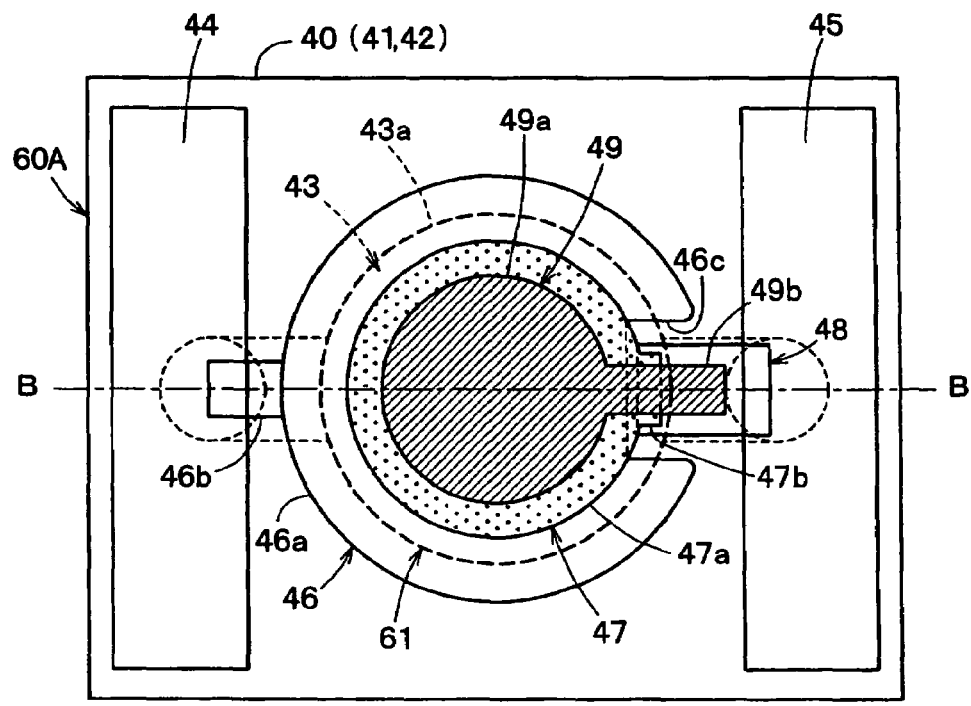
FIG. 11A is a plan view illustrating a sensor portion of the liquid sensor and FIG. 11B is a bottom view illustrating the same.
Figure 11B:
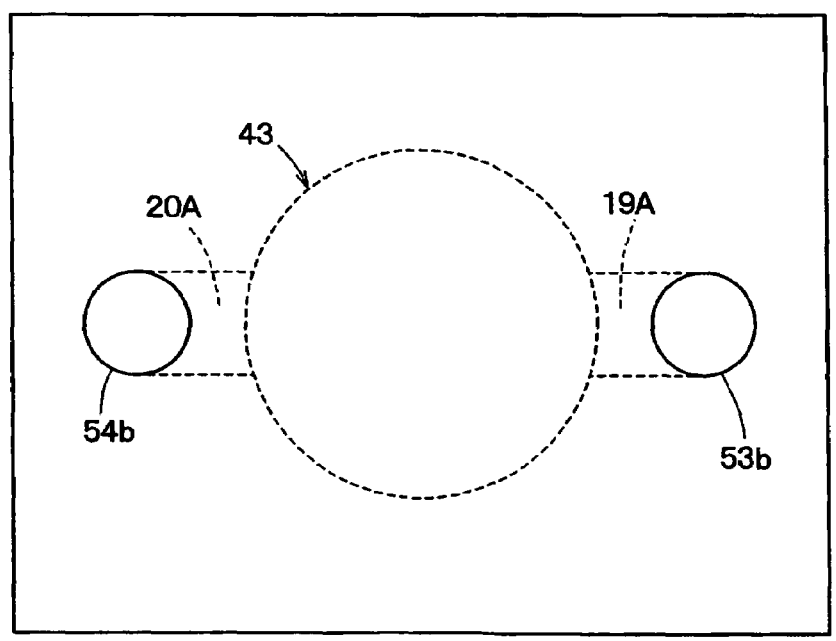

FIGS. 10 and 11 show a third embodiment of a liquid sensor 60A according to the present invention.

In the liquid sensor 60A, a flow path forming base portion 50, which is laminated and joined to the a first surface 40a of a vibration cavity forming base portion 40, is formed with a flow path plate 51 and an exit/entrance plate 52 laminated and joined to each other.

The flow path plate 51 of the flow path forming base portion 50, is formed with ink supply path (a liquid supply path) 19A for supplying ink to be sensed into a cavity 43 and an ink discharge path (a liquid discharge path) 20A for discharging ink to be sensed from the cavity 43. Also, the exit/entrance plate 52 is formed with an entrance 53b of the ink supply path 19A and an exit 54b of the ink discharge path 20A. Further, the entrance 53b of the ink supply path 19A and the exit 54b of the ink discharge path 20A are disposed out of the region corresponding to the cavity 43.

According to the present embodiment, the exit 54b of the ink discharge flow path 20A is disposed opposite to the entrance 53b of the ink supply path 20A, so that the spacing between the entrance 53b and the exit 54b can be enlarged. The cavity 43 is interposed between the entrance 53b and the exit 54b. Therefore, the operation when the liquid sensor 60A is mounted on a predetermined position of the ink cartridge 70 is made simple and the degree of freedom in design of the ink cartridge 70 is also enhanced. The rest of the present embodiment is the same as the first embodiment, so that like numerals are attached to the same portions. Further, the present embodiment also takes the same effect as the first embodiment.

Hereinafter, an ink cartridge having a liquid detecting function (a container having a liquid detecting function) according to a fourth embodiment of the present invention will be described with reference to the drawings.

Figure 12:
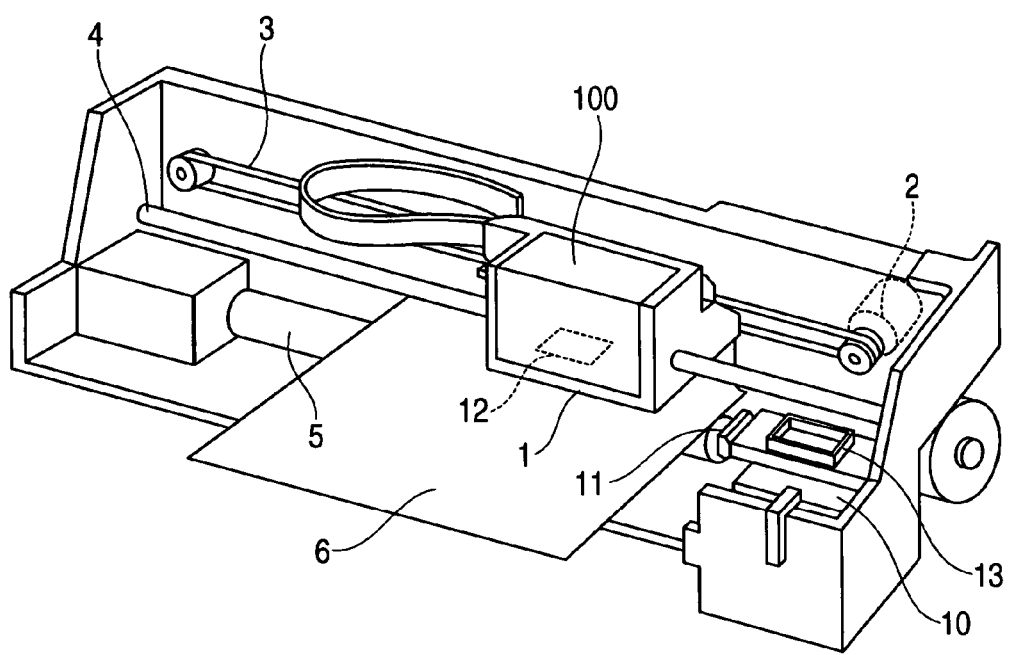
FIG. 12 is a perspective view illustrating a schematic structure of an inkjet printer (liquid jetting apparatus) employing an ink cartridge according to an embodiment of the present invention.

FIG. 12 shows a schematic structure of an inkjet printer (liquid jetting apparatus) employing an ink cartridge according to an embodiment of the present invention. In FIG. 12, reference numeral 1 denotes a carriage. The carriage 1 is guided to a guide member 4 through a timing belt 3 which is activated by a carriage motor 2 and reciprocates in an axis direction of a platen 5.

An inkjet printing head 12 is mounted on the side of the carriage 1 facing a printing paper 6 and an ink cartridge 100 for supplying ink to the printing head 12 is detachably mounted thereon.

In a home position (the right side in FIG. 12) which is a non-printing region of the printer, a cap member 13 is disposed. When the printing head 12 mounted on the carriage 1 moves to the home position, the cap member 13 is pressed against a nozzle forming surface of the printing head 12 to form a closed space between the cap member and the nozzle forming surface. A pump unit 10 for applying a negative pressure to the closed space formed by the cap member 13 to perform a cleaning work or the like is disposed below the cap member 13.

In the vicinity of the printing region side of the cap member 13, a wiping means 11 including an elastic plate such as rubber or the like is disposed so as to advance and retreat in the horizontal direction with respect to the moving locus of the printing head 12. Therefore, when the carriage 1 reciprocates toward the cap member 13, the nozzle forming surface of the printing head 12 can be wiped off as needed.

Figure 13:
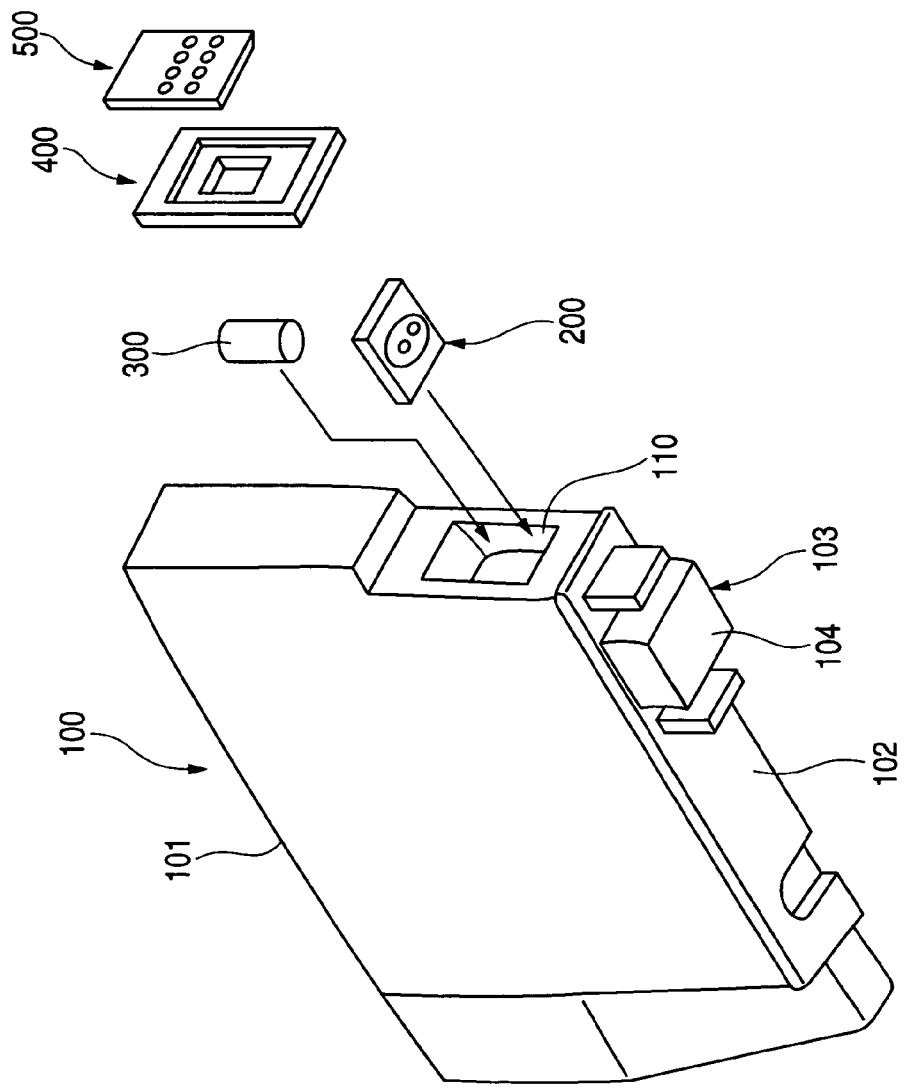
FIG. 13 is an exploded perspective view illustrating a schematic structure of the ink cartridge according to the embodiment of the invention.

FIG. 13 is a perspective view illustrating a schematic structure of the ink cartridge 100. A sensor unit 200 which is a liquid detecting device according to the present embodiment is built in the ink cartridge 100.

The ink cartridge 100 includes a resin cartridge case (container body) 101 having an ink storage section therein and a resin cover 102 disposed so as to cover the lower end surface of the cartridge case 110. The cover 102 serves to protect various seal films disposed on the lower end surface of the cartridge case 101. An ink sending section 103 is protruded from the lower end surface of the cartridge case 101 and a cover film 104 for protecting an ink outlet (not shown) is attached to the lower end surface of the ink sending section 103.

A sensor receiving recess 110 for receiving the sensor unit 200 is formed in a narrow side surface of the cartridge case 101. The sensor unit 200 and a spring 300 are received in the sensor receiving recess 110. The spring 300 serves to secure a sealing property between the sensor unit 200 and the cartridge case 100 by pressing the sensor unit 200 against a sensor receiving wall 120 (see FIG. 17) on the bottom portion of the sensor receiving recess 110 and crushing a seal ring 270 (see FIG. 17).

The sensor receiving recess 110 is formed by opening the narrow side surface of the cartridge case 101 and the sensor unit 200 and the spring 300 are inserted into the opening of the side surface. The opening of the side surface of the sensor receiving recess 110 is closed with a seal cover 400 in which a substrate 500 is attached to the outside thereof, with the sensor unit 200 and the spring 300 received therein.

Figure 14:
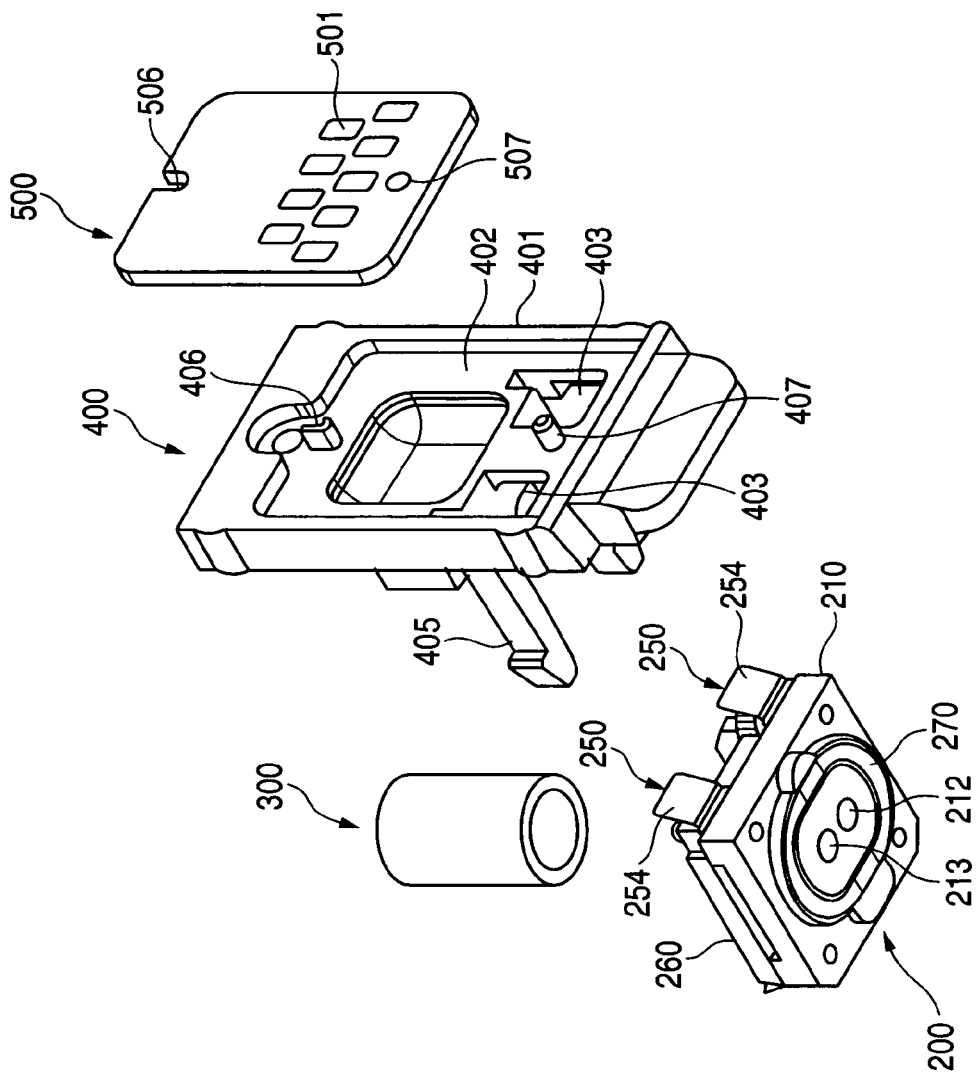
FIG. 14 is a perspective view illustrating detailed structures of elements such as a sensor unit (liquid detecting device) fitted to the ink cartridge shown in FIG. 14.
Figure 15:
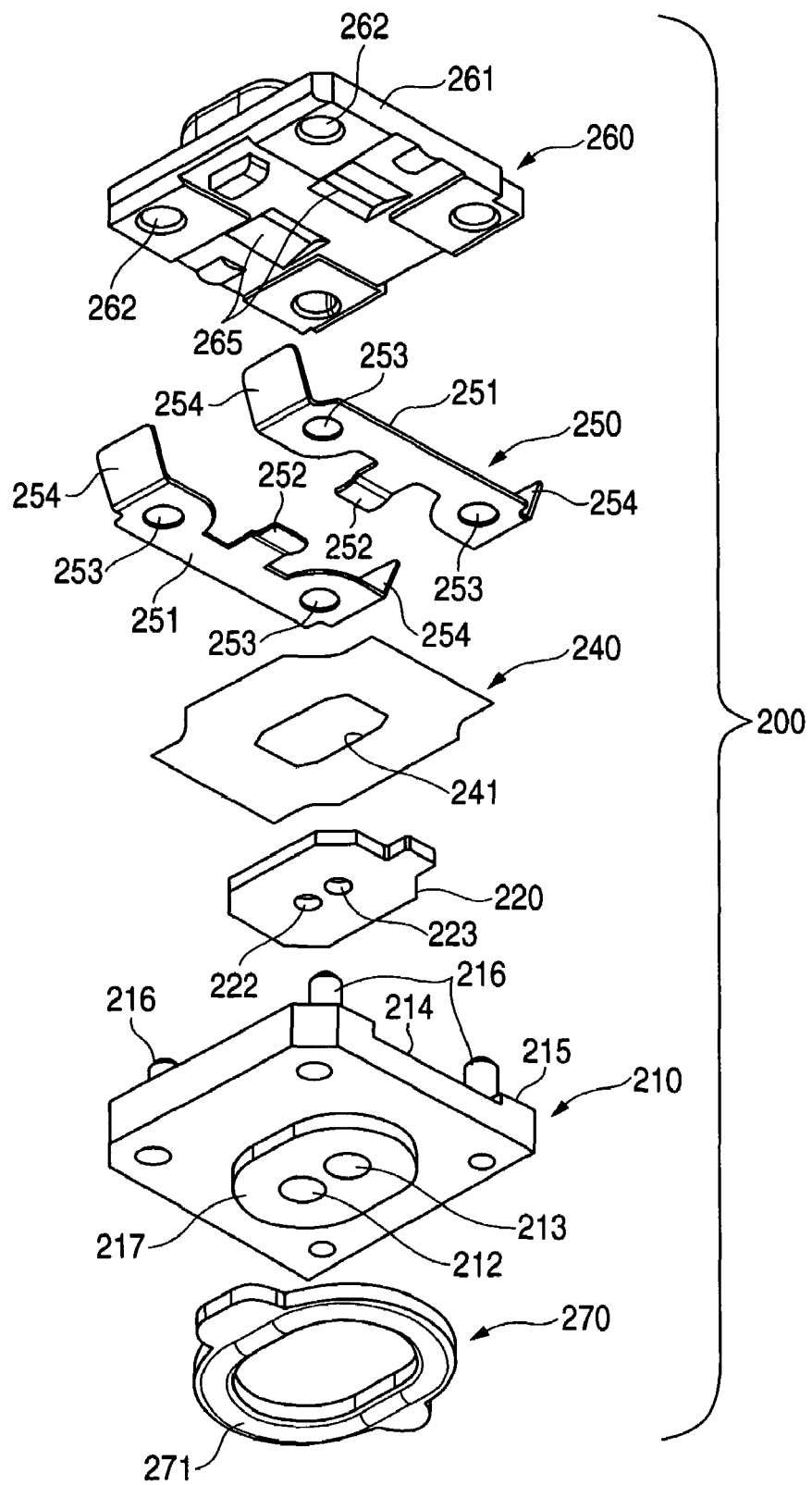
FIG. 15 is an exploded perspective view of the sensor unit shown in FIG. 14.
Figure 16:
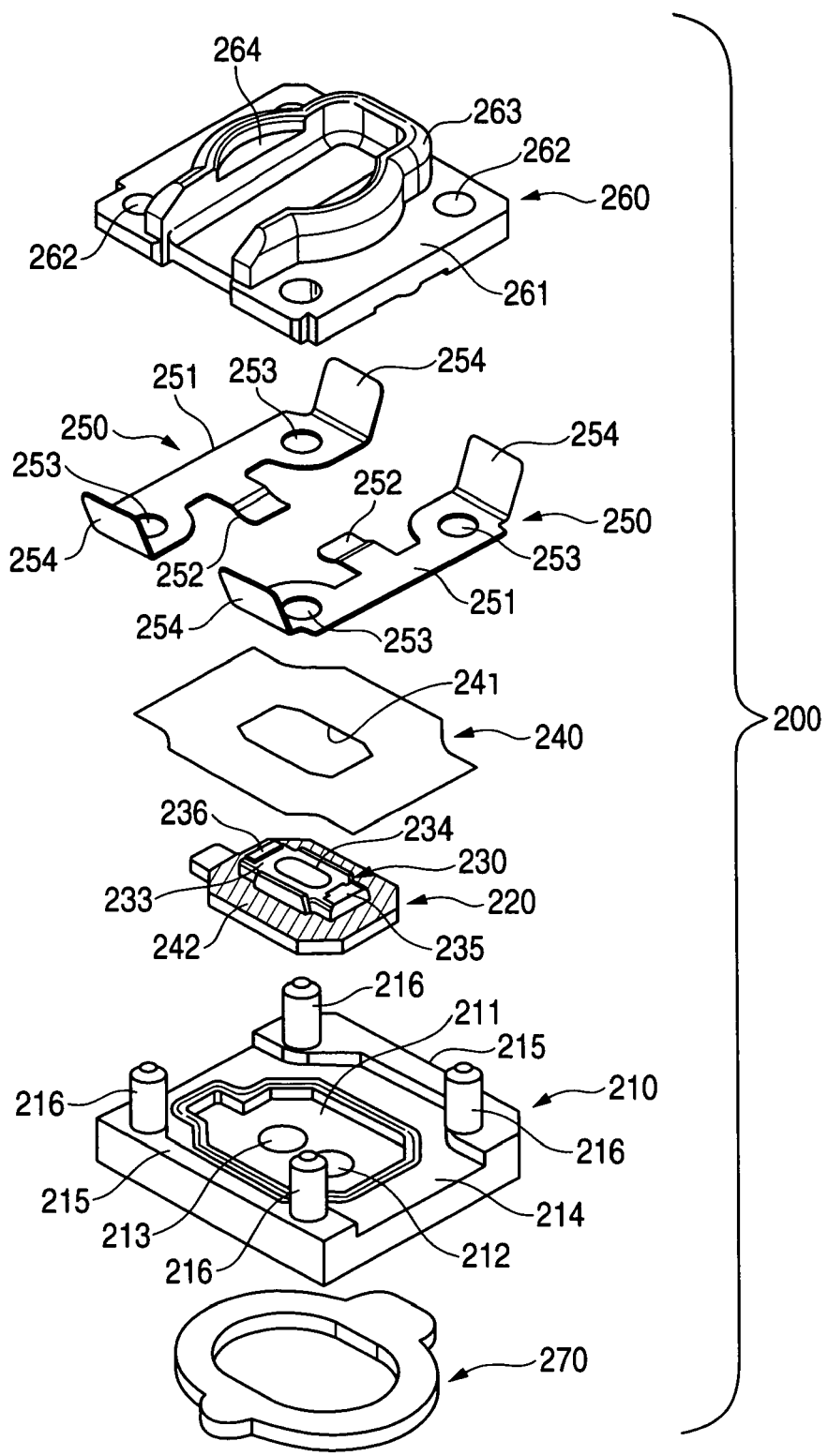
FIG. 16 is an exploded perspective view of the sensor unit shown in FIG. 14 as seen with another angle.
Figure 17:
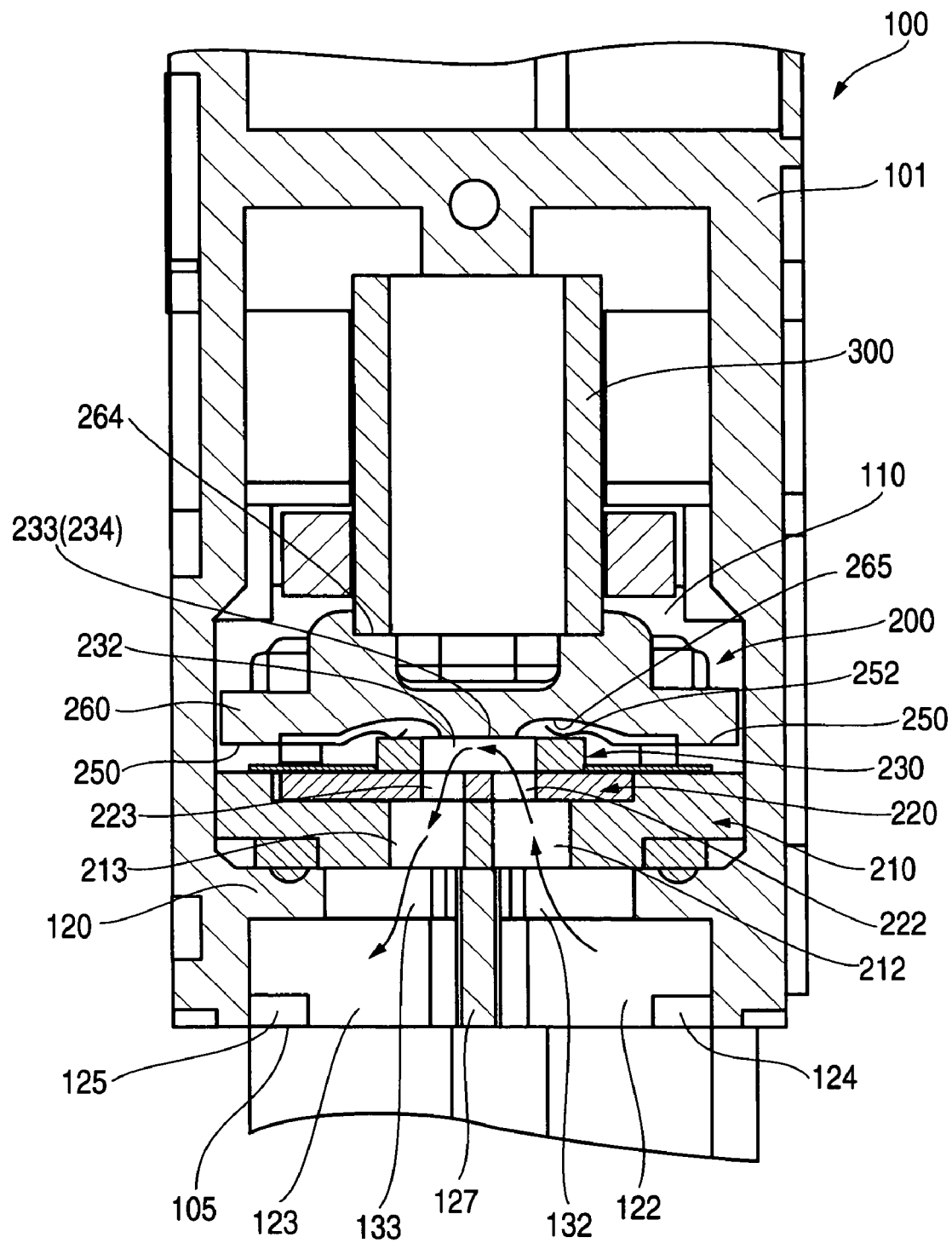
FIG. 17 is a vertical cross-sectional view illustrating a portion of the ink cartridge shown in FIG. 13 to which the sensor unit is fitted.
Figure 18:
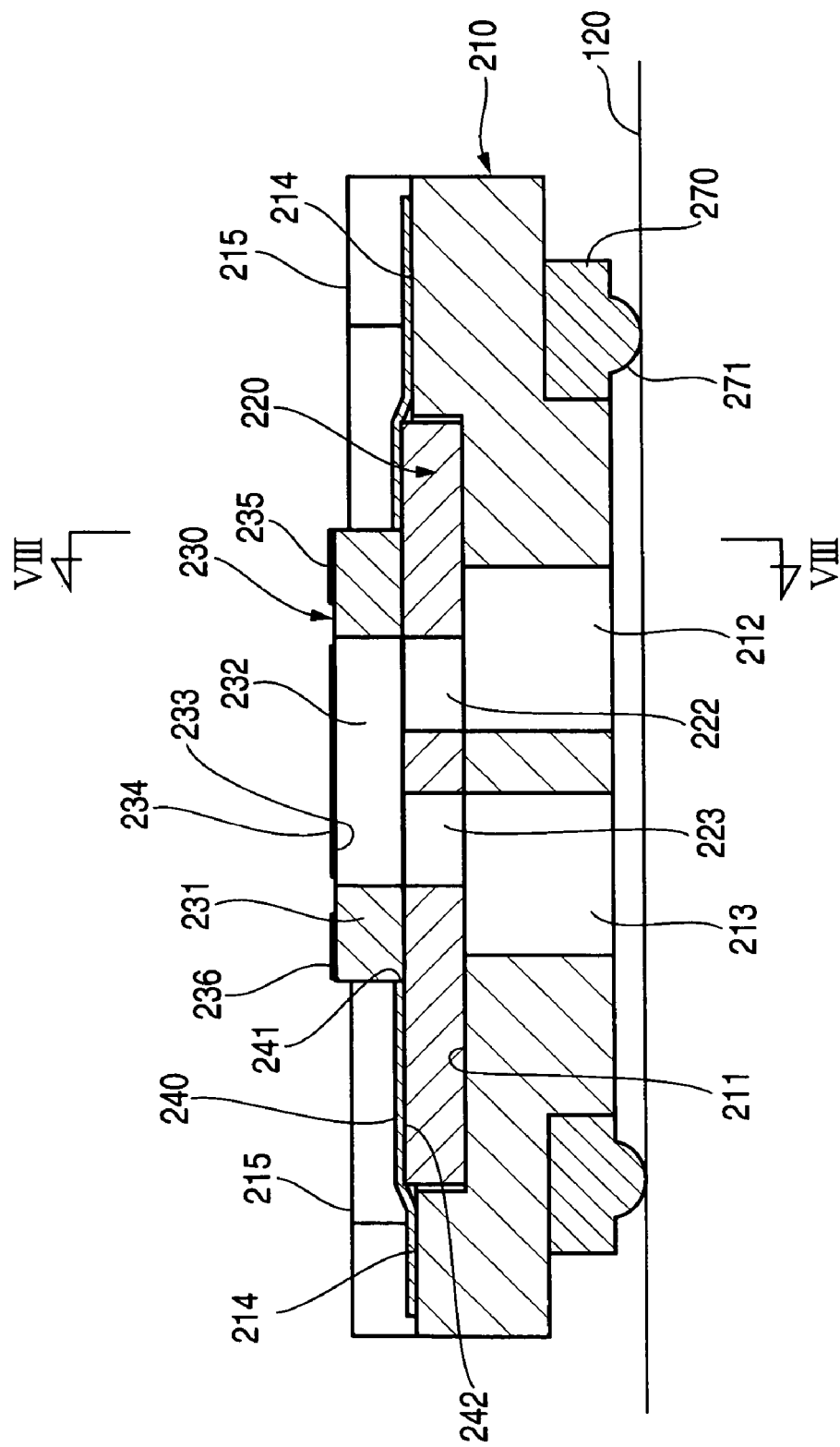
FIG. 18 is an enlarged cross-sectional view illustrating an important part of the sensor unit shown in FIG. 17.
Figure 19:
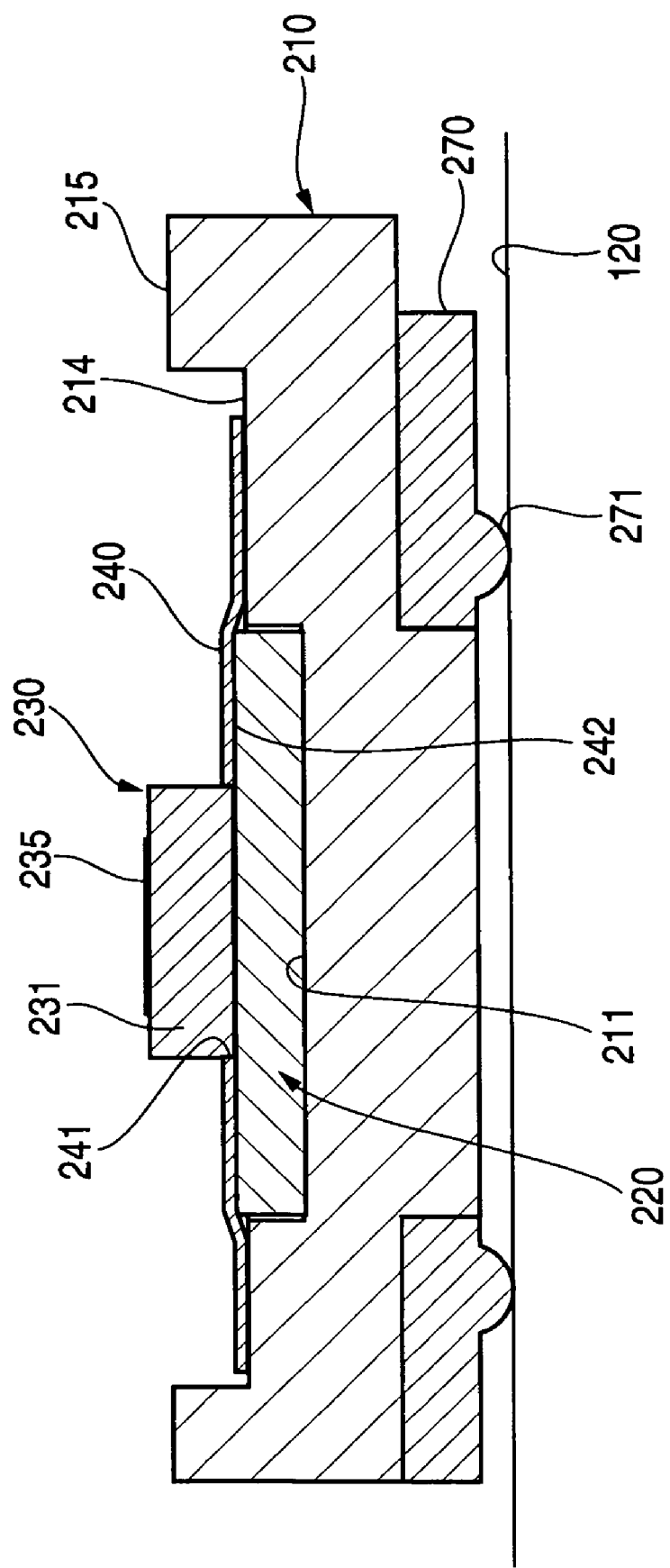
FIG. 19 is a cross-sectional view taken along Line VIII-VIII.

FIG. 14 is an exploded perspective view illustrating structures of the sensor unit 200, the spring 300, the seal cover 400, and the substrate 500. FIG. 15 is an exploded perspective view of the sensor unit 200, FIG. 16 is an exploded perspective view of the sensor unit 200 as seen with another angle, and FIG. 17 is a vertical cross-sectional view illustrating a sensor unit receiving section of the ink cartridge 100. FIG. 18 is a cross-sectional view illustrating an important part of the sensor unit 200 and FIG. 19 is a cross-sectional view taken along Line VIII-VIII.

As shown in FIG. 17, a sensor receiving wall 120 for receiving the lower end of the sensor unit 200 is provided on the inner bottom portion of the sensor receiving recess 110 of the cartridge case 101. The sensor unit 200 is placed on the sensor receiving wall 120 which comes in close contact with the seal ring 270 at the lower end of the sensor unit 200 with an elastic force of the spring 300.

A pair of upstream and downstream sensor buffer chambers 122 and 123 partitioned by a barrier (partition wall) 127 are disposed below the sensor receiving wall 120. The upstream and downstream sensor buffer chambers 122 and 123 are arranged in the horizontal direction. The sensor receiving wall 120 is provided with a pair of communication openings (communication passages) 132 and 133 to correspond to the sensor buffer chambers 122 and 123, respectively. Although not shown, a sending passage for sending out the stored ink is provided inside the cartridge case 101. A sensor receiving recess 110 is disposed in the vicinity of the end of the sending passage (in the vicinity of an ink outlet) and the sensor unit 200 is disposed in the sensor receiving recess 110.

In this case, the upstream sensor buffer chamber 122 communicates with the upstream side of the sending passage through an inflow opening 124 disposed at the lower end of the upstream sensor buffer chamber 122 and the downstream sensor buffer chamber 123 communicates with the downstream side of the sending passage close to the ink outlet through an outflow opening 125 disposed at the lower end of the downstream sensor buffer chamber 123.

The bottom sides of the sensor buffer chambers 122 and 123 may be sealed with a rigid wall. However, in the present embodiment, the lower sides are opened and the opening is covered with a thin resin seal film 105 having flexibility. In this way, when the lower opening of the buffer chambers 122 and 123 are covered with the thin seal film 105, the end of the buffer chambers 122 and 123 is treated as an open end in considering a vibration system to be described later. When the lower opening is covered with a rigid wall, the end is treated as a closed end.

As shown in FIGS. 15 and 16, the sensor unit 200 includes a resin unit base 210 of a plate shape having a recessed portion 211 thereon, a metal sensor base 220 of a plate shape received in the recessed portion 211 on the upper surface of the unit base 210, a sensor chip 230 mounted on and fixed to the upper surface of the sensor base 220, an bonding film 240 for fixing the sensor base 220 to the unit base 210, a pair of terminal plates 250 disposed on the unit base 210, a pressing cover 260 of a plate shape for pressing the terminal plates 250 and protecting the sensor chip 230, and a rubber seal ring 270 disposed on the lower surface of the unit base 210.

Describing details of the respective elements, as shown in FIG. 16, the unit base 210 includes the recessed portion 211 into which the sensor base 220 is inserted at the center of the upper surface and an fitting wall 215 having a height greater by a step than that of the upper surface wall 214 at the outside of the upper surface wall 214 around the recessed portion 211. The fitting wall 215 includes a pair of fitting walls to be opposed to each other with the recessed portion 211 therebetween. Four support pins 216 are provided at four corners on the upper surface of the unit base 210 to upwardly protrude from the fitting walls 215. The bottom wall of the recessed portion 211 is provided with an inlet-side flow path (upstream communication passage) 212 and an outlet-side flow path (downstream communication passage) 213 composed of a circular opening. The lower surface of the unit base 210 is provided with an elliptical protruded portion 217 into which the seal ring 217 is inserted as shown in FIG. 15 and the inlet-side flow path 212 and the outlet-side flow path 213 are positioned on the protruded portion 217. The seal ring 217 is made of a rubber ring packing and has a ring-shaped protruded portion 271 having a semi-circular section on the lower surface thereof.

The sensor base 220 is made of a metal plate such as stainless steel having rigidity greater than that of resin so as to enhance an acoustic characteristic of a sensor. The sensor base 220 has a rectangular plate shape of which four corners are cut off and includes an inlet-side flow path (upstream communication passage) 222 and an outlet-side flow path (downstream communication passage) 223 including two openings to correspond to the inlet-side flow path 212 and the outlet-side flow path 213 of the unit base 210.

An adhesive layer 242 is formed on the sensor base 220, for example, by attachment of a double-sided bonding film or application of adhesive. The sensor chip 230 is mounted on and fixed to the adhesive layer 242.

The sensor chip 230 has a sensor cavity 232 for receiving ink (liquid) which is a detection target and has a structure that the lower side of the sensor cavity 232 is opened so as to receive the ink, the upper side is closed with a vibration plate 233, and a piezoelectric element 234 is disposed on the vibration plate 233.

Specifically speaking, as shown in FIGS. 17 and 18, the sensor chip 230 includes a ceramic chip body 231 having the sensor cavity 232 of a circular opening shape at the center thereof, the vibration plate 233 stacked on the chip body 231 to constitute the bottom wall of the sensor cavity 231, the piezoelectric element 234 stacked on the vibration plate 233, and terminals 235 and 236 stacked on the chip body 231.

Although not specifically shown, the piezoelectric element 234 includes upper and lower electrode layers connected to the terminals 235 and 236, respectively, and a piezoelectric layer formed between the upper and lower electrode layers. The piezoelectric element serves to detecting the ink end, for example, on the basis of difference in characteristic due to existence of the ink in the sensor cavity 232. The piezoelectric element may be made of lead zirconate titanate (PZT), lead zirconate titanate (PLZT), or a leadless piezoelectric film not containing lead.

The sensor chip 230 is integrally fixed to the sensor base 220 with the adhesive layer 242 by placing the lower surface of the chip body 231 on the upper center of the sensor base 220. At the same time, the space between the sensor base 220 and the sensor chip 230 is sealed with the adhesive layer 242. The inlet-side flow paths 222 and 212 and the outlet-side flow paths 223 and 213 of the sensor base 220 and the unit base 210 communicate with the sensor cavity 232 of the sensor chip 230. Accordingly, the ink enters the sensor cavity 232 through the inlet-side flow paths 212 and 222 and is discharged from the sensor cavity 232 through the outlet-side flow paths 223 and 213.

In this way, the metal sensor base 220 mounted with the sensor chip 230 is received in the recessed portion 211 on the upper surface of the unit base 210. Then, the sensor base 220 and the unit base 210 are integrally fixed to each other by covering, them with a resin bonding film 240 from the upside thereof.

That is, the bonding film 240 has an opening 241 at the center thereof and thus exposes the sensor chip 230 to the central opening 241 by covering them with the bonding film in the state where the sensor base 220 is received in the recessed portion 211 on the upper surface of the unit base 210. By bonding the inner circumference of the bonding film 240 to the upper surface of the sensor base 220 through the adhesive layer 242 and bonding the outer circumference to the upper surface wall 214 around the recessed portion 211 of the unit base 210, that is, by bonding the bonding film 240 to the upper surfaces of two components (sensor base 220 and unit base 210), the sensor base 220 and the unit base 210 are fixed to each other and sealed.

In this case, the upper surface of the sensor base 220 is protruded upwardly from the recessed portion 211 of the unit base 210 and the bonding film 240 is bonded to the upper surface of the sensor base 220 at a position higher than the bonding position of the upper surface wall 214 around the recessed portion 211 of the unit base 210. In this way, by setting the height of the film bonding surface of the sensor base 220 to be higher than the height of the film bonding surface of the unit base 210, the sensor base 220 can be pressed with the bonding film 240 by step difference, thereby strengthening the fixing force of the sensor base 220 to the unit base 210. They may be provided without step difference.

Each terminal plate 250 has a band-shaped base portion 251, a spring member 252 provided at an edge of the base portion 251, fitting holes 253 formed on both sides of the base portion 251, and a bent piece 254 formed at both ends of the base portion 251. The terminal plates are disposed on the fitting walls 215 of the unit base 210, in the state that the terminal plates are positioned with the fitting holes 253 through the use of the support pines 216. By placing the pressing cover 260 thereon, the terminal plates are interposed between the unit base 210 and the pressing cover 260 and in this state, the spring members 252 are in contact with and electrically connected to the terminals 235 and 236 on the sensor chip 230.

The pressing cover 260 includes a flat plate portion 261 which is placed on the upper surface of the fitting walls 215 of the unit base 210 with the base portions 251 of the terminal plates 250 therebetween, four fitting holes 262 which are disposed at four corners of the flat plate portion 261 and are inserted into the support pins 216 of the unit base 210, a rib 263 disposed at the center of the upper surface of the flat plate portion 261, a spring receiving plate 264 disposed in the rib 263, and a recessed portion 265 which is disposed on the lower surface of the flat plate portion 261 to provide a back clearance of the spring member 252. The pressing cover 260 is placed on the unit base 210 while pressing the terminal plates 250 from the upside, thereby protecting the sensor plate 220 and the sensor chip 230 received in the recessed portion 211 on the unit base 210.

In order to assemble the sensor unit 200 by the use of the elements, the adhesive layer 242 is first formed on the entire upper surface of the sensor base 220 and then the sensor chip 230 is mounted on the adhesive layer 242, thereby integrally fixing and sealing the sensor chip 230 and the sensor base 220 to each other with the adhesive layer 242.

Next, the sensor base 220 integrally fixed to the sensor chip 230 is received in the recessed portion 211 on the unit base 210 and in this state, the bonding film 240 is covered thereon from the upside, thereby bonding the inner circumference of the bonding film 240 to the upper surface of the sensor base 220 through the use of the adhesive layer 242 and bonding the outer circumference to the upper surface wall 214 around the recessed portion 211 of the unit base 210. Accordingly, the sensor base 220 and the unit base 210 are integrally fixed to each other through the use of the bonding film 240 and are sealed.

Next, the terminal plates 250 is placed on the unit base 210 by fitting the fitting holes 253 to the support pins of the unit base 210 and the pressing cover 260 is placed thereon. In any step, the seal ring 270 is fitted to the protruded portion 217 on the lower surface of the unit base 210. As a result, the sensor unit 200 is assembled.

The sensor unit 200 has the above-mentioned structure and is received in the sensor receiving recess 110 of the cartridge case 100 together with the spring 300. In this state, as shown in FIG. 17, the spring 300 presses the pressing cover 260 downwardly, thereby crushing the seal ring 270 provided on the lower surface of the sensor unit 200 and bringing the seal ring 270 into close contact with the sensor receiving wall 120 in the sensor receiving recess 110. Accordingly, the sealing property between the sensor unit 200 and the cartridge case 101 is secured.

Under the condition that the sealing property is secured by performing such assembly, the upstream buffer chamber 122 in the cartridge case 101 communicates with the inlet-side flow paths (upstream communication passage) 212 and 222 in the sensor unit 200 through the communication opening (upstream communication passage) 132 of the sensor receiving wall 120, and the downstream buffer chamber 123 in the cartridge case 101 communicates with the outlet-side flow paths (downstream communication passage) 213 and 223 in the sensor unit 200 through the communication opening (downstream communication passage) 133 of the sensor receiving wall 120. The inlet-side flow paths 212 and 222, the sensor cavity 232, and the outlet-side flow paths 213 and 223 are disposed in series in the sending passage in the cartridge case 101 so that they are arranged in that order from the upstream side.

Here, the upstream flow path communicating with the sensor cavity 232 is formed by the upstream buffer chamber 122 having a large flow-path section perpendicular to the flow of ink, a communication opening 132 of the sensor receiving wall 120 having a small flow-path section perpendicular to the flow of ink, and inlet-side flow paths 212 and 222 in the sensor unit 200. The downstream flow path communicating with the sensor cavity 232 is formed by the downstream buffer chamber 123 having a large flow-path section perpendicular to the flow of ink, a communication opening 133 of the sensor receiving wall 120 having a small flow-path section perpendicular to the flow of ink, and outlet-side flow paths 213 and 223 in the sensor unit 200.

Therefore, the ink flow path from the upstream buffer chamber 122 to the downstream buffer chamber 123 forms the vertical U-shaped path in which the sensor cavity 232 is positioned at the apex of the U shape. Accordingly, the ink flowing out of the upstream side of the sending passage flows in the upstream buffer chamber 122 from the inflow opening 124, enters the sensor cavity 232 through the upstream communication passages (the communication opening 132 and the inlet-side flow paths 212 and 222), passes through the downstream communication passages (outlet-side flow paths 223 and 213) and the downstream buffer chamber 123 from the sensor cavity 232, and is then discharged to the downstream side of the sending passage from the outflow opening 125.

Among the flow paths communicating with the sensor cavity 232, the communication passages (the communication openings 132 and 133 and the inlet-side flow paths 212, 222, 213, and 223) having a flow-path section smaller than that of the buffer chambers 122 and 123 are narrow flow paths.

The seal cover 400 occupying the side surface opening of the sensor receiving recess 110 has a structure, as shown in FIG. 14, that a recessed portion 402 into which the substrate 500 is inserted is provided on the outer surface of a plate-shaped body 401, openings 403 for exposing the bent pieces 254 of the terminal plates 250, respectively, and pins 406 and 407 for positioning the substrate 500 are provided on the bottom wall of the recessed portion 402, a locking claw 405 locked to a predetermined portion in the sensor receiving recess 110 is protruded from the inner surface of the body 401. The seal cover 400 is fitted to the cartridge case 101 in the state that the sensor unit 200 and the spring 300 are received in the sensor receiving recess 110. In this state, by fitting the substrate 500 to the recessed portion 402 of the seal cover 400, contact points 501 of the substrate 500 are electrically connected to the terminal plates 250. Notches 506 or holes 507 into which the positioning pins 406 and 407 are inserted are provided in the substrate 500.

Next, a principle for detecting ink by the use of the sensor unit 200 will be described.

When the ink in the ink cartridge 101 is consumed, the stored ink is sent to the printing head 12 of the inkjet printer from the ink sending section 103 through the sensor cavity 232 of the sensor unit 200.

At this time, when the ink sufficiently remains in the ink cartridge 100, the sensor cavity 232 is filled with the ink. On the other hand, when the amount of ink remaining in the ink cartridge 100 is reduced, the sensor cavity 232 is not filled with the ink.

Therefore, the sensor unit 200 detects difference in acoustic impedance due to the variation in state. Accordingly, it is possible to detect whether the ink sufficiently remains or whether a part of the ink is consumed and the amount of remaining ink is reduced.

Figure 20:
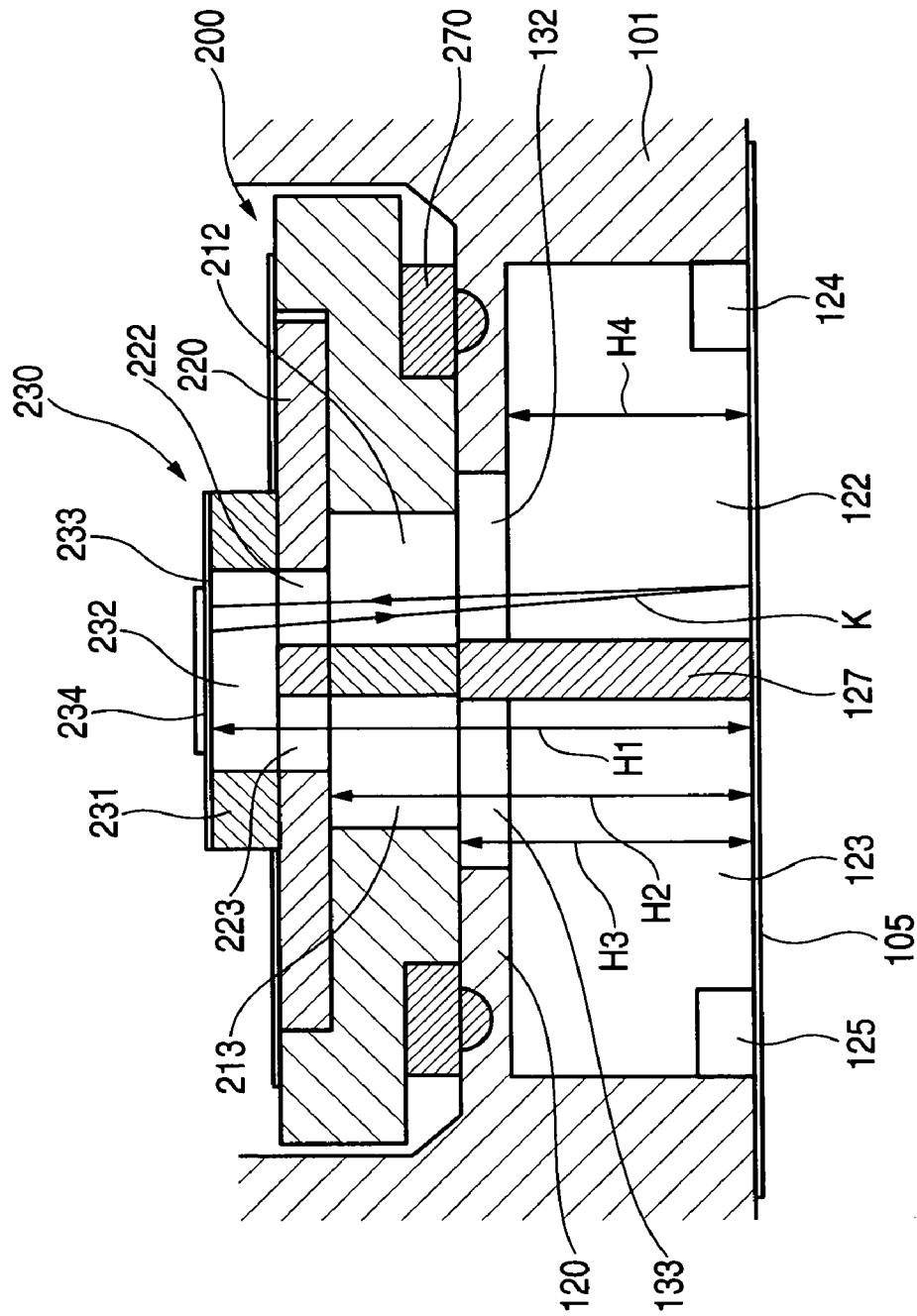
FIG. 20 is an enlarged cross-sectional view illustrating important parts of the sensor unit shown in FIG. 17 so as to explain size relations between components.
Figure 23:
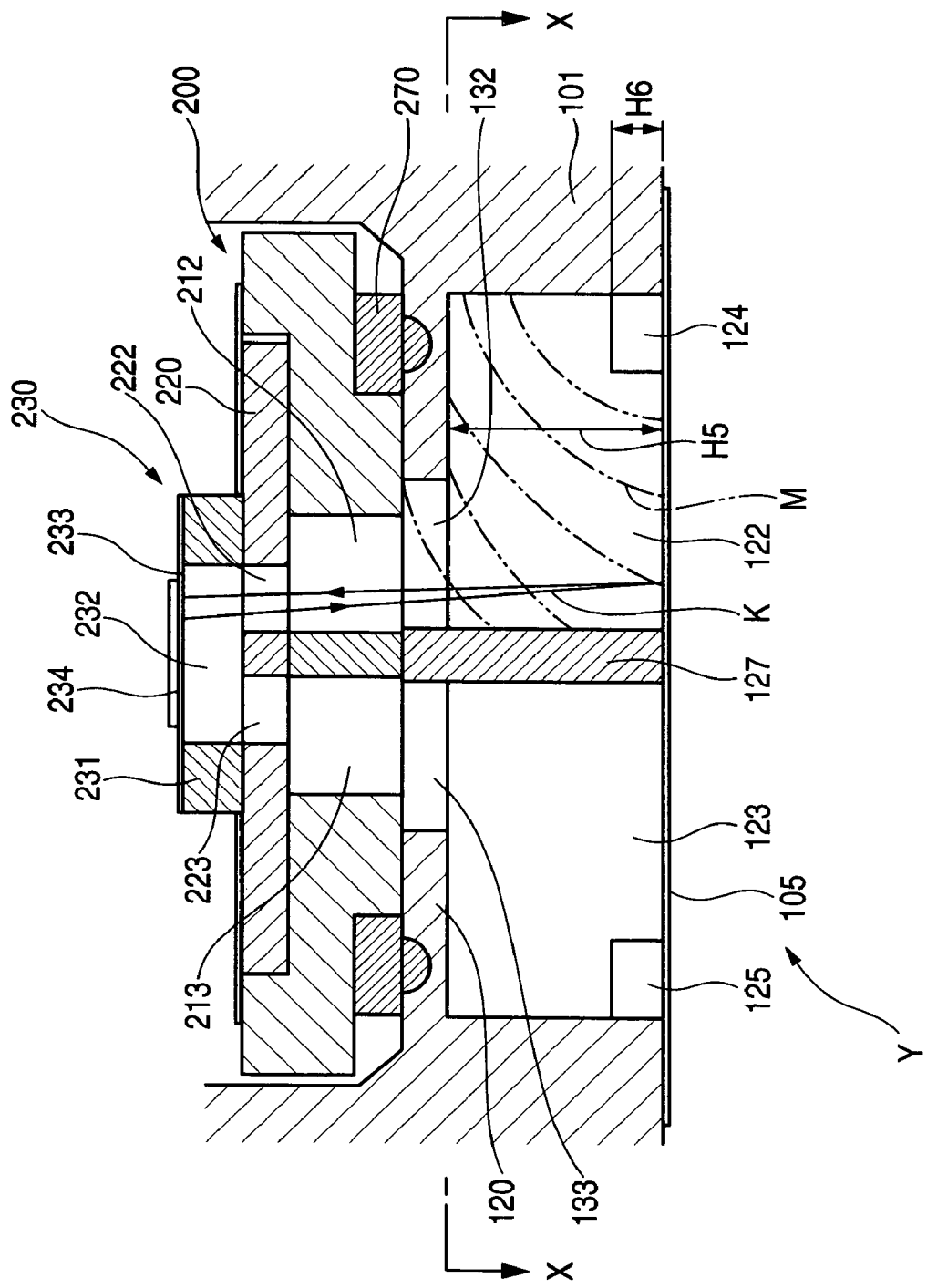
FIG. 23 is an enlarged cross-sectional view illustrating important parts of the sensor unit shown in FIG. 17 so as to explain size relations between components.

Specifically, when a voltage is applied to the piezoelectric element 234, the vibration plate 233 is deformed with the deformation of the piezoelectric element 234 and then, as shown in FIGS. 20 and 23, the vibration wave K is emitted to the buffer chambers 122 and 123 through the sensor cavity 232. The vibration wave K emitted from the vibration plate 233 is reflected and returned from the ends (the open end in the present embodiment) of the buffer chambers 122 and 123 and the reflected wave makes the vibration plate 233 to vibrate. This operation is repeated until the reciprocating wave is attenuated.

When the application of the voltage is released after compulsorily deforming the piezoelectric element 234, flexural vibration remains in the vibration plate 233 for a moment. The remaining vibration is free vibration of the vibration plate 233 and the medium in the sensor cavity 232. Therefore, by allowing the voltage applied to the piezoelectric element 234 to have a pulse waveform or a rectangular waveform, it is possible to easily obtain resonance between the vibration plate 233 and the medium after application of the voltage.

The remaining vibration is vibration of the vibration plate 233 and accompanies the deformation of the piezoelectric element 234. For this reason, the piezoelectric element 234 generates a counter electromotive force with the remaining vibration. The counter electromotive force is externally detected through the terminal plates 250.

In this way, since the resonance frequency can be specified by the use of the detected counter electromotive force, it is possible to detect existence of the ink in the ink cartridge 100 on the basis of the resonance frequency.

When the amount of remaining ink is detected using such a principle, the greater intensity of vibration propagated to the vibration plate 233 is advantageous for detecting difference in acoustic impedance resulting from variation in the amount of remaining ink. Therefore, under the condition that the reflected wave obtained by allowing the vibration wave, which is generated from the vibration plate 233 by activating the piezoelectric element 234, to be reflected from the buffer chambers 122 and 123 is not cancelled by the reflected wave, it is possible to enhance the sensitivity of detection.

For this reason, in the present embodiment, when the space from the sensor cavity 232 to the buffer chambers 122 and 123 is used as a propagation space of the vibration wave, the compliance value which is defined as easiness of capacity variation of the buffer chambers 122 and 123 is set to be ten times greater than the compliance value of the sensor cavity 232. In this case, the compliance value of the sensor cavity 232 is given mainly by the elasticity of the vibration plate 233 and the compliance value of the buffer chambers 122 and 123 is given mainly by the elasticity of the seal film 105 sealing the lower opening.

Further, in the present embodiment, the sizes of the buffer chambers 122 and 123 are set to sizes for avoiding the cancellation between the vibration wave emitted from the sensor chip 230 and the reflected wave returning from the buffer chambers 122 and 123 as much as possible. For example, in the present embodiment, since the wall surfaces of the buffer chambers 122 and 123 facing the vibration plate 223 are the open ends (in which the seal film 105 having flexibility is formed), the size condition that it is difficult to absorb the vibration is set among the vibration conditions of an open end.

Such conditions will be described with reference to FIGS. 20 and 21.

Figure 21:
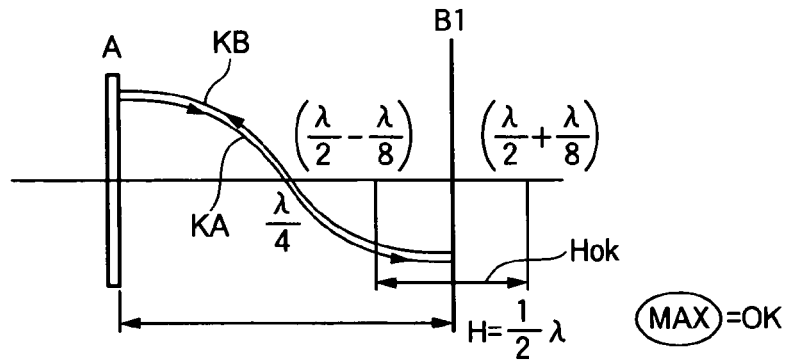
FIG. 21 shows diagrams illustrating vibration conditions in case of an open end.
Figure 21:
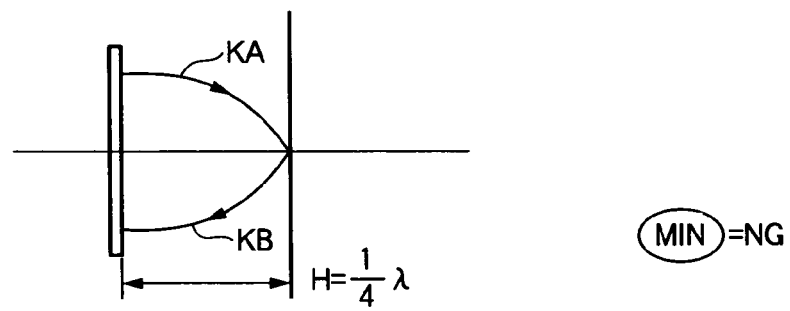
Figure 21:
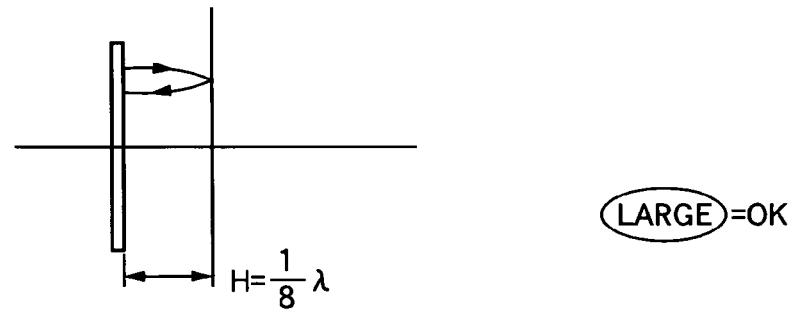
Figure 21:
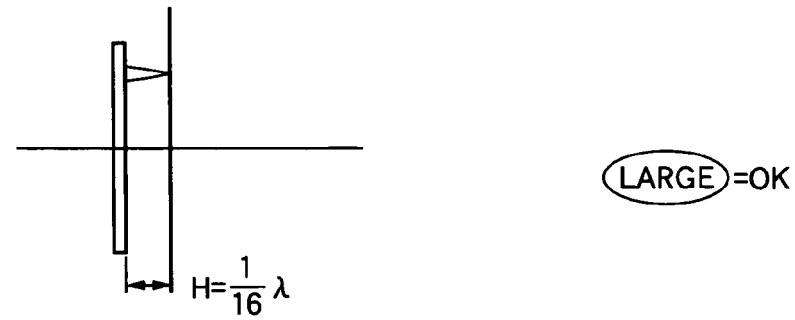

FIG. 20 is an explanatory diagram illustrating component sizes greatly affecting an acoustic characteristic and FIG. 21 shows diagrams illustrating relations between an emitted wave (current wave) and a reflected wave in case of an open end.

As shown in FIG. 20, when a vibration wave K is emitted to the buffer chambers 122 and 123 through the sensor cavity 232 and the communication passages (the upstream and downstream flow paths 212, 222, 213, and 223 and the communication openings 132 and 133) from the vibration plate 233, the wave propagates a medium in the spaces thereof and the reflected wave returns from the open end (in which the seal film 105 having flexibility is formed) of the buffer chambers 122 and 123. The wave allows the vibration plate 233 to vibrate while reciprocating between the vibration plate 233 and the open end. Accordingly, by finding out a condition that it is difficult to absorb the wave and setting the sizes of the wave propagating spaces, the vibration plate 233 can vibrate greatly, thereby enhancing the counter electromotive voltage of the piezoelectric element 234.

As the sizes affecting the vibration in the vibration propagating spaces from the vibration plate 233 to the open ends of the buffer chambers 122 and 123, H1, H2, H3, and H4 in FIG. 20 are mainly considered. H1 denotes a size corresponding to the entire region from the open ends of the buffer chambers 122 and 123 to the vibration plate 233. H2 denotes a size corresponding to the region from the open ends of the buffer chambers 122 and 123 to the bottom surface of the sensor base 220 made of metal. H3 denotes a size corresponding to the region from the open ends of the buffer chambers 122 and 123 to the bottom surface of the unit base 210 made of resin. H4 denotes the height of the buffer chambers 122 and 123.

Since the buffer chambers 122 and 123 have a space much greater than other spaces, it can be considered that the buffer chambers 122 and 123 are the regions most affecting the absorption of vibration. Therefore, when the wavelength of the vibration wave emitted from the sensor chip 230 is $\lambda$, as the size H in the vibration propagating direction of the region most affecting the absorption of vibration among the vibration propagating spaces from the vibration plate 233 to the open ends of the buffer chambers 122 and 123, the height H4=H of the buffer chambers 122 and 123 is set to satisfy the following expression (1) or (2).

$$(n\times\lambda/2-\lambda/8)\leq H\leq(n\times\lambda/2+\lambda/8) \quad (1)$$

where n=1, 2, 3, $$0<H\leq\lambda/8 \quad (2)$$

That is, in consideration of the wavelength $\lambda$, the sizes of the buffer chambers 122 and 123 are set to the optimum height.

A specific example of the wavelength is described.

Supposed that the kinematic viscosity of ink is $v$=1500 m/s and the period of vibration is f=30 kHz, the wavelength $\lambda$ is obtained as follows:

$$\lambda = 1500\,\text{m/s} \times 1/30000\,s$$
$$= 50\,\text{mm}.$$

Therefore, by setting the height of the buffer chambers 122 and 123 on the basis of the wavelength data, it is possible to perform the detection with the optimum condition.

The relation between the current wave KA and the reflected wave KB in the vibration conditions of an open end is described with reference to FIG. 21. In FIG. 21, A denotes an emission end (corresponding to the vibration plate 233) and B1 denotes an open end (corresponding to the open ends of the buffer chambers 122 and 123). In FIG. 21, (a) shows a case that the distance between the emission end A and the open end B1 is H=$\lambda$/2, (b) shows a case that the distance between the emission end A and the open end B1 is H=$\lambda$/4, (c) shows a case that the distance between the emission end A and the open end B1 is H=$\lambda$/8, and (d) shows a case that the distance between the emission end A and the open end B1 is H=$\lambda$/16.

(a) When H=$\lambda$/2, the current wave KA and the reflected wave KB are in the same phase and thus are superposed on each other. Accordingly, the amplitude is the greatest at the emission end A.

(b) When H=$\lambda$/4, the current wave KA and the reflected wave KB are in the opposite phase and thus are cancelled with each other. Accordingly, the amplitude is the smallest at the emission end A.

(c) When H=$\lambda$/8, the amplitude is great at the emission end A.

(d) When H=$\lambda$/16, the amplitude is great at the emission end A.

As a result, considering which case is satisfactory or which case is unsatisfactory, it can be seen that the case (b) is unsatisfactory. The case (a) is most satisfactory but it can be predicted that satisfactory results are obtained if the size is included in the range of $\pm\lambda$/8 with respect to the most satisfactory condition. That is, on the basis of the consideration, the expression (1) or (2) is derived.

Figure 22:
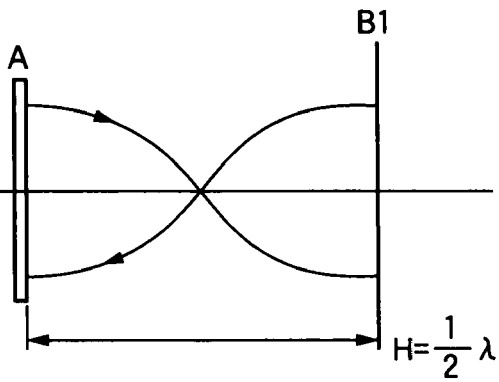
FIG. 22 shows diagrams illustrating vibration conditions in case of a closed end.
Figure 22:
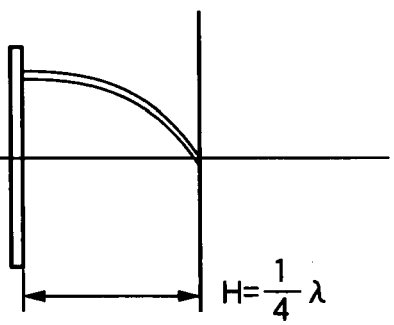
Figure 22:
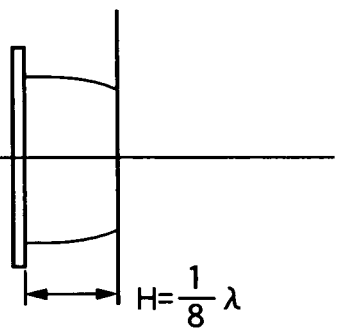
Figure 22:
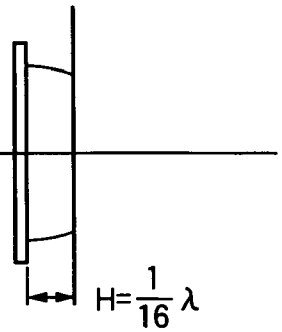

Next, the case of the closed end is considered. In case of the closed end, the relations between the current wave and the reflected wave can be considered as shown in FIG. 22. Similarly to FIG. 21, (a) shows a case that the distance between the emission end A and the open end B1 is H=λ/2, (b) shows a case that the distance between the emission end A and the open end B1 is H=λ/4, (c) shows a case that the distance between the emission end A and the open end B1 is H=λ/8, and (d) shows a case that the distance between the emission end A and the open end B1 is H=λ/16.

(a) When H=λ/2, the current wave KA and the reflected wave KB are in the opposite phase and thus are cancelled with each other. Accordingly, the amplitude is the smallest at the emission end A.

(b) When H=λ/4, the current wave KA and the reflected wave KB are in the same phase and thus are superposed on each other. Accordingly, the amplitude is the largest at the emission end A.

(c) When H=λ/8, the amplitude is small at the emission end A.

(d) When H=λ/16, the amplitude is small at the emission end A.

As a result, considering which case is satisfactory or which case is unsatisfactory, it can be seen that the case (a) is most satisfactory and the other cases are all unsatisfactory. On the basis of the consideration, the following expression can be derived.

$$(n \times \lambda/2 - \lambda/4 - \lambda/8) \leq H \leq (n \times \lambda/2 - \lambda/4 + \lambda/8)$$

where n=1, 2, 3, . . . .

Therefore, in case of the closed end, the heights of the buffer chambers 122 and 123 can be determined on the basis of the condition.

When the amount of remaining ink is detected by the use of such a principle and the ink to which bubbles are added flows in the upstream buffer chamber 122, the ink to which the bubbles are added may enter the sensor cavity 232. When the bubbles enter the sensor cavity 232, it is not possible to detect a stable acoustic waveform with the piezoelectric element 234 and thus it is difficult to detect the end of the ink.

Therefore, in the present embodiment, the flow-path section of the upstream buffer chamber 122 is set to such a small section that a semi-spherical meniscus can be formed by the surface tension of the liquid when the liquid flows toward the sensor cavity 232 from the inflow opening 124.

Specifically, as shown in FIG. 23, the height H5 from the bottom of the buffer chambers 122 and 123 to the top is set to 2 mm or less. The inflow opening communicating at least with the upstream buffer chamber 122 communicates with the bottom of the upstream buffer chamber 122 at a position most apart from the sensor unit 200 and at a hidden position departing from the viewing angle as seen from the sensor cavity 232. In this case, the diameter of the inflow opening 124 or the distance H6 between the opposed surfaces is set to 0.6 to 0.7 mm such that the meniscus M can be formed when the ink flows. In addition, the sectional shape is not particularly limited, but only if the section has such a size that the meniscus can be formed in the width direction or in the depth direction, it is sufficient.

The seal film 105 is disposed to directly face on the sensor cavity 232, that is, the sensor chip 230, through the inlet-side flow paths (communication openings) 212 and 222 and the outlet-side flow paths (communication openings) 223 and 213 of the unit base 210 and the sensor base 220. That is, in the present embodiment, the seal film 105 is disposed to face on the sensor chip 230.

The seal cover 105 is covered with a cover 102 (not shown). That is, the seal film 105 is protected from the outside by the cover 102, thereby preventing damage of the seal film due to disturbance in advance.

According to the above-mentioned embodiment, since the buff chambers 122 and 123 are disposed in the vicinity of the end of the sending passage for sending out ink, the sensor unit 200 is disposed to face on the buffer chambers 122 and 123, the sensor chip 230 of the sensor unit 200 emits the vibration wave K to the buffer chambers 122 and 123, and the sensor unit detects existence of the ink inside the buffer chambers 122 and 123 or the sensor cavity 232 on the basis of the reflected wave returning to the sensor cavity 232 from the buffer chambers 122 and 123, it is possible to detect the amount of remaining ink under the condition that it is little affected by the wave motion of the ink or the bubbles in the ink.

Specifically, since the size of the buffer chambers 122 and 123 is set to the size for avoiding the cancel between the vibration wave emitted from the sensor chip 230 and the reflected wave reflected from the buffer chambers 122 and 123, the reflected wave can be received through the vibration plate 233 under the condition that it is difficult to absorb the reflected wave. As a result, it is possible to enhance the counter electromotive voltage of the piezoelectric element 234, thereby performing detection with high sensitivity.

Specifically, since the compliance value of the buffer chambers 122 and 123 is set to be at least ten times as large as the compliance value of the sensor cavity 232, it is difficult to absorb the vibration generated from the sensor chip 230. As a result, it is possible to enhance the counter electromotive voltage of the piezoelectric element 234, thereby performing detection with high sensitivity.

Since the ink flowing through the inflow opening 123 from the upstream side of the sending passage is supplied to the sensor cavity 232 through the upstream communication passages (the communication opening 132 of the sensor receiving wall 120 and the inlet-side flow paths 212 and 222 of the unit base 210 and the sensor base 220) from the upstream buffer chamber 122 and is discharged to the downstream side of the sending passage through the downstream communication passages (the outlet-side flow paths 213 and 223 of the unit base 210 and the sensor base 220 and the communication opening 133 of the sensor receiving wall 120), the downstream buffer chamber 123, and the outflow opening 125 from the sensor cavity 232, the sensor cavity 232 can be used as a part of the flow path through which the ink flows. Therefore, it is possible to prevent the erroneous detection due to the staying of the ink or bubbles in the sensor cavity 232 as much as possible.

Particularly, since the flow-path section of the upstream buffer chamber 122 is set to such a small section that the semi-spherical meniscus M (a curved boundary between air and ink) can be formed by the surface tension of the ink when the ink flows to the sensor cavity 232 from the inflow opening 124 (specifically, the height of the upstream buffer chamber 122 is set to 2 mm or less), it is possible to prevent a phenomenon that bubbles are sent to the sensor cavity 232 prior to the ink. That is, since it is difficult to generate the state that the ink and the air are mixed before the sensor chip 230, the waveform detected by the sensor chip 230 is stable and it is thus easy to detect the end of the liquid. In addition, since the diameter of the inflow opening 124 or the distance between the opposed surfaces for introducing the liquid into the upstream buffer chamber 122 is set to the range of 0.6 to 0.7 mm, it is possible to more surely prevent the invasion of the bubbles to the sensor chip 230.

Since the sensor chip 230 is disposed on the sensor base 220 made of metal, the sensor base 220 is disposed on the unit base 210 made of resin, the unit base 210 is disposed on the sensor receiving wall 120, and the sensor cavity 232 and the buffer chambers 122 and 123 communicate with each other through the communication passages (the upstream and downstream flow paths 212, 222, 213, and 223 and the communication openings 132 and 133) formed in the sensor base 220, the unit base 210 and the sensor receiving wall 120, respectively, it is possible to accurately detect the amount of remaining ink without being affected by the wave motion of the ink or the bubbles in the ink. In addition, since the sensor base 220 made of metal is interposed between the unit base 210 and the sensor chip 230 made of resin, it is possible to improve the acoustic characteristic. Further, since the communication passages (the upstream and downstream flow paths 212, 222, 213, and 223 and the communication openings 132 and 133) are narrow flow paths, the reflected wave can be received by the vibration plate 233 with the condition of small absorption, only by setting the sizes of the buffer chambers 122 and 123 to the optimal condition in the acoustic characteristic. Accordingly, it is possible to maintain high sensitivity.

Figure 24:
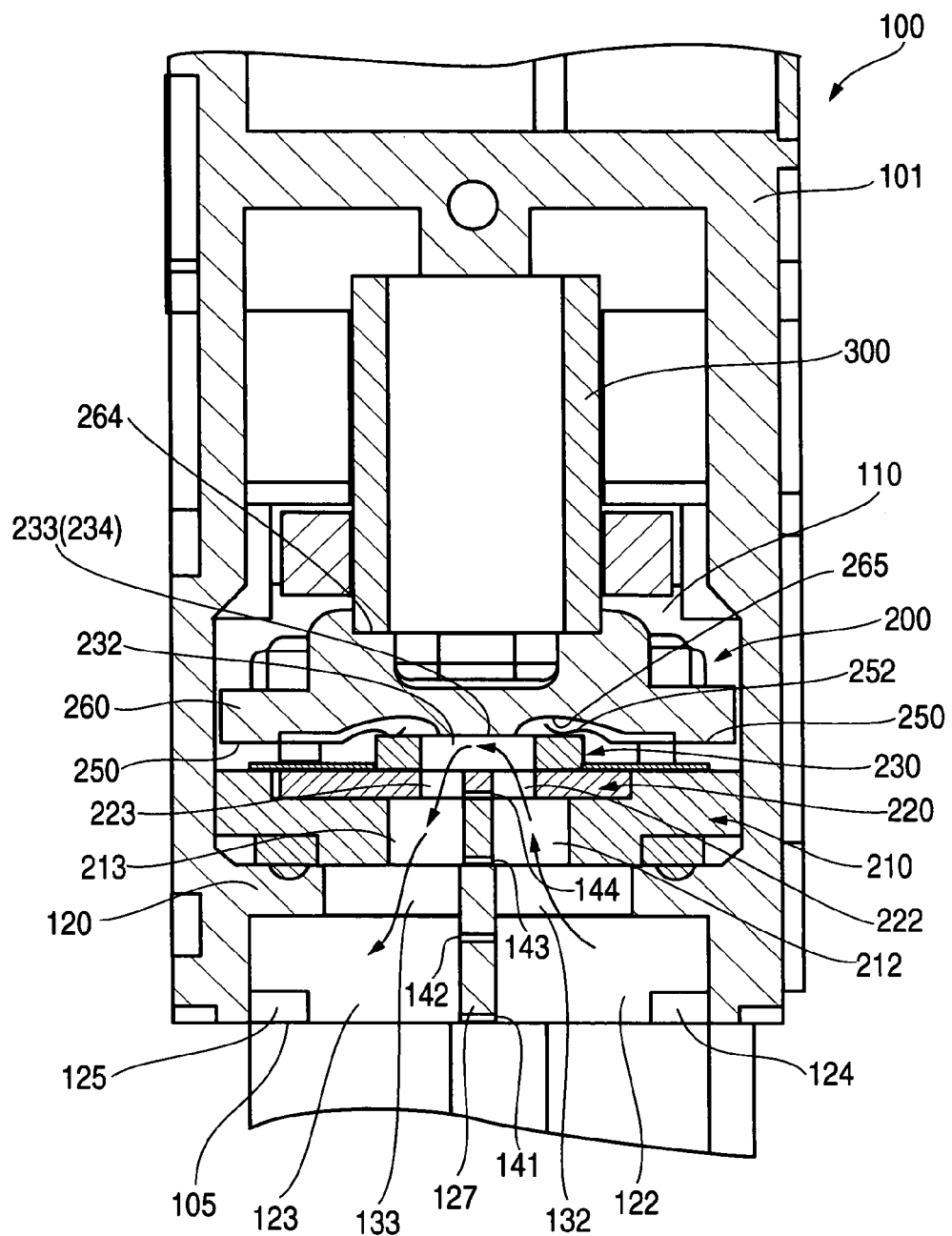
FIG. 24 is a vertical cross-sectional view of a part of an ink cartridge mounted with a sensor unit according to another embodiment.
Figure 25:
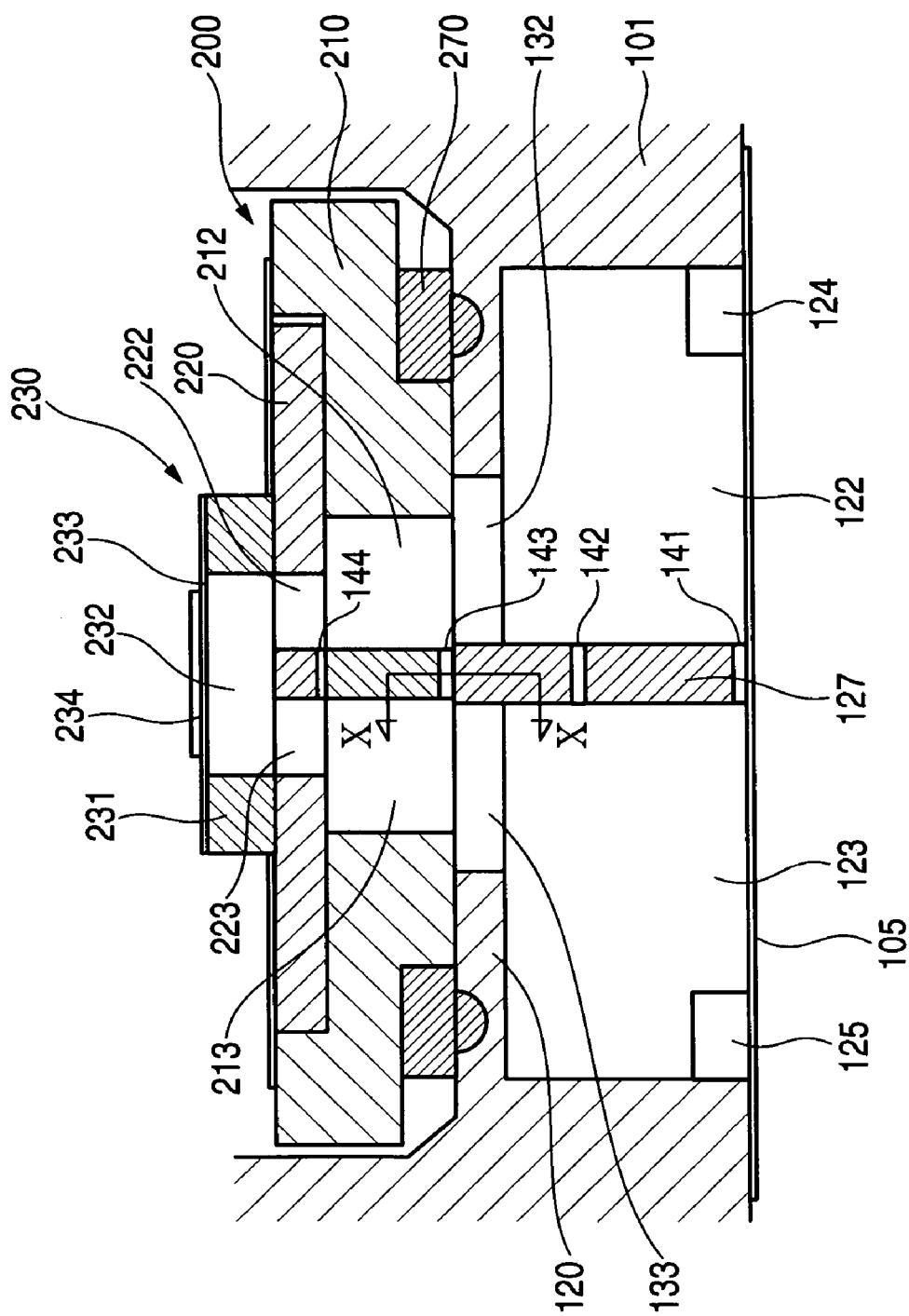
FIG. 25 is an enlarged cross-sectional view illustrating important parts of the sensor unit shown in FIG. 24.
Figure 26:
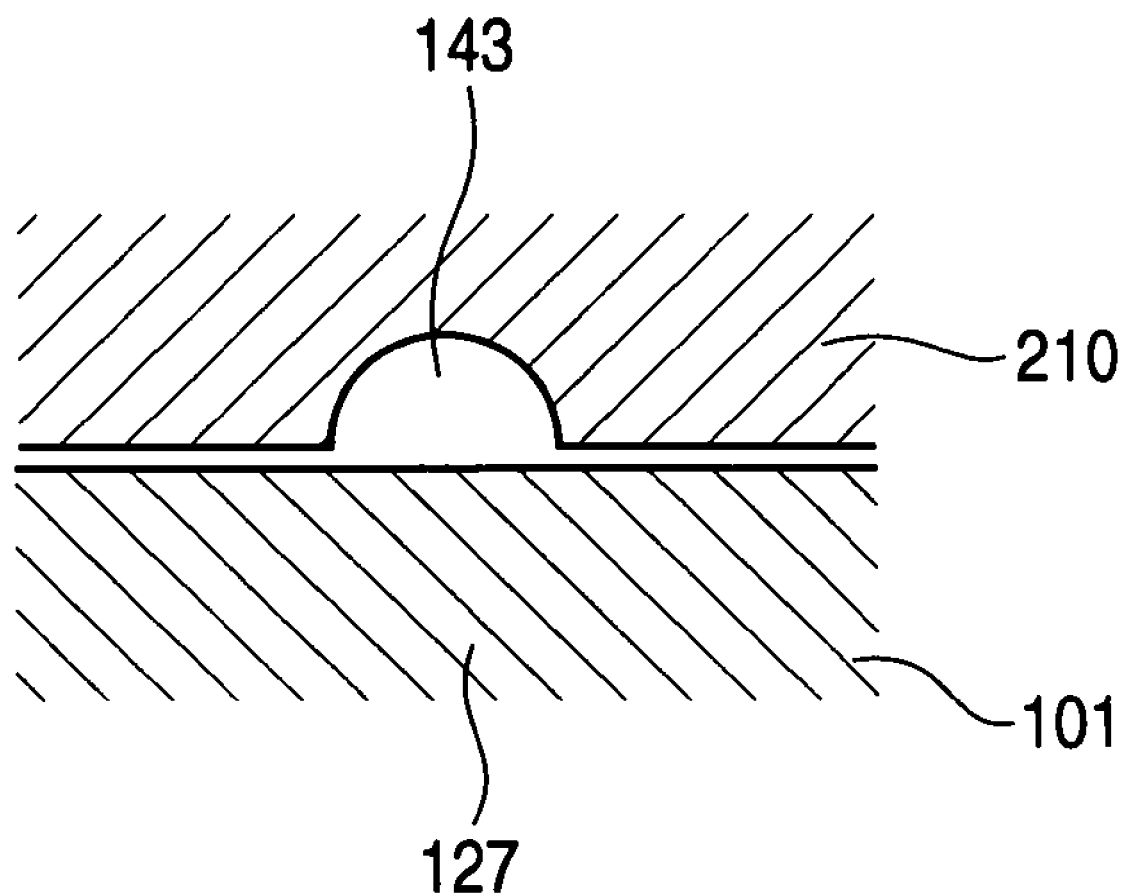
FIG. 26 is a cross-sectional view taken along Line X-X in FIG. 25.

FIGS. 24, 25 and 26 show a fifth embodiment of the invention. Here, as shown in FIGS. 24, 25 and 26, a difference between the fourth and fifth embodiment is such that the bypass passages 141 to 144 which bypass the upstream side and the downstream side of the sensor cavity 232 are disposed in the flow path from the upstream buffer chamber 122 to the downstream buffer chamber 123. These bypass passages 141 to 144 are formed by openings or notches increasing a flow-path resistance rather than the passing through the sensor cavity 232. For example, as shown in FIG. 26, in case of the bypass passage 142, the bypass passage 142 is formed by providing the notches in gaps between the opposed surfaces of neighboring parts. One bypass passage 141 is disposed at the bottom of both buffer chambers 122 and 123.

Since the ink flows through the U-shaped path from the upstream buffer chamber 122 and the downstream buffer chamber 123, it is difficult to allow the air to flow from the upstream buffer chamber 122 to the downstream buffer chamber 123. In addition, since the bypass passages 141 to 144 which bypass the upstream side and the downstream side of the sensor cavity 232 are disposed in the flow path from the upstream buffer chamber 122 to the downstream buffer chamber 123, the entire flow path resistance when the ink flows from the upstream buffer chamber 122 to the downstream buffer chamber 123 is reduced. Further, since the flow path resistances of the bypass passages 141 to 144 are greater than those of the case that the ink passes through the sensor cavity 232, the ink necessarily passes through the sensor cavity 232 and thus it is possible to prevent the ink or air from flowing only through the bypass passages 141 to 144 in the state that the ink remains in the sensor cavity 232, thereby surely detecting the existence of the remaining ink.

In the present embodiment, since one bypass passage 141 is disposed at the bottoms of both buffer chambers 122 and 123, it is possible to allow the ink to flow from the upstream side to the downstream side through the bypass passage 141 at the bottoms without passing through the sensor cavity 232 at the time of decrease in the amount of remaining ink. Accordingly, it is possible to prevent the unstable detection because the bubbles remain in the buffer chamber 122 or flow in the sensor cavity 232. That is, since the bypass passage 141 is positioned at the bottoms of the buffer chambers 122 and 123, the amount of bubbles remaining in the buffer chamber 122 or passing through the sensor cavity 232 can be reduced and the unstable detecting region can be reduced, thereby enhancing the accuracy of detection. In addition, since the ink remaining in the upstream buffer 122 chamber is discharged to the downstream side through the bypass passage 141 at the bottom after the downstream buffer chamber 123 becomes empty, the empty state of the sensor cavity 232 is stabilized, thereby accomplishing the stable detection.

Figure 27:
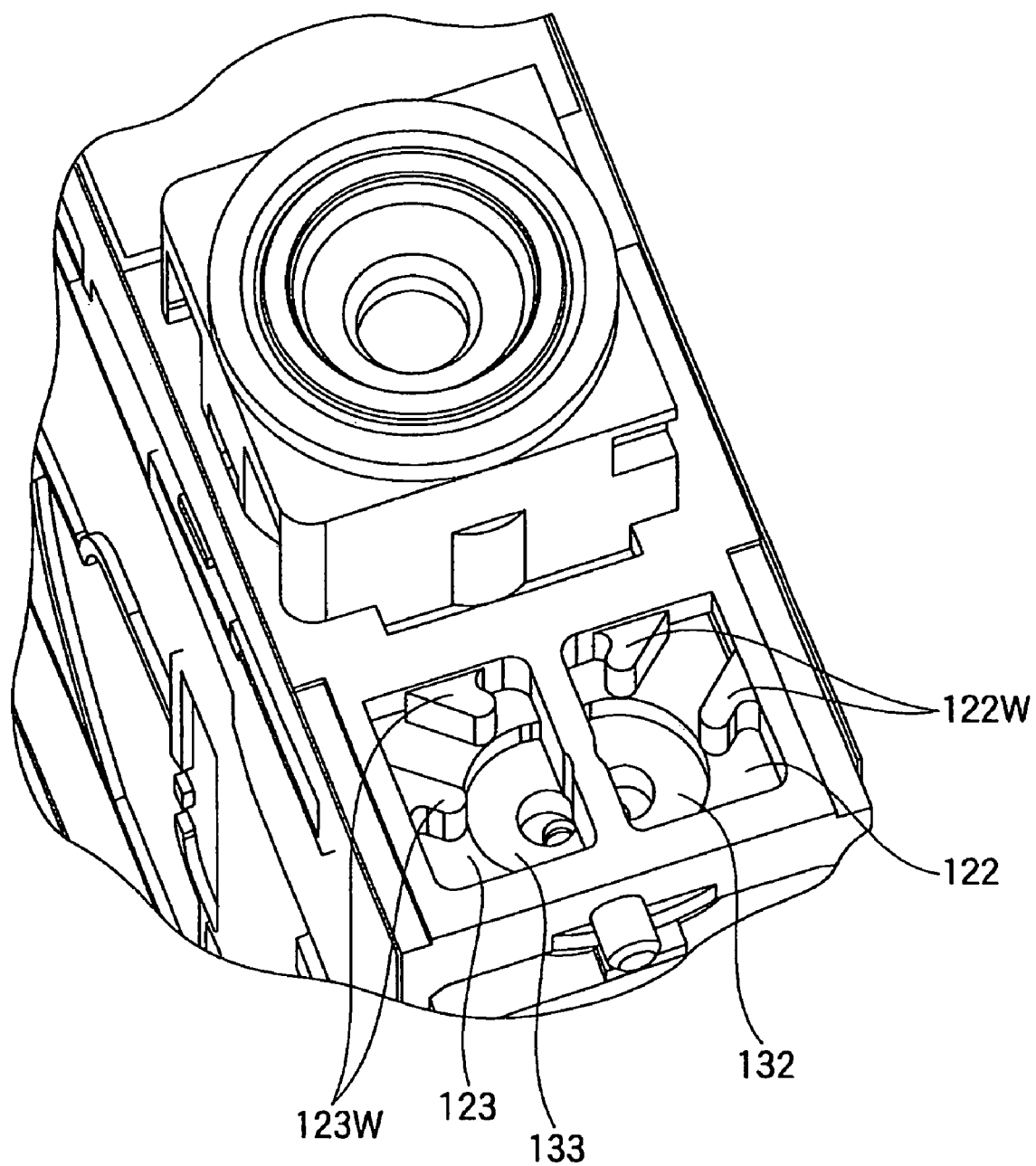
FIG. 27 is a perspective view of another embodiment, mainly showing a portion corresponding to a section X-X in FIG. 23 as viewed in a direction of an arrow Y in FIG. 23.
Figure 28:
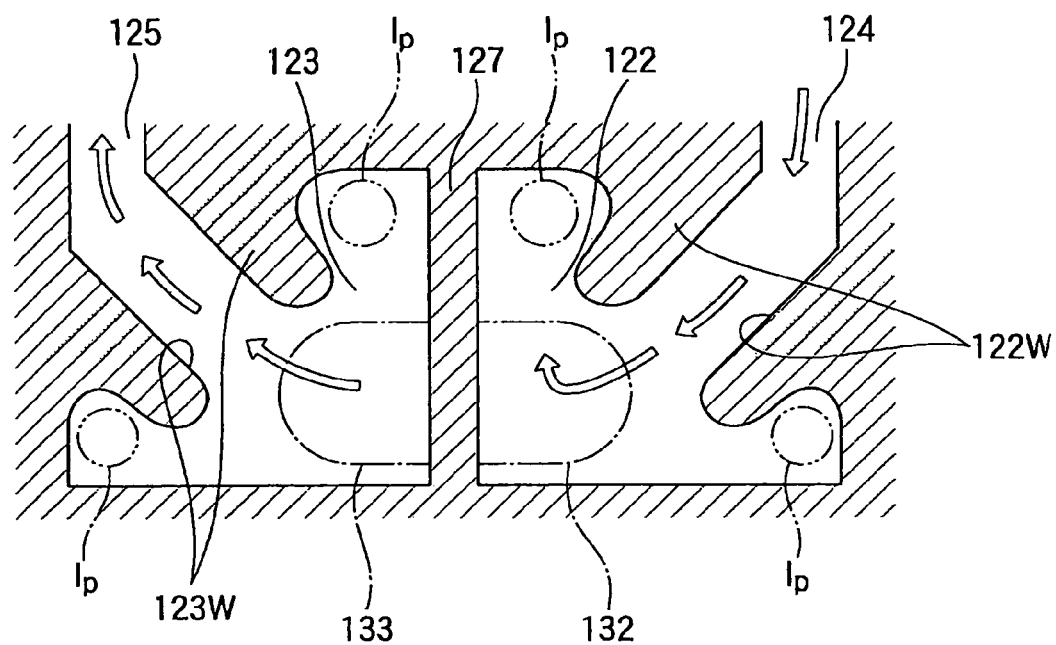
FIG. 28 shows that portion of the embodiment shown in FIG. 27, which corresponds to the section X-X in FIG. 23.

FIGS. 27 and 28 show a sixth embodiment of the present invention. FIG. 27 is a perspective view of the sixth embodiment, mainly showing a portion corresponding to a section X-X in FIG. 23 as viewed in a direction of an arrow Y in FIG. 23. FIG. 28 shows that portion of the sixth embodiment, which corresponds to the section X-X in FIG. 23.

In the sixth embodiment, a guide wall 122W is provided to extend from the inflow opening 124 in the upstream buffer chamber 122 toward the communication opening (upstream communication passage) 132 of the sensor receiving wall 120. The guide wall 122W functions to prevent the remaining ink (the remaining liquid) Ip at a corner portion of the buffer chamber 122 from flowing out therefrom.

In particular, in the present embodiment, a pair of rib-like guide walls 122W are provided to cover or conceal corner portions where the ink is likely to remain in the buffer chamber 122. By this arrangement, the ink Ip remaining at the corner portions is trapped and prevented from unnecessarily flowing out therefrom toward the communication opening 132 after the ink end is detected. This way, the remaining ink can be prevented from flowing into the sensor cavity 232 (see FIG. 23) after the ink end is detected. That is, an erroneous detection of the presence of ink can be eliminated.

Similarly, the downstream buffer chamber 123 is provided with guide walls 123W which extend from the communication opening (downstream communication passage) 133 of the sensor receiving wall 120 to the outflow opening 125, and which correspond in structure to the guide walls 122W of the upstream buffer chamber 122. Because the guide walls 123W are arranged in the downstream buffer chamber 123 similarly to the upstream buffer chamber 122, it is possible to make uniform vibration characteristics of the upstream buffer chamber 122 and the downstream buffer chamber 123, to thereby suppress variations of the characteristics.

Figure 29:
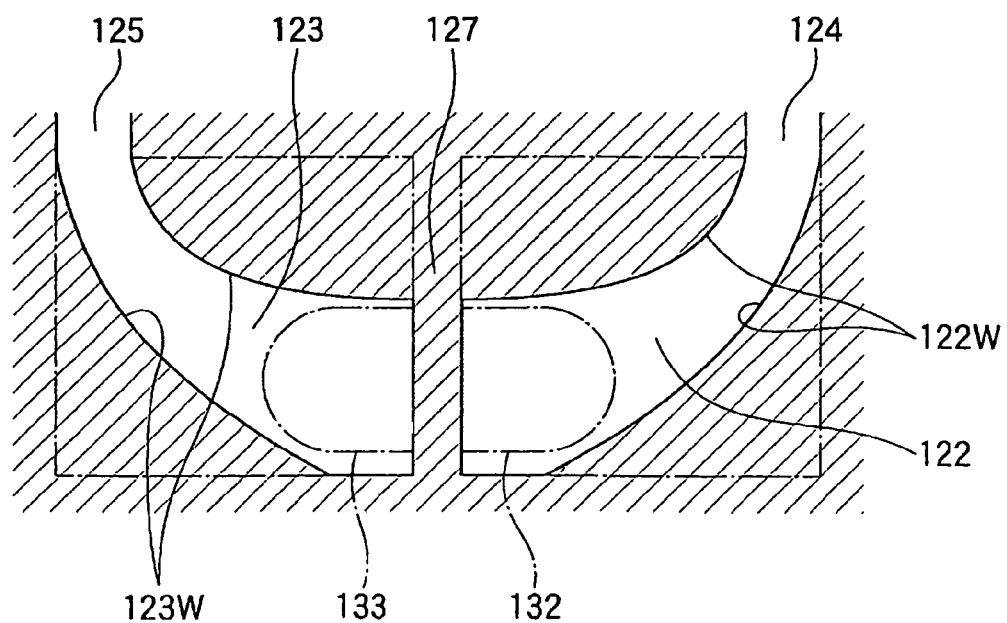
FIG. 29 is a sectional view showing a modification of the embodiment shown in FIG. 28.

FIG. 29 shows a modification of the sixth embodiment. As shown in FIG. 29, portions behind the guide walls 122W, 123W may be filled to eliminate the corner portions where ink is likely to remain in the buffer chambers 122, 123. By this modification, since the ink remaining at those corner portions can be completely eliminated, it is possible to completely eliminate an erroneous detection of the presence of ink caused when the remaining ink erroneously flows into the sensor cavity 232 after the ink end is detected.

INDUSTRIAL APPLICABILITY

The present invention is applicable to a liquid sensor and a liquid container having the liquid sensor, which require accurate detection of liquid.

The invention claimed is:
1. A liquid container comprising:
a container body having a liquid delivery opening for delivering the liquid reserved inside to the outside; and
a liquid sensor mounted on the container body,
wherein the liquid sensor including:
a vibration cavity forming base portion having a first surface and a second surface facing each other, a cavity for receiving a medium to be sensed being formed to be opened toward the first surface so that the bottom surface of the cavity can be vibrated;

a piezoelectric element having a first electrode that is formed on the side of the second surface of the vibration cavity forming base portion, a piezoelectric layer laminated on the first electrode, and a second electrode laminated on the piezoelectric layer; and a flow path forming base portion laminated the first surface of the vibration cavity forming base portion, the flow path forming base portion being formed with a liquid supply path for supplying liquid to be sensed to the cavity and having a first cross sectional area, and a liquid discharge path for discharging liquid to be sensed from the cavity and having a second cross sectional area, wherein the liquid container further comprises:

a supply side buffer chamber communicating with the liquid supply path and having a third cross sectional area larger than the first cross sectional area;

an inflow opening communicating with the supply side buffer chamber and having a fourth cross sectional area smaller than the third cross sectional area; and a discharge side buffer chamber communicating with the liquid discharge path, and having a fifth cross sectional area larger than the second cross sectional area; and a discharge opening communicating with the discharge side buffer chamber and having a sixth cross sectional area smaller than the fifth cross sectional area, and wherein the liquid inside the container body is supplied to the cavity through the inflow opening, the supply side buffer chamber and the liquid supply path and is discharged from the cavity through the liquid discharge path, the discharge side buffer chamber and the discharge opening.

2. A liquid sensor comprising:

a vibration cavity forming base portion having a first surface and a second surface facing each other, a cavity for receiving a medium to be sensed being formed to be opened toward the first surface so that the bottom surface of the cavity can be vibrated;

a piezoelectric element having a first electrode that is formed on the side of the second surface of the vibration cavity forming base portion, a piezoelectric layer laminated on the first electrode, and a second electrode laminated on the piezoelectric layer;

a flow path forming base portion laminated on the side of the first surface of the vibration cavity forming base portion, the flow path forming base portion being formed with a liquid supply path for supplying liquid to be sensed to the cavity and a liquid discharge path for discharging liquid to be sensed from the cavity;

a supply side buffer chamber communicating with the liquid supply path; and a discharge side buffer chamber communicating with the liquid discharge path, wherein parts of the supply side buffer chamber and the discharge side buffer chamber opposing the bottom surface of the cavity are opened and are closed with a seal film having flexibility, and wherein when the wavelength of the vibration wave emitted from the sensor chip is λ, the distance H between the seal film and each of wall surfaces of the supply side buffer chamber and the discharge side buffer chamber opposing the seal film is set to satisfy any one of the following expressions (1) and (2):

$$(n\times\lambda/2-\lambda/8) \leq H \leq (n\times\lambda/2\lambda/8) \quad (1)$$

where n=1, 2, 3, . . .

$$0 < H \leq \lambda/8 \quad (1).$$

3. A liquid sensor comprising:

a vibration cavity forming base portion having a first surface and a second surface facing each other, a cavity for receiving a medium to be sensed being formed to be opened toward the first surface so that the bottom surface of the cavity can be vibrated;

a piezoelectric element having a first electrode that is formed on the side of the second surface of the vibration cavity forming base portion, a piezoelectric layer laminated on the first electrode, and a second electrode laminated on the piezoelectric layer;

a flow path forming base portion laminated on the side of the first surface of the vibration cavity forming base portion, the flow path forming base portion being formed with a liquid supply path for supplying liquid to be sensed to the cavity and a liquid discharge path for discharging liquid to be sensed from the cavity;

a supply side buffer chamber communicating with the liquid supply path; and a discharge side buffer chamber communicating with the liquid discharge path, wherein parts of the supply side buffer chamber and the discharge side buffer chamber opposing the bottom surface of the cavity constitute closed ends, and wherein when the wavelength of the vibration wave emitted from the sensor chip is λ, the distance H between each of the closed ends and wall surfaces of the supply side buffer chamber and the discharge side buffer chamber opposing the closed ends is set to satisfy the following expression:

$$(n\times\lambda/2-\lambda/4-\lambda/8) \leq H \leq (n\times\lambda/2-\lambda/4-\lambda/8)$$

where n=1, 2, 3, . . . .

4. The liquid container according to claim 1, wherein the supply side buffer chamber and the discharge side buffer chamber are formed symmetrically with respect to a center of the cavity.

5. The liquid container according to claim 1, wherein the supply side buffer chamber and the discharge side buffer chamber respectively have at least ten times larger volume than the cavity.

6. The liquid container according to claim 1, wherein the supply side buffer chamber communicates with a liquid reservoir chamber which constitutes a major part of an inner space of the container body to reserve liquid, and the discharge side buffer chamber communicates with a liquid delivery space communicating with a liquid delivery opening for delivering the liquid reserved inside to the outside, in the inner space of the container body.

7. The liquid container according to claim 1, wherein parts of the supply side buffer chamber and the discharge side buffer chamber opposing the bottom surface of the cavity are opened and are closed with a seal film having flexibility.

8. The liquid container according to claim 1, wherein the flow path forming base portion includes a metal sensor base on which the vibration cavity forming base portion is fixed and a resin unit base on which the sensor base is fixed, wherein the liquid supply path and the liquid discharge path are formed in the sensor base and the unit base, wherein each of the liquid supply path and the liquid discharge path has a smaller flow-path section than those of the supply side buffer chamber and the discharge side buffer chamber.

9. The liquid container according to claim 1, further comprising:

a first liquid guide wall, extending from an inflow opening of the supply side buffer chamber toward an outlet of the supply side buffer chamber to the liquid supply path.

10. The liquid container according to claim 1, wherein the supply side buffer chamber and the discharge side buffer chamber are partitioned by a partition wall, a bypass passage communicating the liquid supply path and the liquid discharge path, and has a flow path resistance greater than that of the cavity.

11. The liquid container according to claim 9, further comprising:

a second liquid guide wall extending from an outflow opening of the discharge side buffer chamber toward an inlet of the discharge side buffer chamber.

12. The liquid container according to claim 10, wherein the partition wall is formed with a bypass passage communicating the supply side buffer chamber and the discharge side buffer chamber, and having a flow path resistance greater than that of the cavity.

* * * * *